(12) United States Patent
Nakayama et al.

(10) Patent No.: US 7,620,513 B2
(45) Date of Patent: Nov. 17, 2009

(54) OPTICAL TIME DOMAIN REFLECTOMETER, AND OPTICAL FIBER MEASURING METHOD AND OPTICAL FIBER MEASURING SYSTEM USING THE SAME

(75) Inventors: Norio Nakayama, Machida (JP);
Yasuhiro Miyake, Atsugi (JP);
Yoshifumi Imazu, Atsugi (JP); Shigeo Hori, Atsugi (JP); Keita Masuhara, Atsugi (JP)

(73) Assignee: Anritsu Corporation, Atsugi-shi (JP)

( * ) Notice: Subject to any disclaimer, the term of this patent is extended or adjusted under 35 U.S.C. 154(b) by 210 days.

(21) Appl. No.: 11/791,623

(22) PCT Filed: Oct. 31, 2006

(86) PCT No.: PCT/JP2006/321762

§ 371 (c)(1),
(2), (4) Date: May 25, 2007

(87) PCT Pub. No.: WO2007/052665

PCT Pub. Date: May 10, 2007

(65) Prior Publication Data

US 2008/0086278 A1    Apr. 10, 2008

(30) Foreign Application Priority Data

Nov. 4, 2005    (JP)    ............... 2005-321163

(51) Int. Cl.
*G06F 19/00*    (2006.01)
(52) U.S. Cl. ............... 702/84; 702/68; 702/119; 702/182; 702/150; 398/13; 398/17; 398/18; 356/73.1
(58) Field of Classification Search ............ 702/68, 702/84, 119, 182, 150; 709/223, 224; 705/15, 705/42, 1, 14, 5, 65; 398/5, 7, 49, 10, 13, 398/17, 18; 356/73.1
See application file for complete search history.

(56) References Cited

U.S. PATENT DOCUMENTS 5,528,356 A    6/1996    Harcourt
(Continued)

FOREIGN PATENT DOCUMENTS

EP    1 069 409 A    1/2001
(Continued)

OTHER PUBLICATIONS

International Preliminary Report on Patentability, Chapter I of the Patent Cooperation Treaty, and Written Opinion dated Nov. 27, 2008 for PCT/JP2006 /321762. 5 sheets.

(Continued)

*Primary Examiner*—Carol S Tsai
(74) *Attorney, Agent, or Firm*—Frishauf, Holtz, Goodman & Chick, P.C.

(57) ABSTRACT

In order to easily and efficiently carry out various characteristic evaluations of optical fibers which have been laid down, a table file which is for carrying out association of optical fibers serving as measuring objects with measured data when the optical fibers have been measured, based on optical fiber management information provided in advance of undertaking a cable laying/maintenance construction, such as various types of information on the optical fibers serving as measuring objects, and information on a construction site, and the like, is created at an external terminal. An OTDR measures the optical fibers serving as measuring objects based on the table file created at the external terminal, and stores measured result data in which the measured optical fibers and measured data of the optical fibers have been associated with one another, and edited result data expressing edited contents when the table file and the measured result data have been edited. The external terminal generates a report based on the measured result data and the edited result data stored in the OTDR.

25 Claims, 36 Drawing Sheets

U.S. PATENT DOCUMENTS

| | | | |
|---|---|---|---|
| 5,801,953 | A | 9/1998 | Thoma et al. |
| 6,445,445 | B1 * | 9/2002 | Nakayama et al. ......... 356/73.1 |
| 6,460,000 | B1 | 10/2002 | Nakayama et al. |
| 6,807,370 | B2 * | 10/2004 | Harasawa .................... 398/13 |
| 7,042,559 | B1 * | 5/2006 | Frigo et al. ................ 356/73.1 |
| 7,099,581 | B2 * | 8/2006 | Evangelides et al. .......... 398/17 |
| 2008/0085114 | A1 * | 4/2008 | Nakajima et al. ............. 398/33 |

FOREIGN PATENT DOCUMENTS

| | | |
|---|---|---|
| JP | 11-119028 A | 4/1999 |
| JP | 4-158237 A | 6/1999 |
| JP | 2001-21452 A | 1/2001 |

OTHER PUBLICATIONS

Extended European Search Report dated Apr. 17, 2009 (9 pages), issued in counterpart European Application Application Serial No. 06822691.9.

Nobuo Tomita, et al., "Design and Performance of a Novel Automatic Fiber Line Testing System with OTDR for Optical Subscriber Loops", Journal of Lightwave Technology, IEEE Service Center, May 1, 1994, pp. 717-725, New York, NY, US.

P. Winterling, "Dern Knick in der Optik auf der Spur. Was moderne OTDRs konnen (sollen)", Elektronik, Weka Fachzeitschriftenverlag, Dec. 23, 1997, pp. 62-66, DE.

F. A. Maier, et al., "Automation of Optical Time-Domain Reflectometry Measurements", Hewlett-Packard Journal, Feb. 1, 1995, pp. 57-62, Palo Alto, US.

* cited by examiner

| | [File name] | [Wavelength] | [Distance range] | [Pulse width] | [Averaging (number of times)] | [Title] | [Data flag] | [Op |
|---|---|---|---|---|---|---|---|---|
| 1 | fTest_1310_0.SOR | 1310nm | Automatic setting | Automatic setting | Automatic setting | Anritsu | BC : In cable-laying | An |
| 2 | fTest_1550_0.SOR | 1550nm | Automatic setting | Automatic setting | Automatic setting | Anritsu | BC : In cable-laying | An |
| 3 | fTest_1650_0.SOR | 1650nm | Automatic setting | Automatic setting | Automatic setting | Anritsu | BC : In cable-laying | An |
| 4 | fTest_1310_1.SOR | 1310nm | Automatic setting | Automatic setting | Automatic setting | Anritsu | BC : In cable-laying | An |
| 5 | fTest_1550_1.SOR | 1550nm | Automatic setting | Automatic setting | Automatic setting | Anritsu | BC : In cable-laying | An |
| 6 | fTest_1650_1.SOR | 1650nm | Automatic setting | Automatic setting | Automatic setting | Anritsu | BC : In cable-laying | An |
| 7 | fTest_1310_2.SOR | 1310nm | Automatic setting | Automatic set ▼ | Automatic setting | Anritsu | BC : In cable-laying | An |
| 8 | fTest_1550_2.SOR | 1550nm | Automatic setting | Automatic setting | Automatic setting | Anritsu | BC : In cable-laying | An |
| 9 | fTest_1650_2.SOR | 1650nm | Automatic setting | Automatic setting | Automatic setting | Anritsu | BC : In cable-laying | An |
| 10 | fTest_1310_3.SOR | 1310nm | Automatic setting | Automatic setting | Automatic setting | Anritsu | BC : In cable-laying | An |
| 11 | fTest_1550_3.SOR | 1550nm | Automatic setting | Automatic setting | Automatic setting | Anritsu | BC : In cable-laying | An |
| 12 | fTest_1650_3.SOR | 1650nm | Automatic setting | Automatic setting | Automatic setting | Anritsu | BC : In cable-laying | An |
| 13 | fTest_1310_4.SOR | 1310nm | Automatic setting | Automatic setting | Automatic setting | Anritsu | BC : In cable-laying | An |
| 14 | fTest_1550_4.SOR | 1550nm | Automatic setting | Automatic setting | Automatic setting | Anritsu | BC : In cable-laying | An |
| 15 | fTest_1650_4.SOR | 1650nm | Automatic setting | Automatic setting | Automatic setting | Anritsu | BC : In cable-laying | An |
| 16 | fTest_1310_5.SOR | 1310nm | Automatic setting | Automatic setting | Automatic setting | Anritsu | BC : In cable-laying | An |
| 17 | fTest_1550_5.SOR | 1550nm | Automatic setting | Automatic setting | Automatic setting | Anritsu | BC : In cable-laying | An |
| 18 | fTest_1650_5.SOR | 1650nm | Automatic setting | Automatic setting | Automatic setting | Anritsu | BC : In cable-laying | An |
| 19 | fTest_1310_6.SOR | 1310nm | Automatic setting | Automatic setting | Automatic setting | Anritsu | BC : In cable-laying | An |
| 20 | fTest_1550_6.SOR | 1550nm | Automatic setting | Automatic setting | Automatic setting | Anritsu | BC : In cable-laying | An |
| 21 | fTest_1650_6.SOR | 1650nm | Automatic setting | Automatic setting | Automatic setting | Anritsu | BC : In cable-laying | An |
| 22 | fTest_1310_7.SOR | 1310nm | Automatic setting | Automatic setting | Automatic setting | Anritsu | BC : In cable-laying | An |
| 23 | fTest_1550_7.SOR | 1550nm | Automatic setting | Automatic setting | Automatic setting | Anritsu | BC : In cable-laying | An |
| 24 | fTest_1650_7.SOR | 1650nm | Automatic setting | Automatic setting | Automatic setting | Anritsu | BC : In cable-laying | An |
| 25 | fTest_1310_8.SOR | 1310nm | Automatic setting | Automatic setting | Automatic setting | Anritsu | BC : In cable-laying | An |
| 26 | fTest_1550_8.SOR | 1550nm | Automatic setting | Automatic setting | Automatic setting | Anritsu | BC : In cable-laying | An |
| 27 | fTest_1650_8.SOR | 1650nm | Automatic setting | Automatic setting | Automatic setting | Anritsu | BC : In cable-laying | An |
| 28 | fTest_1310_9.SOR | 1310nm | Automatic setting | Automatic setting | Automatic setting | Anritsu | BC : In cable-laying | An |
| 29 | fTest_1550_9.SOR | 1550nm | Automatic setting | Automatic setting | Automatic setting | Anritsu | BC : In cable-laying | An |

FIG. 4A

Measurement condition setting (in common)

Plan name
- Plan name: Tokyo<>Ueno Construction

File name
- (1)_(2)_(3)_(4)_(5).SOR

| (1) | (2) | (3) | (4) | (5) |
|---|---|---|---|---|
| Core wire name ▼ | Custom 1 ▼ | Wavelength ▼ | Custom 2 ▼ | Nothing ▼ | .SOR

- Custom 1: (
- Custom 2: )

Discriminant letter
- Forward direction: a_b
- Backward direction: b_a

Core wire name
- Name: Tokyo_Ueno
- Start number: 1
- Number of wires: 20

Measurement parameters
- Measurement mode: Loss & total return loss (two-point markers) ▼
- Sampling mode: Standard ▼
- Averaging (unit): Number of times ▼

Access master type name selection
- Type name: MT9081D ▼
- Wavelength:
  - ☑ 1310nm
  - ☑ 1550nm

[1310nm / 1550nm]

Measurement parameter
- Group refractive index(IOR): 1.500000 ▼

Event detection
- Connection loss: 0.20 ▼ dB
- Return loss: 40.0 ▼ dB
- Fiber far side: 10 ▼ dB

[ OK ]   [ Cancel ]

Measurement condition setting (in common)

Plan name
- Plan name: Tokyo<>Ueno Construction

File name
- (1)_(2)_(3)_(4)_(5).SOR
- (1) Core wire name
- (2) Custom 1
- (3) Wavelength
- (4) Custom 2
- (5) Nothing  .SOR Discriminant letter
- Custom 1 ( Custom 1
- Custom 2 ) Custom 2
- Sequential number
- Core wire name: Tokyo_Ueno
- Wavelength
- Distance range
- Pulse width
- Backward direction: b_a
- Number of wires: 20

Measurement parameters
- Measurement mode: Loss & total return loss (two-point markers)
- Sampling mode: Standard
- Averaging (unit): Number of times Access master type name selection
- Type name: MT9081D Wavelength
- ☑ 1310nm
- ☑ 1550nm 1310nm | 1550nm Measurement parameter
- Group refractive index(IOR): 1.500000

Event detection
- Connection loss: 0.20 dB
- Return loss: 40.0 dB
- Fiber far side: 10 dB OK    Cancel

FIG. 4E

| | File name | Core wire name | Core wire number | Measuring state | Wavelength | Distance range | Pulse width | Averag |
|---|---|---|---|---|---|---|---|---|
| 1 | Tokyo_Ueno0001(1310nm).SOR | Tokyo_Ueno | 0001 | Unmeasured | 1310nm | Automatic setting | Automatic setting | Autom |
| 2 | Tokyo_Ueno0001(1550nm).SOR | Tokyo_Ueno | 0001 | Unmeasured | 1550nm | Automatic setting | Automatic setting | Autom |
| 3 | Tokyo_Ueno0002(1310nm).SOR | Tokyo_Ueno | 0002 | Unmeasured | 1310nm | Automatic setting | Automatic setting | Autom |
| 4 | Tokyo_Ueno0002(1550nm).SOR | Tokyo_Ueno | 0002 | Unmeasured | 1550nm | Automatic setting | Automatic setting | Autom |
| 5 | Tokyo_Ueno0003(1310nm).SOR | Tokyo_Ueno | 0003 | Unmeasured | 1310nm | Automatic setting | Automatic setting | Autom |
| 6 | Tokyo_Ueno0003(1550nm).SOR | Tokyo_Ueno | 0003 | Unmeasured | 1550nm | Automatic setting | Automatic setting | Autom |
| 7 | Tokyo_Ueno0004(1310nm).SOR | Tokyo_Ueno | 0004 | Unmeasured | 1310nm | Automatic setting | Automatic setting | Autom |
| 8 | Tokyo_Ueno0004(1550nm).SOR | Tokyo_Ueno | 0004 | Unmeasured | 1550nm | Automatic setting | Automatic setting | Autom |
| 9 | Tokyo_Ueno0005(1310nm).SOR | Tokyo_Ueno | 0005 | Unmeasured | 1310nm | Automatic setting | Automatic setting | Autom |
| 10 | Tokyo_Ueno0005(1550nm).SOR | Tokyo_Ueno | 0005 | Unmeasured | 1550nm | Automatic setting | Automatic setting | Autom |
| 11 | Tokyo_Ueno0006(1310nm).SOR | Tokyo_Ueno | 0006 | Unmeasured | 1310nm | Automatic setting | Automatic setting | Autom |
| 12 | Tokyo_Ueno0006(1550nm).SOR | Tokyo_Ueno | 0006 | Unmeasured | 1550nm | Automatic setting | Automatic setting | Autom |
| 13 | Tokyo_Ueno0007(1310nm).SOR | Tokyo_Ueno | 0007 | Unmeasured | 1310nm | Automatic setting | Automatic setting | Autom |
| 14 | Tokyo_Ueno0007(1550nm).SOR | Tokyo_Ueno | 0007 | Unmeasured | 1550nm | Automatic setting | Automatic setting | Autom |
| 15 | Tokyo_Ueno0008(1310nm).SOR | Tokyo_Ueno | 0008 | Unmeasured | 1310nm | Automatic setting | Automatic setting | Autom |
| 16 | Tokyo_Ueno0008(1550nm).SOR | Tokyo_Ueno | 0008 | Unmeasured | 1550nm | Automatic setting | Automatic setting | Autom |
| 17 | Tokyo_Ueno0009(1310nm).SOR | Tokyo_Ueno | 0009 | Unmeasured | 1310nm | Automatic setting | Automatic setting | Autom |
| 18 | Tokyo_Ueno0009(1550nm).SOR | Tokyo_Ueno | 0009 | Unmeasured | 1550nm | Automatic setting | Automatic setting | Autom |
| 19 | Tokyo_Ueno0010(1310nm).SOR | Tokyo_Ueno | 0010 | Unmeasured | 1310nm | Automatic setting | Automatic setting | Autom |
| 20 | Tokyo_Ueno0010(1550nm).SOR | Tokyo_Ueno | 0010 | Unmeasured | 1550nm | Automatic setting | Automatic setting | Autom |
| 21 | Tokyo_Ueno0011(1310nm).SOR | Tokyo_Ueno | 0011 | Unmeasured | 1310nm | Automatic setting | Automatic setting | Autom |
| 22 | Tokyo_Ueno0011(1550nm).SOR | Tokyo_Ueno | 0011 | Unmeasured | 1550nm | Automatic setting | Automatic setting | Autom |
| 23 | Tokyo_Ueno0012(1310nm).SOR | Tokyo_Ueno | 0012 | Unmeasured | 1310nm | Automatic setting | Automatic setting | Autom |
| 24 | Tokyo_Ueno0012(1550nm).SOR | Tokyo_Ueno | 0012 | Unmeasured | 1550nm | Automatic setting | Automatic setting | Autom |
| 25 | Tokyo_Ueno0013(1310nm).SOR | Tokyo_Ueno | 0013 | Unmeasured | 1310nm | Automatic setting | Automatic setting | Autom |
| 26 | Tokyo_Ueno0013(1550nm).SOR | Tokyo_Ueno | 0013 | Unmeasured | 1550nm | Automatic setting | Automatic setting | Autom |
| 27 | Tokyo_Ueno0014(1310nm).SOR | Tokyo_Ueno | 0014 | Unmeasured | 1310nm | Automatic setting | Automatic setting | Autom |
| 28 | Tokyo_Ueno0014(1550nm).SOR | Tokyo_Ueno | 0014 | Unmeasured | 1550nm | Automatic setting | Automatic setting | Autom |
| 29 | Tokyo_Ueno0015(1310nm).SOR | Tokyo_Ueno | 0015 | Unmeasured | 1310nm | Automatic setting | Automatic setting | Autom |

| | Wavelength | Distance range | Pulse width | Averaging (Number of times) | Title | Data flag | Operator |
|---|---|---|---|---|---|---|---|
| 1 | 1310nm | Automatic setting | Automatic setting | Automatic setting | Anritsu | BC : In cable-laying | Anritsu Taro |
| 2 | 1550nm | Automatic setting | Automatic setting | Automatic setting | Anritsu | BC : In cable-laying | Anritsu Taro |
| 3 | 1650nm | Automatic setting | Automatic setting | Automatic setting | Anritsu | BC : In cable-laying | Anritsu Taro |
| 4 | 1310nm | Automatic setting | Automatic setting | Automatic setting | Anritsu | BC : In cable-laying | Anritsu Taro |
| 5 | 1550nm | Automatic setting | Automatic setting | Automatic setting | Anritsu | BC : In cable-laying | Anritsu Taro |
| 6 | 1650nm | Automatic setting | Automatic setting | Automatic setting | Anritsu | BC : In cable-laying | Anritsu Taro |
| 7 | 1310nm | Automatic setting | Automatic setting | Automatic setting | Anritsu | BC : In cable-laying | Anritsu Taro |
| 8 | 1550nm | Automatic setting | Automatic setting | Automatic setting | Anritsu | BC : In cable-laying | Anritsu Taro |
| 9 | 1650nm | Automatic setting | Automatic setting | Automatic setting | Anritsu | BC : In cable-laying | Anritsu Taro |
| 10 | 1310nm | Automatic setting | Automatic setting | Automatic setting | Anritsu | BC : In cable-laying | Anritsu Taro |
| 11 | 1550nm | Automatic setting | Automatic setting | Automatic setting | Anritsu | BC : In cable-laying | Anritsu Taro |
| 12 | 1650nm | Automatic setting | Automatic setting | Automatic setting | Anritsu | BC : In cable-laying | Anritsu Taro |
| 13 | 1310nm | Automatic setting | Automatic setting | Automatic setting | Anritsu | BC : In cable-laying | Anritsu Taro |
| 14 | 1550nm | Automatic setting | Automatic setting | Automatic setting | Anritsu | BC : In cable-laying | Anritsu Taro |
| 15 | 1650nm | Automatic setting | Automatic setting | Automatic setting | Anritsu | BC : In cable-laying | Anritsu Taro |
| 16 | 1310nm | Automatic setting | Automatic setting | Automatic setting | Anritsu | BC : In cable-laying | Anritsu Taro |
| 17 | 1550nm | Automatic setting | Automatic setting | Automatic setting | Anritsu | BC : In cable-laying | Anritsu Taro |
| 18 | 1650nm | Automatic setting | Automatic setting | Automatic setting | Anritsu | BC : In cable-laying | Anritsu Taro |
| 19 | 1310nm | Automatic setting | Automatic setting | Automatic setting | Anritsu | BC : In cable-laying | Anritsu Taro |
| 20 | 1550nm | Automatic setting | Automatic setting | Automatic setting | Anritsu | BC : In cable-laying | Anritsu Taro |
| 21 | 1650nm | Automatic setting | Automatic setting | Automatic setting | Anritsu | BC : In cable-laying | Anritsu Taro |
| 22 | 1310nm | Automatic setting | Automatic setting | Automatic setting | Anritsu | BC : In cable-laying | Anritsu Taro |
| 23 | 1550nm | Automatic setting | Automatic setting | Automatic setting | Anritsu | BC : In cable-laying | Anritsu Taro |
| 24 | 1650nm | Automatic setting | Automatic setting | Automatic setting | Anritsu | BC : In cable-laying | Anritsu Taro |
| 25 | 1310nm | Automatic setting | Automatic setting | Automatic setting | Anritsu | BC : In cable-laying | Anritsu Taro |
| 26 | 1550nm | Automatic setting | Automatic setting | Automatic setting | Anritsu | BC : In cable-laying | Anritsu Taro |
| 27 | 1650nm | Automatic setting | Automatic setting | Automatic setting | Anritsu | BC : In cable-laying | Anritsu Taro |
| 28 | 1310nm | Automatic setting | Automatic setting | Automatic setting | Anritsu | BC : In cable-laying | Anritsu Taro |
| 29 | 1550nm | Automatic setting | Automatic setting | Automatic setting | Anritsu | BC : In cable-laying | Anritsu Taro |

| Sequential measurement | | | | | | | | |
|---|---|---|---|---|---|---|---|---|
| ATSUGI bureau new cable laying construction | Completion: 0 / 50 | NG: 0 | | Read execution | | | | |
| File name | | Quality | | | New insertion | | | |
| fTest_1310_0.SOR | | | | | | | | |
| fTest_1550_0.SOR | | | | | Initialization | | | |
| fTest_1650_0.SOR | | | | | | | | |
| fTest_1310_1.SOR | | | | | | | | |
| fTest_1550_1.SOR | | | | | | | | |
| fTest_1650_1.SOR | | | | | | | | |
| fTest_1310_2.SOR | | | | | | | | |
| fTest_1550_2.SOR | | | | | | | | |
| fTest_1650_2.SOR | | | | | | | | |
| fTest_1310_3.SOR | | | | | | | | |
| fTest_1550_3.SOR | | | | | | | | |
| fTest_1650_3.SOR | | | | | | | | |
| fTest_1310_4.SOR | | | | | | | | |
| fTest_1550_4.SOR | | | | | | | | |
| Measurer : Anritsu Taro<br>Cable number : SR-4731-1<br>Core wire number : 101_001 | Total loss :<br>Maximum reflectance :<br>Maximum connection loss :<br>Nonconforming place : | | | | | | | |
| Move by up and down keys, and execute reading by decision key | | | | | | | | |
| Measurement | File read | | | | | | | |

FIG. 6

| Sequential measurement | | | | | |
|---|---|---|---|---|---|
| ATSUGI bureau new cable laying construction | Completion: 2 / 50 | NG: 0 | | Read execution | |
| File name | | Quality | | | |
| fTest_1310_0.SOR | | Acceptance | | New insertion | |
| fTest_1550_0.SOR | | Acceptance | | | |
| fTest_1650_0.SOR | | | | Initialization | |
| fTest_1310_1.SOR | | | | | |
| fTest_1550_1.SOR | | | | | |
| fTest_1650_1.SOR | | | | | |
| fTest_1310_2.SOR | | | | | |
| fTest_1550_2.SOR | | | | | |
| fTest_1650_2.SOR | | | | | |
| fTest_1310_3.SOR | | | | | |
| fTest_1550_3.SOR | | | | | |
| fTest_1650_3.SOR | | | | | |
| fTest_1310_4.SOR | | | | | |
| fTest_1550_4.SOR | | | | | |

Measurer : Anritsu Taro          Total loss                          : 12.201dB
Cable number : SR-4731-1         Maximum reflectance                 : 35.192dB
Core wire number : 101_001       Maximum connection loss             : 0.211dB
                                 Nonconforming place                 : 0 place Move by up and down keys, and execute reading by decision key

| Measurement | File read | | | |
|---|---|---|---|---|

| Sequential measurement | | | | |
|---|---|---|---|---|
| ATSUGI bureau new cable laying construction | Completion: 2 / 50 | NG: 0 | Read execution | |
| File name | | Quality | New insertion | |
| fTest_1310_0.SOR | | Acceptance | | |
| fTest_1310_0_New001.SOR | | Acceptance | Initialization | |
| fTest_1550_0.SOR | | | | |
| fTest_1650_0.SOR | | | | |
| fTest_1310_1.SOR | | | | |
| fTest_1550_1.SOR | | | | |
| fTest_1650_1.SOR | | | | |
| fTest_1310_2.SOR | | | | |
| fTest_1550_2.SOR | | | | |
| fTest_1650_2.SOR | | | | |
| fTest_1310_3.SOR | | | | |
| fTest_1550_3.SOR | | | | |
| fTest_1650_3.SOR | | | | |
| fTest_1310_4.SOR | | | | |
| Measurer: Anritsu Taro<br>Cable number: SR-4731-1<br>Core wire number: 101_001 | Total loss :<br>Maximum reflectance :<br>Maximum connection loss :<br>Nonconforming place : | | | |
| Move by up and down keys, and execute reading by decision key | | | | |
| Measurement | File read | | | |

FIG. 7

| | [File name] | [Wavelength] | [Distance range] | [Pulse width] | [Averaging (Number of times)] | [Title] | [Data flag] | [Op |
|---|---|---|---|---|---|---|---|---|
| 1 | fTest_1310_0.SOR | 1310nm | 2.5km | 10ns | 20 | Anritsu | BC : In cable-laying | An |
| 2 | fTest_1550_0.SOR | 1550nm | 2.5km | 20ns | 20 | Anritsu | BC : In cable-laying | An |
| 3 | fTest_1650_0.SOR | 1650nm | 2.5km | 20ns | 20 | Anritsu | BC : In cable-laying | An |
| 4 | fTest_1310_1.SOR | 1310nm | 2.5km | 20ns | 20 | Anritsu | BC : In cable-laying | An |
| 5 | fTest_1550_1.SOR | 1550nm | 2.5km | 20ns | 20 | Anritsu | BC : In cable-laying | An |
| 6 | fTest_1650_1.SOR | 1650nm | 2.5km | 20ns | 20 | Anritsu | BC : In cable-laying | An |
| 7 | fTest_1310_2.SOR | 1310nm | 2.5km | 20ns | 20 | Anritsu | BC : In cable-laying | An |
| 8 | fTest_1550_2.SOR | 1550nm | 2.5km | 20ns | 20 | Anritsu | BC : In cable-laying | An |
| 9 | fTest_1650_2.SOR | 1650nm | 2.5km | 20ns | 20 | Anritsu | BC : In cable-laying | An |
| 10 | fTest_1310_3.SOR | 1310nm | 2.5km | 20ns | 20 | Anritsu | BC : In cable-laying | An |
| 11 | fTest_1550_3.SOR | 1550nm | 2.5km | 20ns | 20 | Anritsu | BC : In cable-laying | An |
| 12 | fTest_1650_3.SOR | 1650nm | 2.5km | 20ns | 20 | Anritsu | BC : In cable-laying | An |
| 13 | fTest_1310_4.SOR | 1310nm | 2.5km | 20ns | 20 | Anritsu | BC : In cable-laying | An |
| 14 | fTest_1550_4.SOR | 1550nm | 2.5km | 20ns | 20 | Anritsu | BC : In cable-laying | An |
| 15 | fTest_1650_4.SOR | 1650nm | 2.5km | 20ns | 20 | Anritsu | BC : In cable-laying | An |
| 16 | fTest_1310_5.SOR | 1310nm | 2.5km | 20ns | 20 | Anritsu | BC : In cable-laying | An |
| 17 | fTest_1550_5.SOR | 1550nm | 2.5km | 20ns | 20 | Anritsu | BC : In cable-laying | An |
| 18 | fTest_1650_5.SOR | 1650nm | 2.5km | 20ns | 20 | Anritsu | BC : In cable-laying | An |
| 19 | fTest_1310_6.SOR | 1310nm | 2.5km | 20ns | 20 | Anritsu | BC : In cable-laying | An |
| 20 | fTest_1550_6.SOR | 1550nm | 2.5km | 20ns | 20 | Anritsu | BC : In cable-laying | An |
| 21 | fTest_1650_6.SOR | 1650nm | 2.5km | 20ns | 20 | Anritsu | BC : In cable-laying | An |
| 22 | fTest_1310_7.SOR | 1310nm | 2.5km | 20ns | 20 | Anritsu | BC : In cable-laying | An |
| 23 | fTest_1550_7.SOR | 1550nm | 2.5km | 20ns | 20 | Anritsu | BC : In cable-laying | An |
| 24 | fTest_1650_7.SOR | 1650nm | 2.5km | 20ns | 20 | Anritsu | BC : In cable-laying | An |
| 25 | fTest_1310_8.SOR | 1310nm | 2.5km | 20ns | 20 | Anritsu | BC : In cable-laying | An |
| 26 | fTest_1550_8.SOR | 1550nm | 2.5km | 20ns | 20 | Anritsu | BC : In cable-laying | An |
| 27 | fTest_1650_8.SOR | 1650nm | 2.5km | 20ns | 20 | Anritsu | BC : In cable-laying | An |
| 28 | fTest_1310_9.SOR | 1310nm | 2.5km | 20ns | 20 | Anritsu | BC : In cable-laying | An |
| 29 | fTest_1550_9.SOR | 1550nm | 2.5km | 20ns | 20 | Anritsu | BC : In cable-laying | An |

FIG. 9A

| | Measurement planning editor | | | | | | | | | |
|---|---|---|---|---|---|---|---|---|---|---|
| File (F) Edit (E) Setting (U) Display (V) Help (H) | | | | | | | | | | |
| New document | Open file | Overwrite | Both-ends | One-end | | | | | | |
| | File name | Core wire name | Core wire number | Measuring state | Wavelength | Distance range | Pulse width | Average |
|---|---|---|---|---|---|---|---|---|
| 1 | Tokyo_Ueno0001(1310nm).SOR | Tokyo_Ueno | 0001 | Measured | 1310nm | 10km | 20ns | 10 |
| 2 | Tokyo_Ueno0001(1550nm).SOR | Tokyo_Ueno | 0001 | Measured | 1550nm | 10km | 20ns | 10 |
| 3 | Tokyo_Ueno0002(1310nm).SOR | Tokyo_Ueno | 0002 | Measured | 1310nm | 25km | 50ns | 5 |
| 4 | Tokyo_Ueno0002(1550nm).SOR | Tokyo_Ueno | 0002 | Measured | 1550nm | 25km | 50ns | 5 |
| 5 | Tokyo_Ueno0003(1310nm).SOR | Tokyo_Ueno | 0003 | Measured | 1310nm | 10km | 20ns | 10 |
| 6 | Tokyo_Ueno0003(1550nm).SOR | Tokyo_Ueno | 0003 | Measured | 1550nm | 10km | 20ns | 10 |
| 7 | Tokyo_Ueno0004(1310nm).SOR | Tokyo_Ueno | 0004 | Measured | 1310nm | 25km | 50ns | 5 |
| 8 | Tokyo_Ueno0004(1550nm).SOR | Tokyo_Ueno | 0004 | Measured | 1550nm | 25km | 50ns | 5 |
| 9 | Tokyo_Ueno0005(1310nm).SOR | Tokyo_Ueno | 0005 | Measured | 1310nm | 10km | 20ns | 10 |
| 10 | Tokyo_Ueno0005(1550nm).SOR | Tokyo_Ueno | 0005 | Measured | 1550nm | 10km | 20ns | 10 |
| 11 | Tokyo_Ueno0006(1310nm).SOR | Tokyo_Ueno | 0006 | Measured | 1310nm | 25km | 50ns | 5 |
| 12 | Tokyo_Ueno0006(1550nm).SOR | Tokyo_Ueno | 0006 | Measured | 1550nm | 25km | 50ns | 5 |
| 13 | Tokyo_Ueno0007(1310nm).SOR | Tokyo_Ueno | 0007 | Measured | 1310nm | 10km | 20ns | 10 |
| 14 | Tokyo_Ueno0007(1550nm).SOR | Tokyo_Ueno | 0007 | Measured | 1550nm | 10km | 20ns | 10 |
| 15 | Tokyo_Ueno0008(1310nm).SOR | Tokyo_Ueno | 0008 | Measured | 1310nm | 25km | 50ns | 5 |
| 16 | Tokyo_Ueno0008(1550nm).SOR | Tokyo_Ueno | 0008 | Measured | 1550nm | 25km | 50ns | 5 |
| 17 | Tokyo_Ueno0009(1310nm).SOR | Tokyo_Ueno | 0009 | Measured | 1310nm | 10km | 20ns | 10 |
| 18 | Tokyo_Ueno0009(1550nm).SOR | Tokyo_Ueno | 0009 | Measured | 1550nm | 10km | 20ns | 10 |
| 19 | Tokyo_Ueno0010(1310nm).SOR | Tokyo_Ueno | 0010 | Measured | 1310nm | 25km | 50ns | 5 |
| 20 | Tokyo_Ueno0010(1550nm).SOR | Tokyo_Ueno | 0010 | Measured | 1550nm | 25km | 50ns | 5 |
| 21 | Tokyo_Ueno0011(1310nm).SOR | Tokyo_Ueno | 0011 | Measured | 1310nm | 10km | 20ns | 10 |
| 22 | Tokyo_Ueno0011(1550nm).SOR | Tokyo_Ueno | 0011 | Measured | 1550nm | 10km | 20ns | 10 |
| 23 | Tokyo_Ueno0012(1310nm).SOR | Tokyo_Ueno | 0012 | Measured | 1310nm | 25km | 50ns | 5 |
| 24 | Tokyo_Ueno0012(1550nm).SOR | Tokyo_Ueno | 0012 | Measured | 1550nm | 25km | 50ns | 5 |
| 25 | Tokyo_Ueno0013(1310nm).SOR | Tokyo_Ueno | 0013 | Measured | 1310nm | 10km | 20ns | 10 |
| 26 | Tokyo_Ueno0013(1550nm).SOR | Tokyo_Ueno | 0013 | Measured | 1550nm | 10km | 20ns | 10 |
| 27 | Tokyo_Ueno0014(1310nm).SOR | Tokyo_Ueno | 0014 | Measured | 1310nm | 25km | 50ns | 5 |
| 28 | Tokyo_Ueno0014(1550nm).SOR | Tokyo_Ueno | 0014 | Measured | 1550nm | 25km | 50ns | 5 |
| 29 | Tokyo_Ueno0015(1310nm).SOR | Tokyo_Ueno | 0015 | Measured | 1310nm | 10km | 20ns | 10 |

FIG. 9B

| | Wavelength | Distance range | Pulse width | Averaging (Number of times) | Title | Data flag | Operator |
|---|---|---|---|---|---|---|---|
| 1 | 1310nm | 10km | 20ns | 10 | Anritsu | BC : In cable-laying | Anritsu Taro |
| 2 | 1550nm | 10km | 20ns | 10 | Anritsu | BC : In cable-laying | Anritsu Taro |
| 3 | 1650nm | 25km | 50ns | 5 | Anritsu | BC : In cable-laying | Anritsu Taro |
| 4 | 1310nm | 25km | 50ns | 5 | Anritsu | BC : In cable-laying | Anritsu Taro |
| 5 | 1550nm | 10km | 20ns | 10 | Anritsu | BC : In cable-laying | Anritsu Taro |
| 6 | 1650nm | 10km | 20ns | 10 | Anritsu | BC : In cable-laying | Anritsu Taro |
| 7 | 1310nm | 25km | 50ns | 5 | Anritsu | BC : In cable-laying | Anritsu Taro |
| 8 | 1550nm | 25km | 50ns | 5 | Anritsu | BC : In cable-laying | Anritsu Taro |
| 9 | 1650nm | 10km | 20ns | 10 | Anritsu | BC : In cable-laying | Anritsu Taro |
| 10 | 1310nm | 10km | 20ns | 10 | Anritsu | BC : In cable-laying | Anritsu Taro |
| 11 | 1550nm | 25km | 50ns | 5 | Anritsu | BC : In cable-laying | Anritsu Taro |
| 12 | 1650nm | 25km | 50ns | 5 | Anritsu | BC : In cable-laying | Anritsu Taro |
| 13 | 1310nm | 10km | 20ns | 10 | Anritsu | BC : In cable-laying | Anritsu Taro |
| 14 | 1550nm | 10km | 20ns | 10 | Anritsu | BC : In cable-laying | Anritsu Taro |
| 15 | 1650nm | 25km | 50ns | 5 | Anritsu | BC : In cable-laying | Anritsu Taro |
| 16 | 1310nm | 25km | 50ns | 5 | Anritsu | BC : In cable-laying | Anritsu Taro |
| 17 | 1550nm | 10km | 20ns | 10 | Anritsu | BC : In cable-laying | Anritsu Taro |
| 18 | 1650nm | 10km | 20ns | 10 | Anritsu | BC : In cable-laying | Anritsu Taro |
| 19 | 1310nm | 25km | 50ns | 5 | Anritsu | BC : In cable-laying | Anritsu Taro |
| 20 | 1550nm | 25km | 50ns | 5 | Anritsu | BC : In cable-laying | Anritsu Taro |
| 21 | 1650nm | 10km | 20ns | 10 | Anritsu | BC : In cable-laying | Anritsu Taro |
| 22 | 1310nm | 10km | 20ns | 10 | Anritsu | BC : In cable-laying | Anritsu Taro |
| 23 | 1550nm | 25km | 50ns | 5 | Anritsu | BC : In cable-laying | Anritsu Taro |
| 24 | 1650nm | 25km | 50ns | 5 | Anritsu | BC : In cable-laying | Anritsu Taro |
| 25 | 1310nm | 10km | 20ns | 10 | Anritsu | BC : In cable-laying | Anritsu Taro |
| 26 | 1550nm | 10km | 20ns | 10 | Anritsu | BC : In cable-laying | Anritsu Taro |
| 27 | 1650nm | 25km | 50ns | 5 | Anritsu | BC : In cable-laying | Anritsu Taro |
| 28 | 1310nm | 25km | 50ns | 5 | Anritsu | BC : In cable-laying | Anritsu Taro |
| 29 | 1550nm | 10km | 20ns | 10 | Anritsu | BC : In cable-laying | Anritsu Taro |

FIG. 9C

Optical pulse test results

File name : FTest_1310_0.SDR    2005/11/01 18:01:00

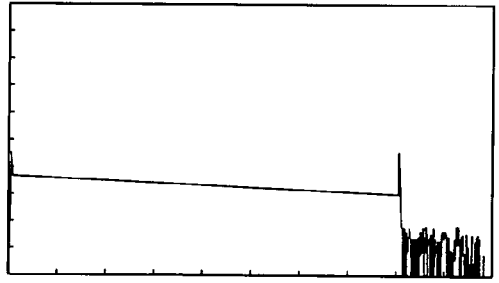

| Wavelength | : | 1310.0 nm | Connection loss : | 0.000 dB |
| Distance range | : | 10.1 km | Return loss | : | 0.000 dB |
| Pulse width | : | 100.0 ns | Total loss | : | 0.000 dB |
| Average | : | 60 | Horizontal scale : 1.01351 km/div |
| Start | : | 0.00000 km | Horizontal shift : 0.00000 km |
| End | : | 10.13514 km | Vertical scale | : | 14.000 dB/div |
| IOR | : | 1.48000 | Vertical shift | : | 10.000 dB |

File name : FTest_1310_0.SDR    2005/11/01 18:01:00

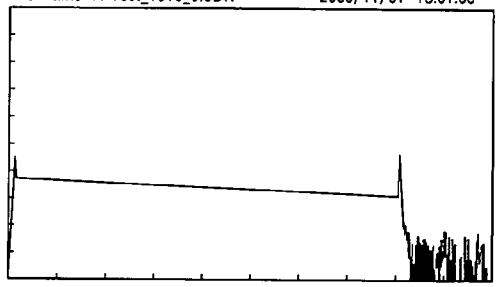

| Wavelength | : | 1310.0 nm | Connection loss : | 0.000 dB |
| Distance range | : | 10.1 km | Return loss | : | 0.000 dB |
| Pulse width | : | 100.0 ns | Total loss | : | 0.000 dB |
| Average | : | 60 | Horizontal scale : 1.01351 km/div |
| Start | : | 0.00000 km | Horizontal shift : 0.00000 km |
| End | : | 10.13514 km | Vertical scale | : | 14.000 dB/div |
| IOR | : | 1.48000 | Vertical shift | : | 10.000 dB |

File name : FTest_1310_0.SDR    2005/11/01 18:01:00

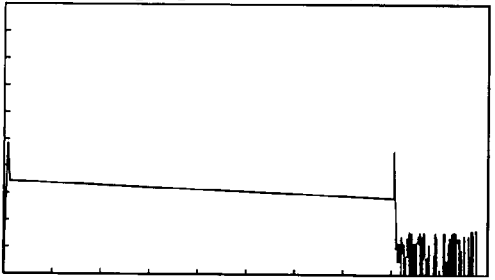

| Wavelength | : | 1550.0 nm | Connection loss : | 0.000 dB |
| Distance range | : | 10.1 km | Return loss | : | 0.000 dB |
| Pulse width | : | 100.0 ns | Total loss | : | 0.000 dB |
| Average | : | 60 | Horizontal scale : 1.01351 km/div |
| Start | : | 0.00000 km | Horizontal shift : 0.00000 km |
| End | : | 10.13514 km | Vertical scale | : | 14.000 dB/div |
| IOR | : | 1.48000 | Vertical shift | : | 10.000 dB |

File name : FTest_1310_0.SDR    2005/11/01 18:01:00

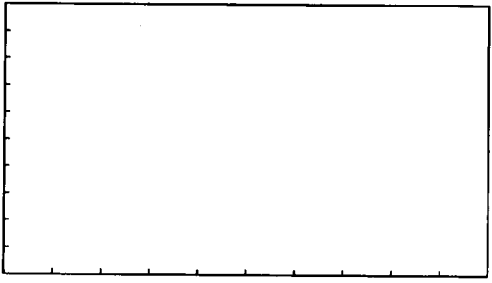

| Wavelength | : | 1650.0 nm | Connection loss : | dB |
| Distance range | : | 10.1 km | Return loss | : | dB |
| Pulse width | : | 100.0 ns | Total loss | : | dB |
| Average | : | 60 | Horizontal scale : km/div |
| Start | : | 0.00000 km | Horizontal shift : km |
| End | : | 10.13514 km | Vertical scale | : | dB/div |
| IOR | : | 1.48000 | Vertical shift | : | dB |

FIG. 10A

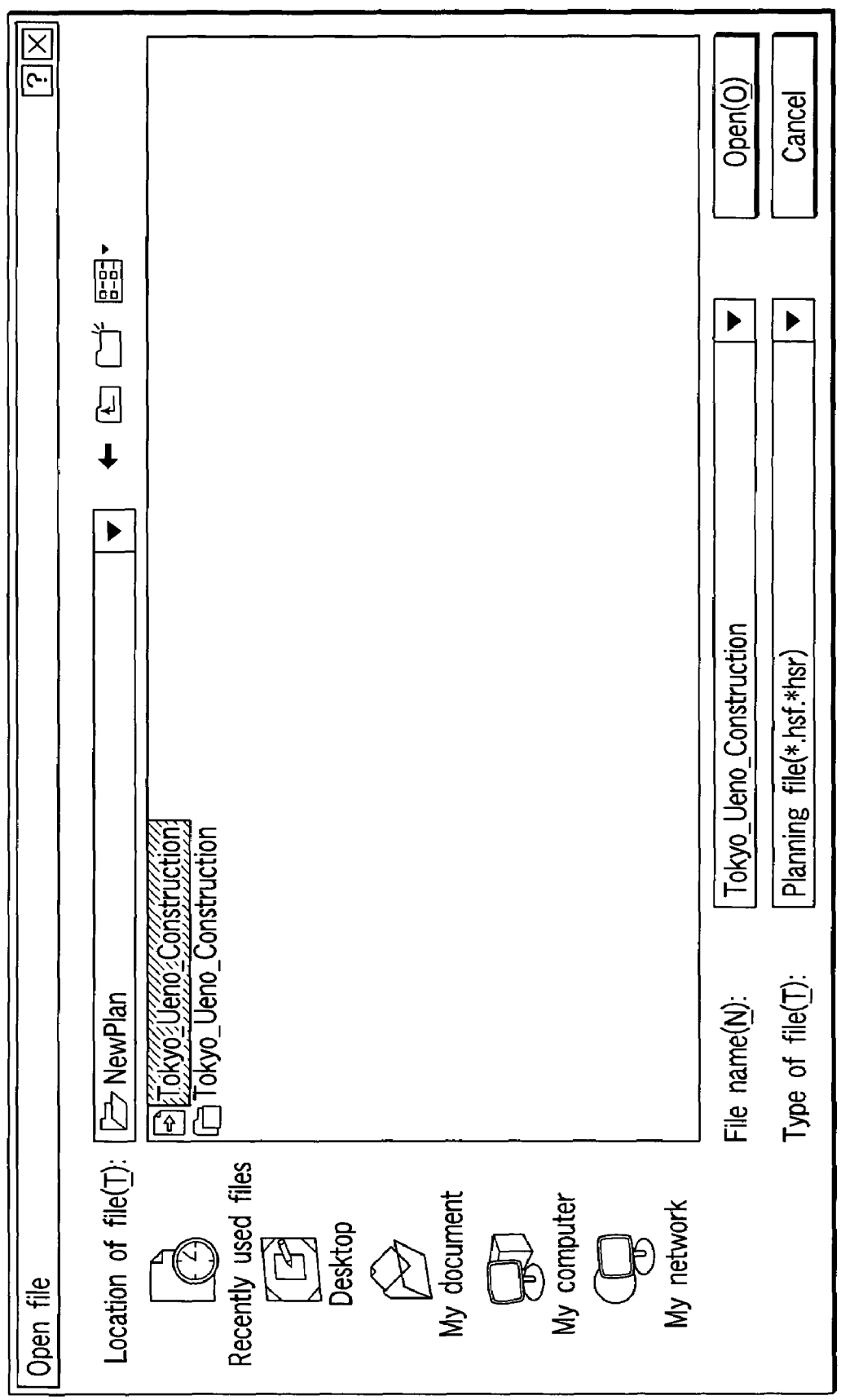
F I G. 10C

Optical pulse results A

| Measurement zone | | | | | Measurement date | | | |
|---|---|---|---|---|---|---|---|---|
| Cable type | | | | | Measurer | | | |
| Cable actual length | | | | | Measurement wavelength | | | |
| Number of connection points (c) | | | | | Measuring instrument | | | |
| Number of connection points (n) | | | | | Measuring end (upper side) | | | |
| Operation classification | | | | | Measuring end (lower side) | | | |

| File name | Wavelength (nm) | Distance (km) | Pulse width(ns) | IOR | Averaging | Fiber length(km) | Total loss (dB) | Total return loss(dB) |
|---|---|---|---|---|---|---|---|---|
| Tokyo_Ueno0001(1310nm).SOR | 1310 | 10.0 | 20 | 1.46550 | 10(10s) | 6.391 | 2.172 | 25.010 |
| Tokyo_Ueno0002(1310nm).SOR | 1310 | 25.0 | 50 | 1.46550 | 5(7s) | 12.912 | 4.723 | 24.181 |
| Tokyo_Ueno0003(1310nm).SOR | 1310 | 10.0 | 20 | 1.46550 | 10(10s) | 6.008 | 2.038 | 23.119 |
| Tokyo_Ueno0004(1310nm).SOR | 1310 | 25.0 | 50 | 1.46550 | 5(7s) | 12.912 | 4.704 | 24.181 |
| Tokyo_Ueno0005(1310nm).SOR | 1310 | 10.0 | 20 | 1.46550 | 10(10s) | 6.391 | 2.163 | 22.762 |
| Tokyo_Ueno0006(1310nm).SOR | 1310 | 25.0 | 50 | 1.46550 | 5(7s) | 12.912 | 4.707 | 24.220 |
| Tokyo_Ueno0007(1310nm).SOR | 1310 | 10.0 | 20 | 1.46550 | 10(10s) | 6.391 | 2.170 | 31.530 |
| Tokyo_Ueno0008(1310nm).SOR | 1310 | 25.0 | 50 | 1.46550 | 5(7s) | 12.912 | 4.761 | 24.205 |
| Tokyo_Ueno0009(1310nm).SOR | 1310 | 10.0 | 20 | 1.46550 | 10(10s) | 6.391 | 2.167 | 28.725 |
| Tokyo_Ueno0010(1310nm).SOR | 1310 | 25.0 | 50 | 1.46550 | 5(7s) | 12.912 | 4.731 | 24.177 |
| Tokyo_Ueno0011(1310nm).SOR | 1310 | 10.0 | 20 | 1.46550 | 10(10s) | 6.391 | 2.169 | 28.156 |
| Tokyo_Ueno0012(1310nm).SOR | 1310 | 25.0 | 50 | 1.46550 | 5(7s) | 12.912 | 4.634 | 24.156 |
| Tokyo_Ueno0013(1310nm).SOR | 1310 | 10.0 | 20 | 1.46550 | 10(10s) | 6.391 | 2.143 | 28.284 |
| Tokyo_Ueno0014(1310nm).SOR | 1310 | 25.0 | 50 | 1.46550 | 5(7s) | 12.912 | 4.775 | 24.210 |
| Tokyo_Ueno0015(1310nm).SOR | 1310 | 10.0 | 20 | 1.46550 | 10(10s) | 6.391 | 2.167 | 28.163 |
| Tokyo_Ueno0016(1310nm).SOR | 1310 | 25.0 | 50 | 1.46550 | 5(7s) | 12.912 | 4.711 | 24.189 |
| Tokyo_Ueno0017(1310nm).SOR | 1310 | 10.0 | 20 | 1.46550 | 10(10s) | 6.391 | 2.167 | 28.201 |
| Tokyo_Ueno0018(1310nm).SOR | 1310 | 25.0 | 50 | 1.46550 | 5(7s) | 12.912 | 4.626 | 24.142 |
| Tokyo_Ueno0019(1310nm).SOR | 1310 | 10.0 | 20 | 1.46550 | 10(10s) | 6.391 | 2.164 | 28.171 |
| Tokyo_Ueno0020(1310nm).SOR | 1310 | 25.0 | 50 | 1.46550 | 5(7s) | 12.912 | 4.713 | 24.226 |
| Tokyo_Ueno0001(1550nm).SOR | 1550 | 10.0 | 20 | 1.46610 | 10(10s) | 6.390 | 1.230 | 19.784 |
| Tokyo_Ueno0002(1550nm).SOR | 1550 | 25.0 | 50 | 1.46610 | 5(7s) | 12.907 | 3.045 | 14.668 |
| Tokyo_Ueno0003(1550nm).SOR | 1550 | 10.0 | 20 | 1.46610 | 10(10s) | 6.390 | 1.146 | 18.830 |
| Tokyo_Ueno0004(1550nm).SOR | 1550 | 25.0 | 50 | 1.46610 | 5(7s) | 12.907 | 2.909 | 14.671 |
| Tokyo_Ueno0005(1550nm).SOR | 1550 | 10.0 | 20 | 1.46610 | 10(10s) | 6.388 | 1.222 | 17.989 |
| Tokyo_Ueno0006(1550nm).SOR | 1550 | 25.0 | 50 | 1.46610 | 5(7s) | 12.907 | 3.012 | 14.664 |
| Tokyo_Ueno0007(1550nm).SOR | 1550 | 10.0 | 20 | 1.46610 | 10(10s) | 6.390 | 1.160 | 17.313 |
| Tokyo_Ueno0008(1550nm).SOR | 1550 | 25.0 | 50 | 1.46610 | 5(7s) | 12.907 | 2.920 | 14.659 |
| Tokyo_Ueno0009(1550nm).SOR | 1550 | 10.0 | 20 | 1.46610 | 10(10s) | 6.388 | 2.032 | 16.553 |
| Tokyo_Ueno0010(1550nm).SOR | 1550 | 25.0 | 50 | 1.46610 | 5(7s) | 12.907 | 3.007 | 14.729 |
| Tokyo_Ueno0011(1550nm).SOR | 1550 | 10.0 | 20 | 1.46610 | 10(10s) | 6.390 | 2.351 | 16.626 |
| Tokyo_Ueno0012(1550nm).SOR | 1550 | 25.0 | 50 | 1.46610 | 5(7s) | 12.907 | 2.997 | 14.705 |
| Tokyo_Ueno0013(1550nm).SOR | 1550 | 10.0 | 20 | 1.46610 | 10(10s) | 6.388 | 2.424 | 16.635 |
| Tokyo_Ueno0014(1550nm).SOR | 1550 | 25.0 | 50 | 1.46610 | 5(7s) | 12.907 | 3.007 | 14.717 |
| Tokyo_Ueno0015(1550nm).SOR | 1550 | 10.0 | 20 | 1.46610 | 10(10s) | 6.388 | 2.062 | 16.679 |
| Tokyo_Ueno0016(1550nm).SOR | 1550 | 25.0 | 50 | 1.46610 | 5(7s) | 12.907 | 2.980 | 14.709 |
| Tokyo_Ueno0017(1550nm).SOR | 1550 | 10.0 | 20 | 1.46610 | 10(10s) | 6.388 | 1.234 | 16.696 |
| Tokyo_Ueno0018(1550nm).SOR | 1550 | 25.0 | 50 | 1.46610 | 5(7s) | 12.907 | 2.993 | 14.670 |
| Tokyo_Ueno0019(1550nm).SOR | 1550 | 10.0 | 20 | 1.46610 | 10(10s) | 6.388 | 1.201 | 16.628 |
| Tokyo_Ueno0020(1550nm).SOR | 1550 | 25.0 | 50 | 1.46610 | 5(7s) | 12.907 | 3.077 | 14.753 |

FIG. 10P

| | [File name] | [Wavelength] | [Distance range] | [Pulse width] | [Averaging Number of times] | [Title] | [Data flag] | [Op |
|---|---|---|---|---|---|---|---|---|
| 1 | fTest_1310_0.SOR | 1310nm | Automatic setting | Automatic setting | Automatic setting | Anritsu | BC : In cable-laying | An |
| 2 | fTest_1550_0.SOR | 1550nm | Automatic setting | Automatic setting | Automatic setting | Anritsu | BC : In cable-laying | An |
| 3 | fTest_1650_0.SOR | 1650nm | Automatic setting | Automatic setting | Automatic setting | Anritsu | BC : In cable-laying | An |
| 4 | fTest_1310_1.SOR | 1310nm | Automatic setting | Automatic setting | Automatic setting | Anritsu | BC : In cable-laying | An |
| 5 | fTest_1550_1.SOR | 1550nm | Automatic setting | Automatic setting | Automatic setting | Anritsu | BC : In cable-laying | An |
| 6 | fTest_1650_1.SOR | 1650nm | Automatic setting | Automatic setting | Automatic setting | Anritsu | BC : In cable-laying | An |
| 7 | *fTest_1310_2.SOR* | *1310nm* | *Automatic setting* | *Automatic setting* | *Automatic setting* | *Anritsu* | *BC : In cable-laying* | *An* |
| 8 | fTest_1550_2.SOR | 1550nm | Automatic setting | Automatic setting | Automatic setting | Anritsu | BC : In cable-laying | An |
| 9 | fTest_1650_2.SOR | 1650nm | Automatic setting | Automatic setting | Automatic setting | Anritsu | BC : In cable-laying | An |
| 10 | fTest_1310_3.SOR | 1310nm | Automatic setting | Automatic setting | Automatic setting | Anritsu | BC : In cable-laying | An |
| 11 | fTest_1550_3.SOR | 1550nm | Automatic setting | Automatic setting | Automatic setting | Anritsu | BC : In cable-laying | An |
| 12 | fTest_1650_3.SOR | 1650nm | Automatic setting | Automatic setting | Automatic setting | Anritsu | BC : In cable-laying | An |
| 13 | fTest_1310_4.SOR | 1310nm | Automatic setting | Automatic setting | Automatic setting | Anritsu | BC : In cable-laying | An |
| 14 | fTest_1550_4.SOR | 1550nm | Automatic setting | Automatic setting | Automatic setting | Anritsu | BC : In cable-laying | An |
| 15 | fTest_1650_4.SOR | 1650nm | Automatic setting | Automatic setting | Automatic setting | Anritsu | BC : In cable-laying | An |
| 16 | fTest_1310_5.SOR | 1310nm | Automatic setting | Automatic setting | Automatic setting | Anritsu | BC : In cable-laying | An |
| 17 | fTest_1550_5.SOR | 1550nm | Automatic setting | Automatic setting | Automatic setting | Anritsu | BC : In cable-laying | An |
| 18 | fTest_1650_5.SOR | 1650nm | Automatic setting | Automatic setting | Automatic setting | Anritsu | BC : In cable-laying | An |
| 19 | fTest_1310_6.SOR | 1310nm | Automatic setting | Automatic setting | Automatic setting | Anritsu | BC : In cable-laying | An |
| 20 | fTest_1550_6.SOR | 1550nm | Automatic setting | Automatic setting | Automatic setting | Anritsu | BC : In cable-laying | An |
| 21 | fTest_1650_6.SOR | 1650nm | Automatic setting | Automatic setting | Automatic setting | Anritsu | BC : In cable-laying | An |
| 22 | fTest_1310_7.SOR | 1310nm | Automatic setting | Automatic setting | Automatic setting | Anritsu | BC : In cable-laying | An |
| 23 | fTest_1550_7.SOR | 1550nm | Automatic setting | Automatic setting | Automatic setting | Anritsu | BC : In cable-laying | An |
| 24 | fTest_1650_7.SOR | 1650nm | Automatic setting | Automatic setting | Automatic setting | Anritsu | BC : In cable-laying | An |
| 25 | fTest_1310_8.SOR | 1310nm | Automatic setting | Automatic setting | Automatic setting | Anritsu | BC : In cable-laying | An |
| 26 | fTest_1550_8.SOR | 1550nm | Automatic setting | Automatic setting | Automatic setting | Anritsu | BC : In cable-laying | An |
| 27 | fTest_1650_8.SOR | 1650nm | Automatic setting | Automatic setting | Automatic setting | Anritsu | BC : In cable-laying | An |
| 28 | fTest_1310_9.SOR | 1310nm | Automatic setting | Automatic setting | Automatic setting | Anritsu | BC : In cable-laying | An |
| 29 | fTest_1550_9.SOR | 1550nm | Automatic setting | Automatic setting | Automatic setting | Anritsu | BC : In cable-laying | An |

F I G. 11

| Sequential measurement | | | | | | | |
|---|---|---|---|---|---|---|---|
| ATSUGI bureau new cable laying construction | Completion: 2 / 50 | NG: 0 | | Read execution | | | |
| File name | | Quality | | | | | |
| fTest_1310_0.SOR | | Acceptance | | New insertion | | | |
| fTest_1550_0.SOR | | Acceptance | | | | | |
| fTest_1650_0.SOR | | | | Initialization | | | |
| fTest_1310_1.SOR Skip | | | | | | | |
| fTest_1550_1.SOR | | | | | | | |
| fTest_1650_1.SOR Skip | | | | | | | |
| fTest_1310_2.SOR | | | | | | | |
| fTest_1550_2.SOR | | | | | | | |
| fTest_1650_2.SOR | | | | | | | |
| fTest_1310_3.SOR | | | | | | | |
| fTest_1550_3.SOR | | | | | | | |
| fTest_1650_3.SOR | | | | | | | |
| fTest_1310_4.SOR Skip | | | | | | | |
| fTest_1550_4.SOR | | | | | | | |

Measurer : Anritsu Taro  Total loss              : 12.201dB
Cable number : SR-4731-1  Maximum reflectance     : 35.192dB
Core wire number : 101_001  Maximum connection loss : 0.211dB
                            Nonconforming place     : 0 place Move by up and down keys, and execute reading by decision key

| Measurement | File read | | |
|---|---|---|---|

F I G. 12

OPTICAL TIME DOMAIN REFLECTOMETER, AND OPTICAL FIBER MEASURING METHOD AND OPTICAL FIBER MEASURING SYSTEM USING THE SAME

This application is a U.S. National Phase Application Under 35 USC 371 of International Application PCT/JP2006/321762 filed Oct. 31, 2006.

TECHNICAL FIELD

The present invention relates to an optical time domain reflectometer, and an optical fiber measuring method and an optical fiber measuring system using the same, and particularly to an optical time domain reflectometer using a technique in which it is possible to easily and efficiently carry out various characteristic evaluations of fault localization, loss measurement, and the like of optical fibers including multicore optical fibers which are laid down, and also relates to an optical fiber measuring method and an optical fiber measuring system using the same.

BACKGROUND ART

Conventionally, in order to inspect the states of connection points and other fault points of optical fibers laid down as optical communication lines, an optical time domain reflectometer (OTDR), more commonly known as an optical pulse tester, has been used.

This OTDR is connected to one end of an optical fiber to be measured, and a measuring pulsed light is incident into the optical fiber from the one end, which makes it possible to measure various losses in the optical fiber, to identify locations of losses, to measure the position of the far end, and the like based on an arrival time and a level of received light of a reflected light (backscattered light) returned from the optical fiber.

As such an OTDR, for example, an optical pulse tester disclosed in Pat. Document 1 is well known.

FIG. 14 is a schematic block diagram showing a general OTDR disclosed in Pat. Document 1.

As shown in FIG. 14, the OTDR disclosed in Pat. Document 1 makes a pulse current at a driving circuit 102 by an electric pulse from a timing generating unit 101, and makes a light source 103 emit light.

An optical pulse emitted from the light source 103 passes thorough an optical directional coupler 104 to be incident into an optical fiber 110.

Then, a return light such as a backscattered light, a reflected light, or the like from the optical fiber 110 is transmitted from the optical directional coupler 104 to an optical receiver 105.

This optical receiver 105 transforms the received light into an electric signal to be transmitted to an amplifier 106.

In this manner, after outputs from the optical receiver 105 are amplified by the amplifier 106, they are transformed into digital signals, and are summed and averaged by an average response processor 107.

The summed and averaged output from the average response processor 107 is logarithmically converted by a logarithmic conversion unit 108, and thereafter, the converted data is displayed on a display unit 109.

Such a structure is a structure of a conventional general OTDR.

In the OTDR shown in FIG. 14, in order to make an attempt to equate signal-to-noise ratios of measured waveforms, a signal-to-noise ratio comparison unit 111 and a data storage unit 112 are further provided.

Namely, the data logarithmically converted at the logarithmic conversion unit 108 is transmitted to the signal-to-noise ratio comparison unit 111 to be compared with a set value set in advance in the signal-to-noise ratio comparison unit 111.

The data whose signal-to-noise ratio has been improved by carrying out summing and averaging or the like at the average response processor 107 again based on the comparison result from the signal-to-noise ratio comparison unit 111 is transmitted to the data storage unit 112.

The data storage unit 112 combines the data whose signal-to-noise ratio has been improved and data which has been stored in advance in the data storage unit 112, and transmits the combined data to the display unit 109.

Incidentally, as a series of operation processes of a current cable laying/maintenance construction of an optical fiber, first, an operator measures an optical fiber serving as a measuring object by using an OTDR, and stores measured data thereof into an external storage medium, for example, a floppy (registered trademark) disk, a memory card, a USB memory, or the like, or an internal memory built into the OTDR, and brings it back from a work site to an office.

Further, the operator makes notes of information such as a core wire number, a core wire name, and the like on the measured optical fiber at the time of recording measured data, and records such so as to associate the measured optical fiber with the measured data.

Then, the operator generates a report by using a report generator application operating on a terminal machine such as, for example, a personal computer while comparing the measured data brought back to the office and the notes, and ends the series of cable laying/maintenance constructions are completed by delivering the report to relevant departments.

However, in accordance with operation processes in such a series of cable laying/maintenance constructions, it is necessary for the operator to generate a report while carrying out association for every optical fiber by comparing measured data of all the optical fibers and note-based information, in the case of a construction in which laying and characteristic evaluations of several hundred multicore optical fibers are carried out per day. This brings about a problem that the report generation work is extremely troublesome.

In order to solve such a problem, in the case of a cable laying/maintenance construction in which laying and characteristic evaluations of several hundred optical fibers are carried out per day, in order to reduce these works, a cable laying/maintenance construction using an optical fiber measuring method called "sequential measurement" has been carried out in which a series of measurement procedures (measurement conditions, a distance range, a pulse width, a wavelength, and the like), and file naming rules are provided in advance, and measured data of an optical fiber are recorded in a file by automatically executing evaluative measurement by connecting an optical fiber to an OTDR.

However, even by such "sequential measurement", in fact, there are cases in which the relevance between the file name set in advance and the optical fiber actually measured disappears due to a change in a file name set in advance, skipping of measurement of optical fibers depending on progress, changes in operations of a cable laying/maintenance construction, and the situation of a measuring site or an optical fiber. Therefore, there is the problem that it is impossible to flexibly respond to the situation on-site by procedures of such "sequential measurement".

Further, in a file recorded by such "sequential measurement", there is less relevance between a file name set in advance and measured data in which an optical fiber has been actually measured and recorded. Therefore, when an operator brings a file in which measured data of an optical fiber has been recorded back to an office to generate a report, it is sometimes necessary to verify the relevance between the measured data and the file name again, or to change the file name, and therefore, there is a problem that it requires more operation time, which is troublesome in the same way as a usual cable laying/maintenance construction.

Pat. Document 1: Jpn. Pat. Appln. KOKAI Publication No. 4-158237

DISCLOSURE OF INVENTION

In order to solve the problems in the conventional technology as described above, an object of the present invention is, in particular, to provide an optical time domain reflectometer using a technique by which it is possible to reduce the load imposed on a cable laying/maintenance construction by simplifying an operation status according to laying/characteristic evaluations of a multicore optical fiber, and to provide an optical fiber measuring method and an optical fiber measuring system which use the same.

In order to achieve the above-described object, according to a first aspect of the present invention, there is provided an optical time domain reflectometer comprising:

a display unit (28) which displays optical fiber management information on a plurality of optical fibers (F) serving as measuring objects in a tabular form;

an operating unit (29) which selects an arbitrary optical fiber (F) to be measured from among the optical fiber management information on the plurality of optical fibers (F) serving as measuring objects displayed in a tabular form by the display unit (28); and a storage unit (22) which stores various characteristics of the arbitrary optical fiber (F) selected by the operating unit (29) such that measured data of the various characteristics of the arbitrary optical fiber (F) which have been measured based on corresponding optical fiber management information among the optical fiber management information on the plurality of optical fibers (F) serving as measuring objects, and the corresponding optical fiber management information thereof are associated with one another, wherein the display unit (28) is capable of displaying the measured data of the various characteristics of the arbitrary optical fiber (F) and the corresponding optical fiber management information thereof which have been stored so to be associated with one another in the storage unit (22), in a predetermined form.

In order to achieve the above-described object, according to a second aspect of the present invention, there is provided the optical time domain reflectometer according to the first aspect, further comprising:

table file reading means (21) for reading a table file from outside which is for carrying out association of the plurality of optical fibers (F) serving as measuring objects with respective measured data when the plurality of optical fibers (F) have been measured, based on optical fiber management information provided in advance of undertaking a cable laying/maintenance construction including various types of information on the plurality of optical fibers (F) serving as measuring objects, and information on a construction site, as the optical fiber management information, the table file being created such that the association of the plurality of optical fibers (F) serving as measuring objects with the respective measured data when the plurality of optical fibers (F) have been measured can be edited at the time of undertaking the cable laying/maintenance construction;

table file editing means (23a) for editing the table file read by the table file reading means (21); and optical fiber characteristic measuring means (30: 24, 25, 26, 27) for measuring the plurality of optical fibers (F) serving as measuring objects based on the table file read by the table file reading means (21) and the table file edited by the table file editing means (23a), wherein the storage unit (22) includes:

measured result storing means (22b) for storing measured result data in which the plurality of optical fibers (F) serving as measuring objects measured by the optical fiber characteristic measuring means (30: 24, 25, 26, 27), and the respective measured data of the plurality of optical fibers (F) have been associated with one another; and edited result storing means (22c) for storing edited result data expressing edited contents when the table file has been edited by the table file editing means (23a), and measured result data measured by the optical fiber characteristic measuring means (30: 24, 25, 26, 27) based on the edited contents, the display unit (28) is capable of selectively displaying at least a screen in a tabular form on which the plurality of optical fibers (F) serving as measuring objects are displayed so as to be visible at one view in accordance with the table file read by the table file reading means (21), and a screen on which the plurality of optical fibers (F) serving as measuring objects measured by the optical fiber characteristic measuring means (30: 24, 25, 26, 27), and the respective measured data of the plurality of optical fibers (F) are displayed so as to be associated with one another, the table file editing means (23a) is capable of editing the table file by displaying the screen in a tabular form on which the plurality of optical fibers (F) serving as measuring objects are displayed so as to be visible at one view, on the display unit (28) at the time of editing the table file, the optical fiber characteristic measuring means (30: 24, 25, 26, 27) displays the screen on which the plurality of optical fibers (F) serving as measuring objects and the respective measured data of the plurality of optical fibers (F) are displayed so as to be associated with one another, on the display unit (28) at the time of measuring the plurality of optical fibers (F) serving as measuring objects, and the measured result data stored in the measured result storing means (22b) and the edited result data stored in the edited result storing means (22c) can be transmitted to the outside in order to externally generate a report on the plurality of optical fibers (F) serving as measuring objects measured by the optical fiber characteristic measuring means (30: 24, 25, 26, 27).

In order to achieve the above-described object, according to a third aspect of the present invention, there is provided the optical time domain reflectometer according to the second aspect, wherein the contents of the table file which can be edited by the table file editing means (23a) includes at least one of a "new insertion" mode in which an optical fiber F to be measured is newly added to the table file, an "initialization" mode in which, even when measurement has been already completed and measured results have been associated, it is possible to return to an unmeasured state by erasing all data, a "measurement" mode in which it is possible to update measured results by remeasuring characteristics of a desired optical fiber F, and a "read execution" mode in which the screen is switched to a screen on which details of measured contents are displayed, and it is possible to edit respective items.

In order to achieve the above-described object, according to a fourth aspect of the present invention, there is provided the optical time domain reflectometer according to the second aspect, wherein the table file storing means (22a) which stores the table file read by the table file reading means (21), the measured result storing means (22b), and the edited result storing means (22c) are external storage media which are freely attachable and detachable.

In order to achieve the above-described object, according to a fifth aspect of the present invention, there is provided the optical time domain reflectometer according to the second aspect, further comprising a communication unit (21) which transmits the measured result data stored in the measured result storing means (22b) and the edited result data stored in the edited result storing means (22c) to the outside when the measured result storing means (22b) and the edited result storing means (22c) are internal storage media.

In order to achieve the above-described object, according to a sixth aspect of the present invention, there is provided the optical time domain reflectometer according to the second aspect, wherein the table file reading means (21) includes a communication unit (21) which is for reading the table file via communication from the outside.

In order to achieve the above-described object, according to a seventh aspect of the present invention, there is provided an optical fiber measuring system which measures various characteristics of a plurality of optical fibers (F) serving as measuring objects by using an optical time domain reflectometer (20) and an external terminal (10), wherein the optical time domain reflectometer (20) comprises:

a display unit (28) which displays optical fiber management information on the plurality of optical fibers (F) serving as measuring objects in a tabular form;

an operating unit (29) which selects an arbitrary optical fiber (F) to be measured from among the optical fiber management information on the plurality of optical fibers (F) serving as measuring objects displayed in a tabular form by the display unit (28); and a storage unit (22) which stores various characteristics of the arbitrary optical fiber (F) selected by the operating unit (29) such that measured data of the various characteristics of the arbitrary optical fiber (F) measured based on corresponding optical fiber management information among the optical fiber management information on the plurality of optical fibers (F) serving as measuring objects, and the corresponding optical fiber management information thereof are associated with one another, the display unit (28) is capable of displaying the measured data of the various characteristics of the arbitrary optical fiber (F) and the corresponding optical fiber management information thereof which have been stored so as to be associated with one another in the storage unit (22), in a predetermined form, the external terminal (10) includes table file creating means (12a) for allowing to create the table file to be finally created by sequentially indicating, by the display unit (14), guidance including an initial menu screen for creating a table file which is for carrying out association of the plurality of optical fibers (F) serving as measuring objects with measured data when the plurality of optical fibers (F) have been measured based on optical fiber management information provided in advance of undertaking a cable laying/maintenance construction including various types of information on the plurality of optical fibers (F) serving as measuring objects, and information on a construction site, as the optical fiber management information, the table file in which the association can be edited at the time of undertaking the cable laying/maintenance construction, an input screen for individually inputting the optical fiber management information provided in advance, and a file screen in a tabular form on which the plurality of optical fibers (F) serving as measuring objects are displayed so as to be visible at one view as a table file to be finally created, and the optical time domain reflectometer (20) measures the various characteristics of the optical fibers (F) serving as measuring objects based on the table file created by the external terminal (10).

In order to achieve the above-described object, according to an eighth aspect of the present invention, there is provided the optical fiber measuring system according to the seventh aspect, wherein the optical time domain reflectometer (20) further comprises:

table file reading means (21) for reading the table file created by the external terminal (10);

table file editing means (23a) for editing the table file read by the table file reading means (21); and optical fiber characteristic measuring means (30: 24, 25, 26, 27) for measuring the optical fibers (F) serving as measuring objects based on the table file read by the table file reading means (21) and the table file edited by the table file editing means (23a), the storage unit (22) includes:

measured result storing means (22b) for storing measured result data in which the plurality of optical fibers (F) serving as measuring objects measured by the optical fiber characteristic measuring means (30; 24, 25, 26, 27), and respective measured data of the plurality of optical fibers (F) have been associated with one another; and edited result storing means (22c) for storing edited result data expressing edited contents when the table file has been edited by the table file editing means (23a), and measured result data measured by the optical fiber characteristic measuring means (30: 24, 25, 26, 27) based on the edited contents, the display unit (28) is capable of selectively displaying at least a screen in a tabular form on which the plurality of optical fibers (F) serving as measuring objects are displayed so as to be visible at one view in accordance with the table file read by the table file reading means (21), and a screen on which the plurality of optical fibers (F) serving as measuring objects measured by the optical fiber characteristic measuring means (30: 24, 25, 26, 27) and the respective measured data of the plurality of optical fibers (F) are displayed so as to be associated with one another, the table file editing means (23a) is capable of editing the table file by displaying the screen in a tabular form on which the plurality of optical fibers (F) serving as measuring objects are displayed so as to be visible at one view, on the display unit (28) at the time of editing the table file, and the optical fiber characteristic measuring means (30: 24, 25, 26, 27) displays the screen on which the plurality of optical fibers (F) serving as measuring objects and the respective measured data of the plurality of optical fibers (F) are displayed so as to be associated with one another, on the display unit (28) at the time of measuring the plurality of optical fibers (F) serving as measuring objects.

In order to achieve the above-described object, according to a ninth aspect of the present invention, there is provided the optical fiber measuring system according to the eighth aspect, wherein the measured result data stored in the measured result storing means (22b) and the edited result data stored in the edited result storing means (22c) can be transmitted to the external terminal (10) in order to externally generate a report on the plurality of optical fibers (F) serving as measuring objects measured by the optical fiber characteristic measuring means (30: 24, 25, 26, 27), and the external terminal (10) includes report generating means (12b) for allowing to generate the report by sequentially indicating, by the display unit (14), guidance including a report form selection screen for selecting a report form to be generated, a table file read screen, a file read screen for reading the measured result data and the edited result data stored in the measured result storing means (22b) and the edited result storing means (22c) of the optical time domain reflectometer (20), and a preview screen which is for confirming a result of the report, and is for selecting an output form of a generated report.

In order to achieve the above-described object, according to a tenth aspect of the present invention, there is provided the optical fiber measuring system according to the eighth aspect, wherein the contents of the table file which can be edited by the table file editing means (23a) of the optical time domain reflectometer (20) includes at least one of a "new insertion" mode in which an optical fiber F to be measured is newly added to the table file, an "initialization" mode in which, even when measurement has been already completed and measured results have been associated, it is possible to return to an unmeasured state by erasing all data, a "measurement" mode in which it is possible to update measured results by remeasuring characteristics of a desired optical fiber F, and a "read execution" mode in which the screen is switched to a screen on which details of measured contents are displayed, and it is possible to edit respective items.

In order to achieve the above-described object, according to an eleventh aspect of the present invention, there is provided the optical fiber measuring system according to the eighth aspect, wherein the table file storing means (22a) which stores the table file read by the table file reading means (21) of the optical time domain reflectometer (20), the measured result storing means (22b), and the edited result storing means (22c) are external storage media which are freely attachable and detachable.

In order to achieve the above-described object, according to a twelfth aspect of the present invention, there is provided the optical fiber measuring system according to the eighth aspect, further comprising a communication unit (21) which transmits the measured result data stored in the measured result storing means (22b) and the edited result data stored in the edited result storing means (22c) to the outside when the measured result storing means (22b) and the edited result storing means (22c) of the optical time domain reflectometer (20) are internal storage media.

In order to achieve the above-described object, according to a thirteenth aspect of the present invention, there is provided the optical fiber measuring system according to the eighth aspect, wherein the table file reading means (21) of the optical time domain reflectometer (20) includes a communication unit (21) reads the table file via communication from the outside.

In order to achieve the above-described object, according to a fourteenth aspect of the present invention, there is provided the optical fiber measuring system according to the eighth aspect, wherein, on the report form selection screen as the guidance indicated on the display unit (14) of the external terminal (10), as a report form to be generated, there is indicated at least one of a "multicore spreadsheet" mode for reporting as a table in which the respective measured data with respect to the plurality of optical fibers (F) serving as measuring objects have been summarized, a "multicore spreadsheet and waveform" mode for reporting so as to add respective measured waveforms to the table in which the respective measured data with respect to the plurality of optical fibers (F) serving as measuring objects have been summarized, and a "waveform report" mode for reporting the respective measured waveforms with respect to the plurality of optical fibers (F) serving as measuring objects.

In order to achieve the above-described object, according to a fifteenth aspect of the present invention, there is provided the optical fiber measuring system according to the eighth aspect, wherein, on the preview screen as the guidance indicated on the display unit (14) of the external terminal (10), as an output form of the generated report, there is indicated at least one of a "print" mode in which the contents of the generated report are printed on a paper sheet to be outputted, a "PDF" mode in which the contents of the generated report are outputted as PDF data, and an "Excel" mode in which the contents of the generated report are outputted as Excel data.

In order to achieve the above-described object, according to a sixteenth aspect of the present invention, there is provided an optical fiber measuring method which measures various characteristics of a plurality of optical fibers (F) serving as measuring objects by using an optical time domain reflectometer (20) and an external terminal (10), the method comprising:

a step of allowing to create a table file to be finally created, by sequentially indicating, by a display unit (14), guidance including an initial menu screen for creating a table file which is for carrying out association of the plurality of optical fibers (F) serving as measuring objects with measured data when the plurality of optical fibers (F) have been measured, based on optical fiber management information provided in advance of undertaking a cable laying/maintenance construction, such as various types of information on the plurality of optical fibers (F) serving as measuring objects, information on a construction site, and the like, the table file in which the association can be edited at the time of undertaking the cable laying/maintenance construction, an input screen for individually inputting the optical fiber management information provided in advance, and a file screen in a tabular form on which the plurality of optical fibers (F) serving as measuring objects are displayed so as to be visible at one view as a table file to be finally created, by table file creating means (12a) in the external terminal (10);

a step of creating the table file to be finally created, by individually inputting the optical fiber management information provided in advance based on the guidance including the initial menu screen, the input screen, and the file screen which are sequentially indicated on the display unit (14) of the external terminal (10);

a step of displaying the optical fiber management information on the plurality of optical fibers (F) serving as measuring objects in a tabular form on the display unit (28) of the optical time domain reflectometer (20) based on the table file to be finally created which has been created at the external terminal (10);

a step of selecting an arbitrary optical fiber (F) to be measured from among the optical fiber management information on the plurality of optical fibers (F) serving as measuring objects which have been displayed in a tabular form by the display unit (28), by the operating unit (29) of the optical time domain reflectometer (20);

a step of storing various characteristics of the arbitrary optical fiber (F) selected by the operating unit (29) into the storage unit (22) of the optical time domain reflectometer (20) such that measured data of the various characteristics of the arbitrary optical fiber (F) measured based on corresponding optical fiber management information among the optical fiber management information on the plurality of optical fibers (F) serving as measuring objects, and the corresponding optical fiber management information thereof are associated with one another; and a step of displaying the measured data of the various characteristics of the arbitrary optical fiber (F) and the corresponding optical fiber management information thereof which have been stored so as to be associated with one another into the storage unit (22), in a predetermined form on the display unit (28) of the optical time domain reflectometer (20), wherein the various characteristics of the optical fibers (F) serving as measuring objects are measured by the optical time domain reflectometer (20) based on the table file created at the external terminal (10).

In order to achieve the above-described object, according to a seventeenth aspect of the present invention, there is provided the optical fiber measuring method according to the sixteenth aspect, further comprising:

a step of storing the table file to be finally created which has been created on the display unit (14) of the external terminal (10), into table file storing means (13a);

a step of reading the table file to be finally created which has been stored in the table file storing means (13a) of the external terminal (10), by table file reading means (21) of the optical time domain reflectometer (20);

a step of editing the table file to be finally created which has been read by the table file reading means (21), by table file editing means (23a) of the optical time domain reflectometer (20);

a step of measuring the optical fibers (F) serving as measuring objects by optical fiber characteristic measuring means (30: 24, 25, 26, 27) of the optical time domain reflectometer (20), based on the table file to be finally created which has been read by the table file reading means (23a) and the table file to be finally created which has been edited by the table file editing means (21);

a step of storing measured result data in which the plurality of optical fibers (F) serving as measuring objects measured by the optical fiber characteristic measuring means (30: 24, 25, 26, 27), and respective measured data of the plurality of optical fibers (F) have been associated with one another, by measured result storing means (22b) of the optical time domain reflectometer (20);

a step of storing edited result data expressing edited contents when the table file has been edited by the table file editing means (23a), and measured result data measured by the optical fiber characteristic measuring means (30; 24, 25, 26, 27) based on the edited contents, by the edited result storing means (22c) of the optical time domain reflectometer (20);

a step of allowing to selectively display at least a screen in a tabular form on which the plurality of optical fibers (F) serving as measuring objects are displayed so as to be visible at one view in accordance with the table file read by the table file reading means (21), and a screen on which the plurality of optical fibers (F) serving as measuring objects measured by the optical fiber characteristic measuring means (30; 24, 25, 26, 27) and the respective measured data of the plurality of optical fibers (F) are displayed so as to be associated with one another, on the display unit (28) of the optical time domain reflectometer (20);

a step of allowing to edit the table file by displaying the screen in a tabular form on which the plurality of optical fibers (F) serving as measuring objects are displayed so as to be visible at one view, on the display unit (28) of the optical time domain reflectometer (20), at the time of editing the table file by the table file editing means (23a); and a step of displaying the screen on which the plurality of optical fibers (F) serving as measuring objects and the respective measured data of the plurality of optical fibers (F) serving as measuring objects are displayed so as to be associated with one another, on the display unit (28) of the optical time domain reflectometer (20), at the time of measuring the plurality of optical fibers (F) serving as measuring objects by the optical fiber characteristic measuring means (30: 24, 25, 26, 27).

In order to achieve the above-described object, according to an eighteenth aspect of the present invention, there is provided the optical fiber measuring method according to the seventeenth aspect, further comprising:

a step of allowing to transmit the measured result data stored in the measured result storing means (22b) of the optical time domain reflectometer (20), and the edited result data stored in the edited result storing means (22c) to the external terminal (10) in order to generate the report on the plurality of optical fibers (F) serving as measuring objects measured by the optical fiber characteristic measuring means (30; 24, 25, 26, 27), at the external terminal (10);

a step of allowing to generate the report by sequentially indicating, by the display unit (14), guidance including a report form selection screen for selecting a report form to be generated by the report generating means (12b), a table file read screen for generating the report, a screen-after-reading-file for reading data for generating the report, and a preview screen which is for confirming a generated result of the report, and is for selecting an output form of the generated report, at the external terminal (10); and a step of generating the report to be finally created based on guidance including the report form selection screen, the table file read screen, the screen-after-reading-file for reading the measured result data and the edited result data stored in the measured result storing means (22b) and the edited result storing means (22c) of the optical time domain reflectometer (20), and the preview screen which are sequentially indicated on the display unit (14) of the external terminal (10).

In order to achieve the above-described object, according to a nineteenth aspect of the present invention, there is provided the optical fiber measuring method according to the seventeenth aspect, wherein the contents of the table file which can be edited by the table file editing means (23a) of the optical time domain reflectometer (20) includes at least one of a "new insertion" mode in which an optical fiber F to be measured is newly added to the table file, an "initialization" mode in which, even when measurement has been already completed and measured results have been associated, it is possible to return to an unmeasured state by erasing all data, a "measurement" mode in which it is possible to update measured results by remeasuring characteristics of a desired optical fiber F, and a "read execution" mode in which the screen is switched to a screen on which details of measured contents are displayed, and it is possible to edit respective items.

In order to achieve the above-described object, according to a twentieth aspect of the present invention, there is provided the optical fiber measuring method according to the seventeenth aspect, wherein the table file storing means (22a) which stores the table file read by the table file reading means (21) of the optical time domain reflectometer (20), the measured result storing means (22b), and the edited result storing means (22c) are respectively external storage media which are freely attachable and detachable.

In order to achieve the above-described object, according to a twenty-first aspect of the present invention, there is provided the optical fiber measuring method according to the seventeenth aspect, further comprising a communication unit (21) which transmits the measured result data stored in the measured result storing means (22b) and the edited result data stored in the edited result storing means (22c) to the outside when the measured result storing means (22b) and the edited result storing means (22c) of the optical time domain reflectometer (20) are internal storage media.

In order to achieve the above-described object, according to a twenty-second aspect of the present invention, there is provided the optical fiber measuring method according to the seventeenth aspect, wherein the table file reading means (21) of the optical time domain reflectometer (20) includes a communication unit (21) which reads the table file via communication from the outside.

In order to achieve the above-described object, according to a twenty-third aspect of the present invention, there is provided the optical fiber measuring method according to the eighteenth aspect, wherein, on the report form selection screen as the guidance indicated on the display unit (14) of the external terminal (10), as a report form to be generated, there is indicated at least one of a "multicore spreadsheet" mode for reporting as a table in which the respective measured data with respect to the plurality of optical fibers (F) serving as measuring objects have been summarized, a "multicore spreadsheet and waveform" mode for reporting so as to add respective measured waveforms to the table in which the respective measured data with respect to the plurality of optical fibers (F) serving as measuring objects have been summarized, and a "waveform report" mode for reporting the respective measured waveforms with respect to the plurality of optical fibers (F) serving as measuring objects.

In order to achieve the above-described object, according to a twenty-fourth aspect of the present invention, there is provided the optical fiber measuring method according to the eighteenth aspect, wherein, on the preview screen as the guidance indicated on the display unit (14) of the external terminal (10), as an output form of the generated report, there is indicated at least one of a "print" mode in which the contents of the generated report are printed on a paper sheet to be outputted, a "PDF" mode in which the contents of the generated report are outputted as PDF data, and an "Excel" mode in which the contents of the generated report are outputted as Excel data.

In accordance with the present invention, because measurement of an optical fiber is carried out based on a table file created in advance at an external terminal, it is possible to associate the measured optical fiber with measured data at the same time of measuring. Therefore, an attempt can be made to make operations in a laying/maintenance construction of the optical fiber more efficient, and there is no need to associate the measured optical fiber with the measured data in a report generating operation which is carried out after measuring an optical fiber. This makes it possible to eliminate the troublesomeness in report generation.

In accordance with the present invention, even when a situation which is different from planning of a table file created in advance is brought about, and the planning of the table file is edited, it is possible to store edited contents as edited result data, and to generate a report based on the measured result data and the edited result data. This makes it possible to easily carry out identification of measured data and management of measurement conditions.

BRIEF DESCRIPTION OF DRAWINGS

FIG. 4A is an explanatory diagram showing a part of a table file finally created at the external terminal in the optical fiber measuring system according to the present invention.

FIG. 4C is a diagram illustrating an input screen for creating a table file at the external terminal in the optical fiber measuring system according to the present invention.

FIG. 4D is a diagram illustrating an input screen for creating a table file at the external terminal in the optical fiber measuring system according to the present invention.

FIG. 4E is an explanatory diagram illustrating a part of a table file finally created at the external terminal in the optical fiber measuring system according to the present invention.

FIG. 4F is an explanatory diagram illustrating the rest of the table file finally created at the external terminal in the optical fiber measuring system according to the present invention.

FIG. 5 is an explanatory diagram showing a display example of a table file read from the external terminal by an optical time domain reflectometer in the optical fiber measuring system according to the present invention.

FIG. 6 is an explanatory diagram showing a display example of the table file at the time of measuring an optical fiber by the optical time domain reflectometer in the optical fiber measuring system according to the present invention.

FIG. 7 is an explanatory diagram showing a display example at the time of editing measured result data of the optical fiber by the optical time domain reflectometer in the optical fiber measuring system according to the present invention.

FIG. 9A is an explanatory diagram showing one example in which measured result data and edited result data after completion of measurement of optical fibers by the optical time domain reflectometer in the optical fiber measuring system according to the present invention are displayed at the external terminal.

FIG. 9B is an explanatory diagram showing a part of another example in which measured result data and edited result data after completion of measurement of optical fibers by the optical time domain reflectometer in the optical fiber measuring system according to the present invention are displayed at the external terminal.

FIG. 9C is an explanatory diagram showing the rest of the another example in which measured result data and edited result data after completion of measurement of optical fibers by the optical time domain reflectometer in the optical fiber measuring system according to the present invention are displayed at the external terminal.

FIG. 10A is an explanatory diagram showing one example of a report of measurement of optical fibers which has been generated at the external terminal in the optical fiber measuring system according to the present invention.

FIG. 10C is a diagram illustrating a screen for reading measured result data and edited result data after completion of measurement in order to generate a report at the external terminal in the optical fiber measuring system according to the present invention.

FIG. 10I is an explanatory diagram showing a case in which the report of measurement of optical fibers generated at the external terminal in the optical fiber measuring system according to the present invention is outputted in PDF as one example.

FIG. 10O is an explanatory diagram showing a case in which the report of measurement of optical fibers generated at the external terminal in the optical fiber measuring system according to the present invention is outputted in PDF as one example.

FIG. 10P is an explanatory diagram showing a case in which the report of measurement of optical fibers generated at the external terminal in the optical fiber measuring system according to the present invention is outputted in Excel as one example.

FIG. 11 is an explanatory diagram showing a display example of skip measurement set at the external terminal in the optical fiber measuring system according to the present invention.

FIG. 12 is an explanatory diagram showing a display example at the optical time domain reflectometer executing skip measurement set at the external terminal in the optical fiber measuring system according to the present invention.

BEST MODE FOR CARRYING OUT THE INVENTION

Figure 1:
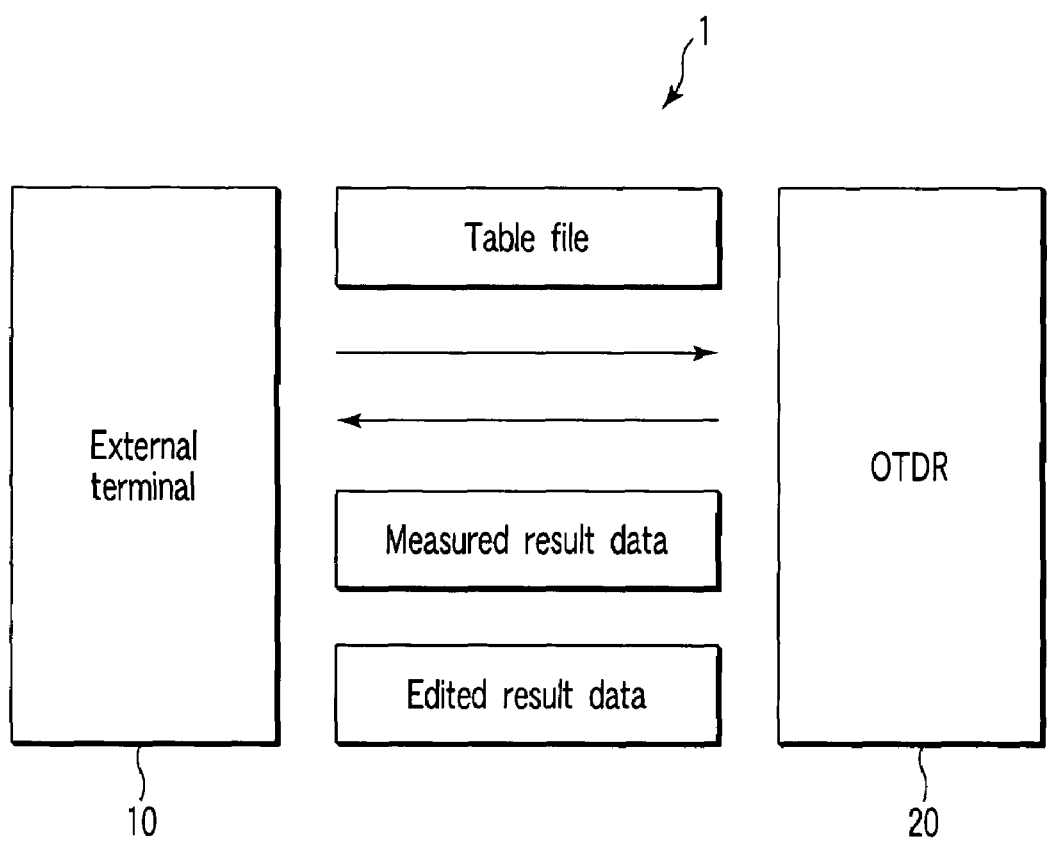
FIG. 1 is a conceptual diagram schematically showing an optical fiber measuring system according to the present invention.

Hereinafter, preferred embodiments of an optical time domain reflectometer according to the present invention, and an optical fiber measuring system and an optical fiber measuring method using the same will be described with reference to FIGS. 1 to 13.

First, a basic structure of an optical fiber measuring system 1 according to the present invention will be described.

The optical fiber measuring system 1 according to the present invention measures various characteristics of a plurality of optical fibers (F) serving as measuring objects by using an optical time domain reflectometer 20 and an external terminal 10. The optical time domain reflectometer 20 has: a display unit 28 which displays optical fiber management information on the plurality of optical fibers F serving as measuring objects in a tabular form; an operating unit 29 which selects an arbitrary optical fiber (F) to be measured from among the optical fiber management information on the plurality of optical fibers F serving as measuring objects displayed in a tabular form by the display unit 28; and a storage unit 22 which stores various characteristics of the arbitrary optical fiber F selected by the operating unit 29 such that measured data of the various characteristics of the arbitrary optical fiber F measured based on corresponding optical fiber management information among the optical fiber management information on the plurality of optical fibers F serving as measuring objects, and the corresponding optical fiber management information thereof are associated with one another. The display unit 28 is capable of displaying the measured data of the various characteristics of the arbitrary optical fiber F and the corresponding optical fiber management information thereof which have been stored so as to be associated with one another in the storage unit 22, in a predetermined form. The external terminal 10 includes table file creating means 12*a* for allowing to create the table file to be finally created by sequentially indicating guidance including an initial menu screen for creating a table file which is for carrying out association of the plurality of optical fibers F serving as measuring objects with measured data when the plurality of optical fibers F have been measured based on optical fiber management information provided in advance of undertaking a cable laying/maintenance construction including various types of information on the plurality of optical fibers F serving as measuring objects, and information on a construction site, as the optical fiber management information, the table file in which the association can be edited at the time of undertaking the cable laying/maintenance construction, an input screen for individually inputting the optical fiber management information provided in advance, and a file screen in a tabular form on which the plurality of optical fibers F serving as measuring objects are displayed so as to be visible at one view as a table file to be finally created, by the display unit 14. The optical time domain reflectometer 20 measures the various characteristics of the optical fibers F serving as a measuring object based on the table file created by the external terminal 10.

The optical fiber measuring system 1 according to the present invention, in addition to the basic structure described above, preferably further has: table file reading means (communication means) 21 for reading the table file created by the external terminal 10 from outside; table file editing means 23*a* for editing the table file read by the table file reading means 21; and optical fiber characteristic measuring means 30 (24, 25, 26, 27) for measuring the optical fibers F serving as measuring objects based on the table file read by the table file reading means 21 and the table file edited by the table file editing means 23*a*. The storage unit 22 includes: measured result storing means 22*b* for storing measured result data in which the plurality of optical fibers F serving as measuring objects measured by the optical fiber characteristic measuring means 30 (24, 25, 26, 27), and respective measured data of the plurality of optical fibers F have been associated with one another; and edited result storing means 22*c* for storing edited result data expressing edited contents when the table file has been edited by the table file editing means 23*a*, and measured result data measured by the optical fiber characteristic measuring means 30 (24, 25, 26, 27) based on the edited contents. The display unit 28 is capable of selectively displaying at least a screen in a tabular form on which the plurality of optical fibers F serving as measuring objects are displayed so as to be visible at one view in accordance with the table file read by the table file reading means 21, and a screen on which the plurality of optical fibers F serving as measuring objects measured by the optical fiber characteristic measuring means 30 (24, 25, 26, 27) and the respective measured data of the plurality of optical fibers F are displayed so as to be associated with one another. The table file editing means 23*a* is capable of editing the table file by displaying the screen in a tabular form on which the plurality of optical fibers F serving as measuring objects are displayed so as to be visible at one view, on the display unit 28 at the time of editing the table file. The optical fiber characteristic measuring means 30 (24, 25, 26, 27) displays the screen on which the plurality of optical fibers F serving as measuring objects and the respective measured data of the plurality of optical fibers F are displayed so as to be associated with one another, on the display unit 28 at the time of measuring the plurality of optical fibers F serving as measuring objects.

In the optical fiber measuring system 1 according to the present invention, more preferably, in addition to the basic structure described above, the measured result data stored in the measured result storing means 22*b* and the edited result data stored in the edited result storing means 22*c* can be transmitted to the outside in order to externally generate a report on the plurality of optical fibers F serving as measuring objects measured by the optical fiber characteristic measuring means 30 (24, 25, 26, 27). The external terminal 10 includes report generating means 12*b* for allowing to generate the report by sequentially indicating, by the display unit 14, guidance including a report form selection screen for selecting a report form to be generated, a table file read screen, a screen-after-reading-file for reading the measured result data and the edited result data stored in the measured result storing means 22*b* and the edited result storing means 22*c* of the optical time domain reflectometer 20, and a preview screen which is for confirming a result of a report, and for selecting an output form of the generated report.

Next, respective structures of the optical fiber measuring system according to the present embodiment will be described concretely and in detail with reference to FIGS. 1 and 2.

Figure 2:
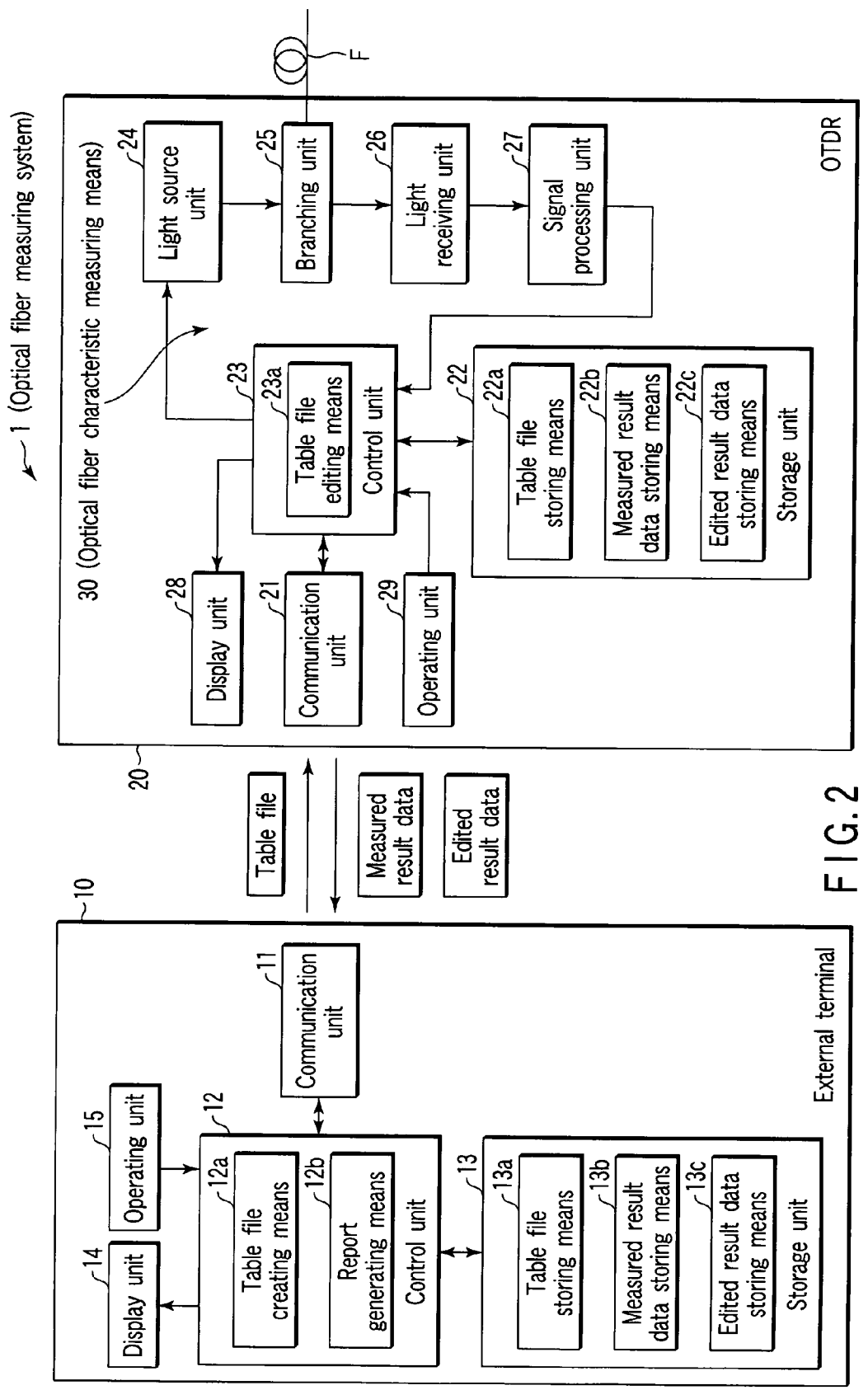
FIG. 2 is a system block diagram showing a schematic structure in the optical fiber measuring system according to the present invention.

As shown in FIG. 1, the optical fiber measuring system 1 is structured to have the external terminal 10 carrying out various processings such as management, data origination, and the like relating to a cable laying/maintenance construction, and the optical time domain reflectometer (OTDR) 20 carrying out measurements for characteristic evaluations of a plurality of optical fibers F serving as measuring objects.

The external terminal 10 and the OTDR 20 are connected by wire or wirelessly, and for example, respective devices are directly connected to one another by communication cables or the like, or are connected via a communication network such as the Internet, a LAN, or the like, which makes it possible to carry out data communication with each other.

The external terminal 10 is a terminal equipment such as, for example, a personal computer or the like which can be connected to the outside, and is schematically structured to have a communication unit 11, a control unit 12, a storage unit 13, a display unit 14, and an operating unit 15.

The communication unit 11 is structured from a communication interface for wire or for wireless of, for example, RS-232C, USB, Ethernet (registered trademark), or the like, and carries out communication of various types of information by directly connecting the respective devices, or by connecting such via a communication network such as the Internet, a LAN, or the like.

The control unit 12 is structured from a microcomputer including, for example, a CPU, a ROM, a RAM, and the like, and integrally controls operations of the respective units structuring the external terminal 10.

Further, the control unit 12 has the table file creating means 12*a* for creating a table file used for carrying out association of the plurality of optical fibers F serving as measuring objects with measured data which have been measured in the measurement of a plurality of optical fibers F serving as measuring objects, and the report generating means 12*b* for generating a report of a cable laying/maintenance construction based on various types of information on the information on the plurality of optical fibers F serving as measuring objects and measured data measured by the OTDR 20.

The table file creating means 12a allows to create a table file on the screen of the display unit 14 based on the guidance which will be described later, in order to manage an optical fiber F serving as a measuring object with the measured data of the plurality of optical fibers F serving as measuring objects which have been measured so as to be associated with one another, based on optical fiber management information such as various types of information on the plurality of optical fibers F serving as measuring objects, information on construction sites, and the like, at the time of undertaking a cable laying/maintenance construction.

As optical fiber management information, for example, there is information such as core wire identification IDs (numbers or the like), fiber laying zones, laying distances, persons in charge of cable laying constructions, total losses (design values), connection point information, measurement conditions for measuring various characteristics of a plurality of optical fibers (F) serving as measuring objects.

To make the association with and reference to these types of information easy, for example, information of the table file in which, for example, core wire identification IDs (numbers) and the like are indexed is inputted on an input screen of the display unit 14 which will be described later.

Here, as the information to be inputted, for example, there is information of a file name (a file name under which measured results are stored), measurement conditions (for example, a distance range, a pulse width, a wavelength, and the like), a construction planned position (for example, positional information on a location where a cable laying/maintenance construction is carried out, or the like), construction information (for example, information on fibers that are planned to be measured, fibers whose measurements are skipped, and the like), measurement items (for example, a total loss, a connection loss, quality judgment conditions).

Further, the table file creating means 12a is capable of creating a table file by reutilizing the edited result data stored in the edited result data storing means 13c which will be described later.

The report generating means 12b allows to generate a report, on the screen of the display unit 14 based on the guidance which will be described later, relating to a cable laying/maintenance construction executed based on measured result data which are measured results of the plurality of optical fibers F serving as measuring objects measured based on the table file created by the table file creating means 12a, and edited result data prepared in accordance with measured results and situations such as quality judgment information by the comparison between the measured result data and threshold values specified in advance, skip information on optical fibers F whose measurements have been skipped in the measurement, remeasured information of optical fibers F to be remeasured, and the like.

The storage unit 13 is structured from, for example, a magnetic storage medium, an optical storage medium, or an internal storage medium formed from a semiconductor memory such as ROM and RAM, and stores various programs required for driving the external terminal 10.

Further, the storage unit 13 has the table file storing means 13a, the measured result data storing means 13b, and the edited result storing means 13c.

The table file storing means 13a stores a table file relating to a cable laying/maintenance construction created at the external terminal 10.

The measured result data storing means 13b stores measured results, in which the plurality of optical fibers F serving as measuring objects which have been measured at the OTDR 20, based on the table file created at the table file creating means 12a, and measured data of the plurality of measured optical fibers F serving as measuring objects are associated with one another as measured result data.

The edited result data storing means 13c stores various edited contents when the contents of the table file read in advance of undertaking a construction and the measured results have been edited in accordance with a measuring status in the measurement of an optical fiber by the OTDR 20, as edited result data.

The display unit 14 is structured from a display device such as a CRT, a liquid crystal display, or the like, and carries out displays of various contents at the time of control of driving of the external terminal 10, such as displays of data processed contents, various setting screens, and the like at the time of creating a table file, or at the time of generating a report.

The operating unit 15 is structured from a numeric keypad, operation buttons, and the like, and is operated at the time of carrying out inputs of various types of information such as operating information and various settings relating to the external terminal 10.

The OTDR 20 is a device carrying out characteristic inspections of states of connection points, the other fault points, and the like of the optical fiber F by emitting a measuring beam from one end of an optical fiber F to be a measuring object, and is schematically structured to have a communication unit 21, a storage unit 22, a control unit 23, a light source unit 24, a branching unit 25, a light receiving unit 26, a signal processing unit 27, a display unit 28, and an operating unit 29.

Here, the light source unit 24, the branching unit 25, the light receiving unit 26, and the signal processing unit 27 structure the optical fiber characteristic measuring means 30 driven under the control of the control unit 23.

The communication unit 21 is structured from a communication interface specified in the same way as the communication unit 11 which is a wire or wireless external device of, for example, RS-232C, USB, or the like, and carries out communication of various types of information by directly connecting the respective devices, or by connecting such via a communication network such as the Internet and LAN.

The storage unit 22 is structured from a magnetic storage medium, an optical storage medium, or an internal storage medium formed from a semiconductor memory such as ROM and RAM, and stores various types of information required for driving the OTDR 20.

The storage unit 22 has table file storing means 22a, the measured result data storing means 22b, and the edited result data storing means 22c.

The table file storing means 22a stores a table file created at the external terminal 10 read via the communication unit 21.

The measured result data storing means 22b stores measured results in which the plurality of optical fibers F serving as measuring objects which have been measured based on the table file created at the table file creating means 12a of the external terminal 10 and measured data of the plurality of measured optical fibers F serving as measuring objects are associated with one another, and the table file after editing, as measured result data.

The edited result data storing means 22c stores various edited contents when the contents of the table file read in advance of undertaking a construction and the measured results have been edited in accordance with a measuring status in the measurement of an optical fiber, as edited result data.

The control unit 23 is structured from a microcomputer including, for example, a CPU, a ROM, and a RAM, and integrally controls operations of the respective units structuring the OTDR 20.

Further, the control unit 23 carries out control of measurements of the plurality of optical fibers F serving as measuring objects by the optical fiber characteristic measuring means 30 (24, 25, 26, 27) based on the table file stored in advance in the table file storing means 22*a*.

The table file editing means 23*a* provided in the control unit 23 carries out editing processing of the table file by input operations from the operating unit 29 in the case of a situation different from a plan of the table file created in advance, for example, when an optical fiber F to be measured is newly added in the process of measuring the plurality of optical fibers F serving as measuring objects, when an optical fiber F planned to be measured is skipped, when all measured data are initialized, when an optical fiber F which has been once measured is remeasured, when measured data are made to be in a state of being unmeasured, and the like.

The light source unit 24 structuring the optical fiber characteristic measuring means 30 has a driving circuit and a light emitting element such as a laser diode (LD), and emits a measuring beam (laser beam) in a pulse form with a central wavelength λ based on a measurement control signal from the control unit 23.

A branching unit 25 structuring the optical fiber characteristic measuring means 30 is structured from, for example, an optical directional coupler, which makes the measuring beam in a pulse form emitted from the light source unit 24 be incident into the plurality of optical fibers F serving as measuring objects, and makes a reflected light (a Fresnel reflection and a backscattered light) returned from the optical fibers F be branched to be emitted to the light receiving unit 26 which will be described later.

The light receiving unit 26 structuring the optical fiber characteristic measuring means 30 is structured from, for example, a light receiving element such as a photodiode, an amplifier, an A/D converter, and the like.

The light receiving unit 26 transforms the received reflected light into an electric signal to be amplified, and carries out A/D conversion of the signal at a predetermined frequency by the A/D converter, and outputs it as a waveform signal to the signal processing unit 27.

The signal processing unit 27 structuring the optical fiber characteristic measuring means 30 outputs the waveform signal A/D converted at the light receiving unit 26, and a waveform signal obtained by carrying out various signal processings such as logarithmic conversion processing and a summing-averaging processing based on a signal processing signal from the control unit 23, as waveform data to the display unit 28.

The display unit 28 is structured from a display device such as a liquid crystal display, and carries out various displays relating to the OTDR 20, such as a display of the waveform data processed at the signal processing unit 27, a display of the table file and displays of various setting screens.

The operating unit 29 is structured from a numeric keypad, operation buttons, and the like, and is operated at the time of carrying out inputs of various types of information such as operating information and various settings relating to the OTDR 20.

In the optical fiber measuring system structured as described above, the optical time domain reflectometer 20 basically has: a display unit 28 which displays optical fiber management information on a plurality of optical fibers F serving as measuring objects in a tabular form; an operating unit 29 which selects an arbitrary optical fiber F to be measured from among the optical fiber management information on the plurality of optical fibers F serving as measuring objects displayed in a tabular form by the display unit 28; and a storage unit 22 which stores various characteristics of the arbitrary optical fiber F selected by the operating unit 29 such that measured data of the various characteristics of the arbitrary optical fiber F which have been measured based on corresponding optical fiber management information among the optical fiber management information on the plurality of optical fibers F serving as measuring objects, and the corresponding optical fiber management information thereof are associated with one another. The display unit 28 is capable of displaying the measured data of the various characteristics of the arbitrary optical fiber F and the corresponding optical fiber management information thereof which have been stored so to be associated with one another in the storage unit 22, in a predetermined form.

The optical time domain reflectometer 20 according to the present invention preferably further has, in addition to the basic structure described above: table file reading means 21 for reading from outside a table file which is for carrying out association of the plurality of optical fibers F serving as measuring objects with respective measured data when the plurality of optical fibers F have been measured, based on optical fiber management information provided in advance of undertaking a cable laying/maintenance construction including various types of information on the plurality of optical fibers F serving as measuring objects, and information on a construction site, as the optical fiber management information, the table file being created such that the association of the plurality of optical fibers F serving as measuring objects with the respective measured data when the plurality of optical fibers F have been measured can be edited at the time of undertaking the cable laying/maintenance construction; table file editing means 23*a* for editing the table file read by the table file reading means 21; and optical fiber characteristic measuring means 30 (24, 25, 26, 27) for measuring the optical fibers F serving as measuring objects based on the table file read by the table file reading means 21 and the table file edited by the table file editing means 23*a*. The storage unit 22 includes: measured result storing means 22*b* for storing measured result data in which the plurality of optical fibers F serving as measuring objects measured by the optical fiber characteristic measuring means 30 (24, 25, 26, 27), and respective measured data of the plurality of optical fibers F have been associated with one another; and edited result storing means 22*c* for storing edited result data expressing edited contents when the table file has been edited by the table file editing means 23*a*, and measured result data measured by the optical fiber characteristic measuring means 30 (24, 25, 26, 27) based on the edited contents. The display unit 28 is capable of selectively displaying at least a screen in a tabular form on which the plurality of optical fibers F serving as measuring objects are displayed so as to be visible at one view in accordance with the table file read by the table file reading means 21, and a screen on which the plurality of optical fibers F serving as measuring objects measured by the optical fiber characteristic measuring means 30 (24, 25, 26, 27) and the respective measured data of the plurality of optical fibers F are displayed so as to be associated with one another. The table file editing means 23*a* is capable of editing the table file by displaying the screen in a tabular form on which the plurality of optical fibers F serving as measuring objects are displayed so as to be visible at one view, on the display unit 28 at the time of editing the table file. The optical fiber characteristic measuring means 30 (24, 25, 26, 27) displays the screen on which the plurality of optical fibers F serving as measuring objects and the respective measured data of the plurality of optical fibers F are displayed so as to be associated with one another, on the display unit 28 at the time of measuring the plurality of optical fibers F serving as measuring objects. The measured result data stored in the measured result storing means 22*b* and the edited result data stored in the edited result storing means 22*c* can be transmitted to the outside in order to externally generate a report on the plurality of optical fibers F serving as measuring objects measured by the optical fiber characteristic measuring means 30 (24, 25, 26, 27).

An optical fiber measuring method according to the present invention which basically measures various characteristics of a plurality of optical fibers F serving as measuring objects by using an optical time domain reflectometer 20 and an external terminal 10, the method having: a step of allowing to create a table file to be finally created, by sequentially indicating, by a display unit 14, guidance including an initial menu screen for creating a table file which is for carrying out association of the plurality of optical fibers F serving as measuring objects with measured data when the plurality of optical fibers F have been measured, based on optical fiber management information provided in advance of undertaking a cable laying/maintenance construction, such as the various types of information on the plurality of optical fibers F serving as measuring objects, information on a construction site, and the like, the table file in which the association can be edited at the time of undertaking the cable laying/maintenance construction, an input screen for individually inputting the optical fiber management information provided in advance, and a file screen in a tabular form on which the plurality of optical fibers F serving as measuring objects are displayed so as to be visible at one view as a table file to be finally created, by the table file creating means 12*a* in the external terminal 10; a step of creating the table file to be finally created, by individually inputting the optical fiber management information provided in advance based on the guidance including the initial menu screen, the input screen, and the file screen which are sequentially indicated on the display unit 14 of the external terminal 10; a step of displaying the optical fiber management information on the plurality of optical fibers F serving as measuring objects in a tabular form on the display unit 28 of the optical time domain reflectometer 20 based on the table file to be finally created which has been created at the external terminal 10; a step of selecting an arbitrary optical fiber F to be measured from among the optical fiber management information on the plurality of optical fibers F serving as measuring objects which have been displayed in a tabular form by the display unit 28, by the operating unit 29 of the optical time domain reflectometer 20; a step of storing various characteristics of the arbitrary optical fiber F selected by the operating unit 29 into the storage unit 22 of the optical time domain reflectometer 20 such that measured data of the various characteristics of the arbitrary optical fiber F measured based on corresponding optical fiber management information among the optical fiber management information on the plurality of optical fibers F serving as measuring objects, and the corresponding optical fiber management information thereof are associated with one another; and a step of displaying the measured data of the various characteristics of the arbitrary optical fiber (F) and the corresponding optical fiber management information thereof which have been stored so as to be associated with one another into the storage unit 22, in a predetermined form on the display unit 28 of the of the optical time domain reflectometer 20, wherein the various characteristics of the optical fibers F serving as measuring objects are measured by the optical time domain reflectometer 20 based on the table file created at the external terminal 10.

The optical fiber measuring method according to the present invention preferably further has, in addition to the basic structure described above:

a step of storing the table file to be finally created which has been created on the display unit 14 of the external terminal 10, into table file storing means 13*a*; a step of reading the table file to be finally created which has been stored in the table file storing means 13*a* of the external terminal 10, by table file reading means 21 of the optical time domain reflectometer 20; a step of editing the table file to be finally created which has been read by the table file reading means 21, by table file editing means 23*a* of the optical time domain reflectometer 20; a step of measuring the optical fibers F serving as measuring objects by optical fiber characteristic measuring means 30 (24, 25, 26, 27) of the optical time domain reflectometer 20, based on the table file to be finally created which has been read by the table file reading means 21 and the table file to be finally created which has been edited by the table file editing means 23*a*; a step of storing measured result data in which the plurality of optical fibers F serving as measuring objects measured by the optical fiber characteristic measuring means 30 (24, 25, 26, 27), and respective measured data of the plurality of optical fibers F have been associated with one another, by measured result storing means 22*b* of the optical time domain reflectometer 20; a step of storing edited result data expressing edited contents when the table file has been edited by the table file editing means 23*a*, and measured result data measured by the optical fiber characteristic measuring means 30 (24, 25, 26, 27) based on the edited contents, by the edited result storing means 22*c* of the optical time domain reflectometer 20; a step of allowing to selectively display at least a screen in a tabular form on which the plurality of optical fibers F serving as measuring objects are displayed so as to be visible at one view in accordance with the table file read by the table file reading means 21, and a screen on which the plurality of optical fibers F serving as measuring objects measured by the optical fiber characteristic measuring means 30 (24, 25, 26, 27) and the respective measured data of the plurality of optical fibers F are displayed so as to be associated with one another, on the display unit 28 of the optical time domain reflectometer 20; a step of allowing to edit the table file by displaying the screen in a tabular form on which the plurality of optical fibers F serving as measuring objects are displayed so as to be visible at one view, on the display unit 28 of the optical time domain reflectometer 20, at the time of editing the table file by the table file editing means 23*a*; and a step of displaying the screen on which the plurality of optical fibers F serving as measuring objects and the respective measured data of the plurality of optical fibers F serving as measuring objects are displayed so as to be associated with one another, on the display unit 28 of the optical time domain reflectometer 20, at the time of measuring the plurality of optical fibers F serving as measuring objects by the optical fiber characteristic measuring means 30 (24, 25, 26, 27).

The optical fiber measuring method according to the present invention preferably further has, in addition to the structure described above: a step of allowing to transmit the measured result data stored in the measured result storing means 22*b* of the optical time domain reflectometer 20, and the edited result data stored in the edited result storing means 22*c* to the external terminal 10 in order to generate a report on the plurality of optical fibers F serving as measuring objects measured by the optical fiber characteristic measuring means 30 (24, 25, 26, 27), at the external terminal 10; a step of allowing to generate the report by sequentially indicating, by the display unit 14, guidance including a report form selection screen for selecting a report form to be generated by the report generating means 12b, a table file read screen for generating the report, a screen-after-reading-file for reading data for generating the report, and a preview screen which is for confirming a generated result of the report, and is for selecting an output form of the generated report, at the external terminal 10; and a step of generating the report to be finally created based on guidance including the report form selection screen, the table file read screen, the screen-after-reading-file for reading the measured result data and the edited result data stored in the measured result storing means 22b and the edited result storing means 22c of the optical time domain reflectometer 20, and the preview screen which are sequentially indicated on the display unit 14 of the external terminal 10.

Next, the optical fiber measuring method executed by the optical fiber measuring system 1 using the optical time domain reflectometer 20 and the external terminal 10 will be described by concrete operational examples with reference to FIGS. 3 to 13.

Here, the optical fiber measuring method executed by the optical fiber measuring system 1 will be described which is used for a cable laying construction of a plurality of optical fibers F serving as measuring objects in which optical fibers F are laid down at a cable laying site, and characteristic evaluations of the laid optical fibers F are carried out, and which uses a personal computer installed in an office as the external terminal 10, and directly connects the external terminal 10 and the OTDR 20 by wire via a communication cable to carry out exchange of data mutually.

Figure 3:
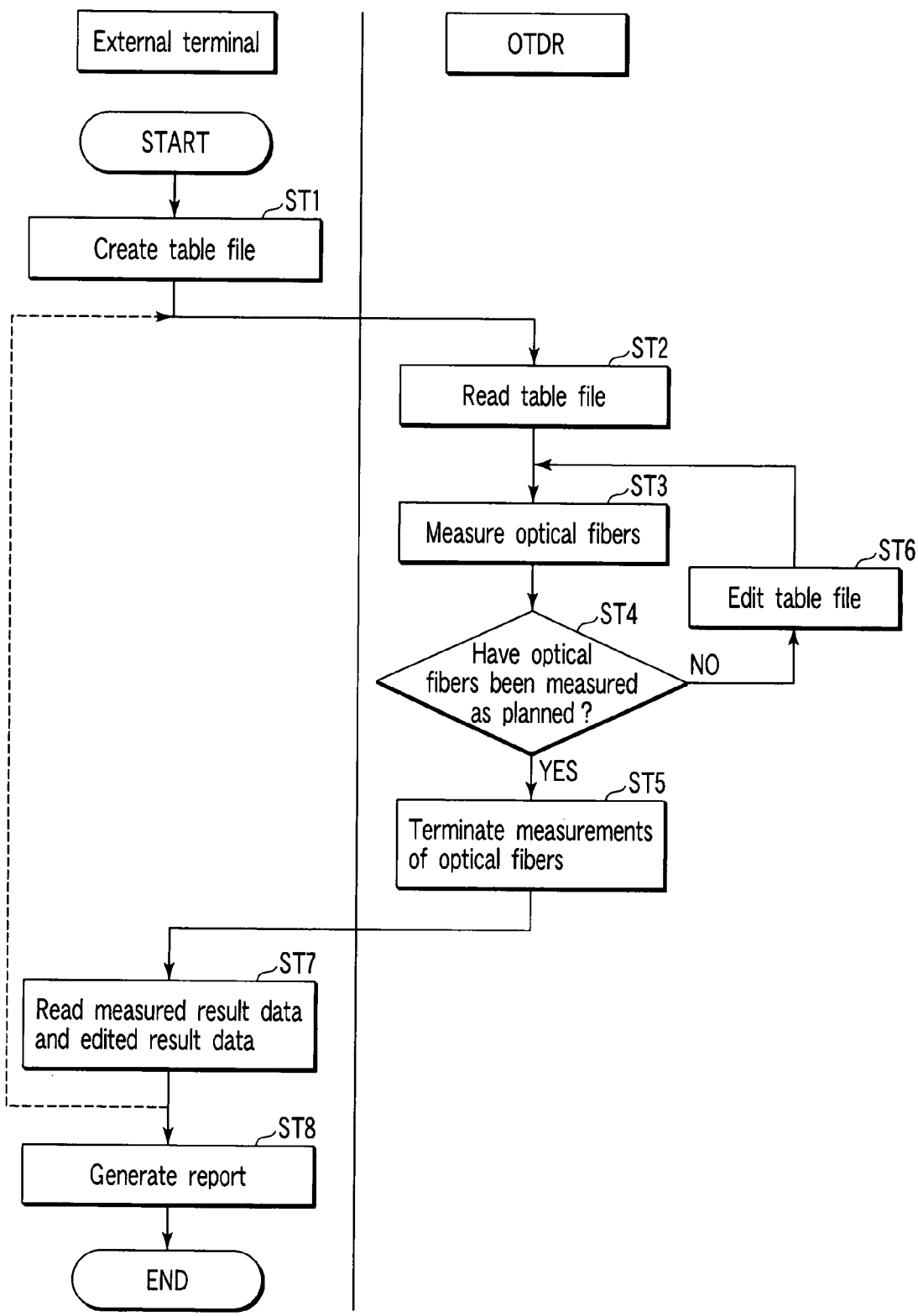
FIG. 3 is a flowchart shown for explanation of an operational example of the entire system including an external terminal and an optical time domain reflectometer in the optical fiber measuring system according to the present invention.

First, an operator creates a table file to be finally created, for example, as shown in FIG. 4A by using the display unit 14 of the external terminal 10 based on various optical fiber management information provided in advance of undertaking a construction in order to associate a plurality of optical fibers F serving as measuring objects with respective measured data in which these plurality of optical fibers F serving as measuring objects have been measured, in advance of undertaking a cable laying construction at an office at step ST1 in a flowchart shown in FIG. 3.

Figure 4B:
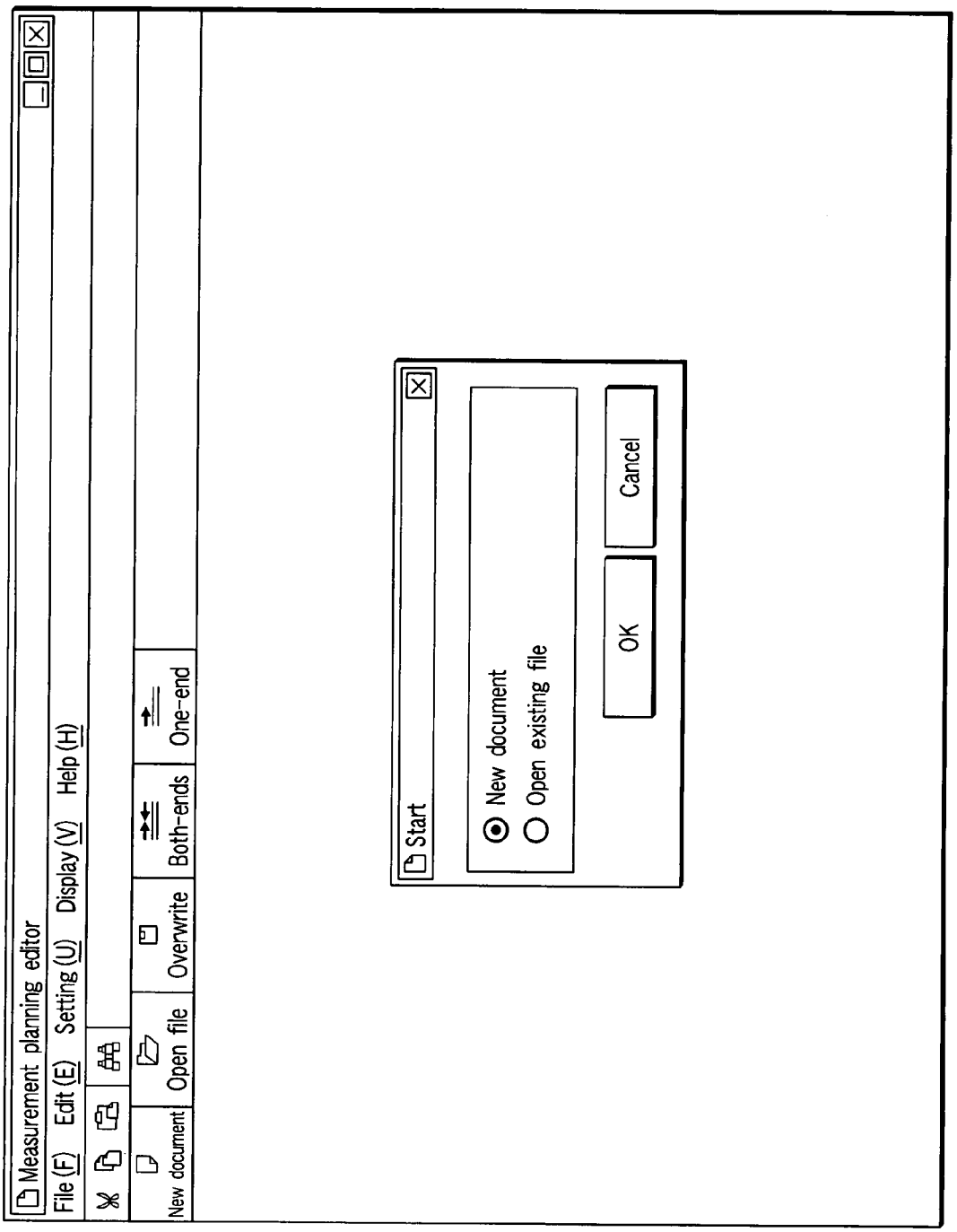
FIG. 4B is a diagram illustrating an initial menu screen for creating a table file at the external terminal in the optical fiber measuring system according to the present invention.

At this time, the operator creates the table file to be finally created as shown in FIGS. 4E and 4F by individually inputting the optical fiber management information provided in advance by using the operating unit 15 of the external terminal 10 based on guidance including an initial menu screen, an input screen, and the file screen as shown in FIGS. 4B to 4E which are sequentially indicated on the display unit 14 of the external terminal 10.

Note that, in FIG. 4E, a part of the table file to be finally created is shown because all the items cannot be displayed on the screen.

Then, with respect to the rest of the table file to be finally created which is not displayed on this screen, as shown in FIG. 4F as a screen scrolled from the screen of FIG. 4E, core wire numbers for identifying individual optical fibers F, and cable numbers for identifying multicore cables in which many optical fibers F are bound up are inputted in the table file as items corresponding to file names.

Here, the external terminal 10 is, as described above, prepared so as to include: the table file creating means 12a for allowing to create the table file to be finally created by sequentially indicating, by the display unit 14, guidance including an initial menu screen which is for creating a table file for carrying out association of the plurality of optical fibers F serving as measuring objects with measured data when the plurality of optical fibers F have been measured based on optical fiber management information provided in advance of undertaking a cable laying/maintenance construction, such as various types of information on the plurality of optical fibers F serving as measuring objects, information on a construction site, and the like, the table file in which the association can be edited at the time of undertaking the cable laying/maintenance construction, an input screen for individually inputting the optical fiber management information provided in advance, and a file screen in a tabular form on which the plurality of optical fibers F serving as measuring objects are displayed so as to be visible at one view as a table file to be finally created; and the report generating means 12b for allowing to generate the report by sequentially indicating, by the display unit 14, guidance including a report form selection screen for selecting a report form to be generated, a table file read screen for generating the report, a screen-after-reading-file for reading data for generating the report, and a preview screen which is for confirming a generated result of the report, and for selecting an output form of the generated report.

FIG. 4B is a diagram illustrating a "Measurement planning editor" screen serving as a start-up screen (an initial menu screen) which is guidance indicated for the first time on the display unit 14 of the external terminal 10 in order to create a table file at the external terminal 10 in the optical fiber measuring system according to the present invention.

Two menus, "New document" and "Open an existing file" are displayed on a "Start screen" serving as an initial menu screen which is window-displayed in the "Measurement planning editor" screen.

Here, when the operator selects "New document", a "Measurement condition setting" screen including creation of a file name as shown in FIG. 4C, which is guidance to be indicated next, is displayed on the display unit 14 of the external terminal 10.

FIG. 4C is a diagram illustrating the "Measurement condition setting" screen displayed on the display unit 14 of the external terminal 10 serving as an input screen for creating a table file at the external terminal 10 in the optical fiber measuring system 1 according to the present invention.

Here, when the operator clicks a pull-down button in the field of (1) of "File name" on the "Measurement condition setting screen", as shown in FIG. 4D, some factors are pull-down displayed as choices set in advance.

As factors serving as choices which are pull-down displayed in FIG. 4D, there are "Discriminant letter", "Custom 1", "Custom 2", "Sequential number", "Core wire name", "Wavelength", "Distance range", and "Pulse width", and when the operator selects "Core wire name" from among those choices, "Core wire name" is set in the field of (1) of "File name".

In the same way, supposing that, when the operator sequentially clicks pull-down buttons in the fields of (2), (3), (4), and (5) of "File name" on the "Measurement condition setting screen" of FIG. 4D, and respectively selects "Custom 1", "Wavelength", "Custom 2", and "Nothing" from among the choices to be pull-down displayed in the same way as described above, "Custom 1", "Wavelength", "Custom 2", and "Nothing" are respectively set in the fields of (2), (3), (4), and (5) of "File name" on the "Measurement condition setting screen".

Namely, when the operator inputs, for example, "Core wire name", "Custom 1", "Wavelength", "Custom 2", and "Nothing" in the fields of (1), (2), (3), (4), and (5) of "File name" in FIG. 4D using the operating unit 15, "File name" is automatically created by the table file creating means 12a on the basis thereof.

Then, the operator individually inputs information such as core wire names of the plurality of optical fibers F serving as measuring objects, wavelengths of pulsed lights used for measurement, core wire numbers of the plurality of optical fibers F serving as measuring objects, numbers of the plurality of optical fibers F serving as measuring objects, and the like respectively into the fields of "Core wire name", "Measurement parameter", "Access master type name selection", "Wavelength", and the like on the "Measurement condition setting screen" by using the operating unit 15.

FIGS. 4E and 4F are explanatory diagrams of a screen displayed on the display unit 14 of the external terminal 10 as a part and the rest of the table file to be finally created at the external terminal 10 in the optical fiber measuring system 1 according to the present invention.

This screen is the "Measurement planning editor" screen displayed by clicking the "OK" button in the "Measurement condition setting screen" of FIG. 4B.

Then, when the operator individually inputs desired values for each of the plurality of optical fibers F serving as measuring objects into the respective fields of "Distance range", "Pulse width", and "Number of averaging" as measurement conditions on the "Measurement planning editor" screen shown in FIGS. 4E and 4F by using the operating unit 15, the table file to be finally created is completed.

The table file created in this way is stored in the table file storing means 13a of the external terminal 10.

Then, the operator makes the table file reading means (communication means) 21 of the OTDR 20 read the table file stored in the table file storing means 13a of the external terminal 10 via the communication unit 11 of the external terminal 10 at step ST2 in the flowchart shown in FIG. 3 by connecting the external terminal 10 and the OTDR 20 via a communication cable.

At this time, the table file read by the table file reading means (communication means) 21 of the OTDR 20 is formed, for example, as shown in FIG. 5, in a tabular form such that the plurality of optical fibers F serving as measuring objects measured by the optical fiber measuring system 1 are displayed so as to be visible at one view on the display unit 28 of the OTDR 20 by the control unit 23 of the OTDR 20.

Next, the operator connects the OTDR 20 and an optical fiber F serving as a measuring object at a cable laying site, and selects a field of the optical fiber F serving as a measuring object displayed on the display unit 28 of the OTDR 20, and thereafter, the operator starts measurement of the optical fiber F serving as a measuring object at step ST3 in the flowchart shown in FIG. 3 by driving the optical fiber characteristic measuring means 30 (24, 25, 26, 27) of the OTDR 20 by operating the operating unit 29 so as to obtain a predetermined state.

Then, the measured data measured for each optical fiber F by the optical fiber characteristic measuring means 30 (24, 25, 26, 27) of the OTDR 20 is to be displayed as measured result data on the display unit 28 of the OTDR 20 in a state in which the optical fibers F serving as measuring objects and the measured data of the optical fibers F are associated with one another, for example, as shown in FIG. 6 by the control unit 23.

Further, at this time, the measured result data in which the optical fibers F and the measured data of the optical fibers F measured by the optical fiber characteristic measuring means 30 (24, 25, 26, 27) of the OTDR 20 are associated with one another, are to be stored in the measured result data storing means 22b of the OTDR 20.

Further, the edited result data expressing the edited contents when the table file and the measured result data have been edited are to be stored in the edited result data storing means 22c of the OTDR 20 by the control unit 23.

Then, the operator judges whether or not measurements of the optical fibers F have been carried out as planned in advance while confirming the displayed contents on the display unit 14 of the OTDR 20 at step ST4 in the flowchart shown in FIG. 3.

At this time, when the measurements have been carried out as planned (step ST4-Yes), the operator continues the measurements of the plurality of optical fibers F serving as measuring objects as planned until the measurements are completed at step ST5 in the flowchart shown in FIG. 3.

On the other hand, when the measurements have not been carried out as planned (step ST4-No), at step ST6 in the flowchart shown in FIG. 3, the operator carries out editing of the table file by operating the operating unit 29 in accordance with the contents to be edited, and thereafter, the operator makes the routine pass through step ST3 and step ST4 again, and proceed to the processing at step ST5 in the flowchart shown in FIG. 3.

As the contents of editing processing at step ST6 in the flowchart shown in FIG. 3, there are a "New insertion" mode, an "Initialization" mode, a "Remeasurement" mode, and the like, for example, as on the editing screen shown in FIG. 7.

First, on this editing screen, when the operator selects the "New insertion" key after selecting a file name, a line is newly added to the field selected as a "New insertion" mode, which makes it possible to newly add an optical fiber F to be measured to the table file.

Further, when the operator selects the "Initialization" key on the editing screen, even in the case in which measurement has been already completed as an "Initialization" mode, and the measured results have been associated, it is possible to return to an unmeasured state by erasing all the preceding measured data.

Further, when the operator selects the "Measurement" key after selecting a file name on the editing screen, characteristics of an optical fiber F relating to the file name are measured as a "Remeasurement" mode, which makes it possible to update the measured results.

Figure 8:
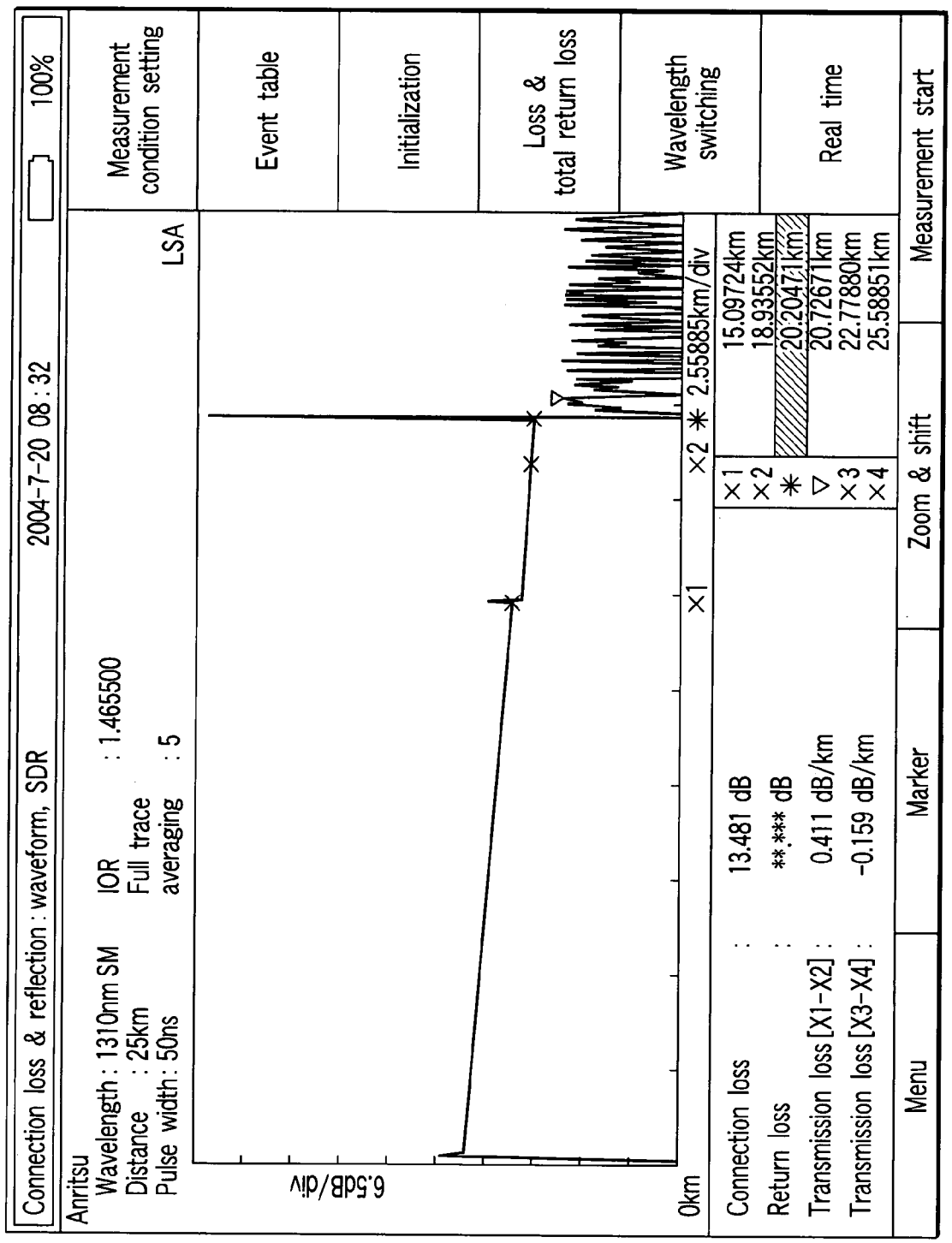
FIG. 8 is an explanatory diagram showing one example of a measured result data editing screen of the optical fiber by the optical time domain reflectometer in the optical fiber measuring system according to the present invention.

Moreover, on the editing screen, when the operator selects a "Read execution" key of FIG. 7, the screen is switched to a screen on which details of measured contents are displayed as shown in FIG. 8, and it is possible to edit the respective items.

At this time, the most recent measured result data after editing are updated and stored into the measured result data storing means 22a by the control unit 23, and the edited contents are stored into the edited result data storing means 22c.

Then, the operator brings the OTDR 20 back to the office after the measurements of all the optical fibers F planned to be measured are completed, and makes the external terminal 10 read the measured result data and the edited result data stored in the measured result data storing means 22a and the edited result data storing means 22c of the OTDR 20 at step ST7 in the flowchart shown in FIG. 3, by connecting the OTDR 20 and the external terminal 10 again via the communication cable.

In accordance therewith, on the display unit 14 of the external terminal 10, the measured result data and the edited result data associated with one another for each optical fiber F as shown in FIGS. 9A, 9B, and 9C by the control unit 23 are displayed at the same time.

FIG. 9A is an explanatory diagram showing one example in which the measured result data and the edited result data after completion of the measurement of the optical fibers by the optical time domain reflectometer in the optical fiber measuring system according to the present invention are shown at the external terminal, so as to correspond to FIG. 4A.

FIG. 9B is an explanatory diagram showing a part of another example in which the measured result data and the edited result data after completion of the measurement of the optical fibers by the optical time domain reflectometer in the optical fiber measuring system according to the present invention are shown at the external terminal, so as to correspond to FIG. 4E.

FIG. 9C is an explanatory diagram showing the rest of the another example in which the measured result data and the edited result data after completion of the measurement of the optical fibers by the optical time domain reflectometer in the optical fiber measuring system according to the present invention are shown at the external terminal, so as to correspond to FIG. 4F.

Further, when the operator selects "Open an existing file" on the initial menu screen shown in FIG. 4B, as one of the choices, the step ST7 and the step ST2 in the flowchart shown in FIG. 3 are connected as shown by the broken line, and it is possible to continue the measurement operations from the state in which the measurement operations have been terminated at the last time based on the measurement conditions which have been changed in the measurement, unmeasured information, and the like, by reading the edited result data again as the table file at a later date.

Then, the operator generates a report as shown in FIG. 10A relating to the measurements of the optical fibers F from the measured result data and the edited result data, based on the guidance for generating the report, by indicating guidance for generating a report as described above on the display unit 14 of the external terminal 10 by operating the operating unit 15 of the external terminal 10 at step ST8 in the flowchart shown in FIG. 3, which ends the series of operations.

Figure 10B:
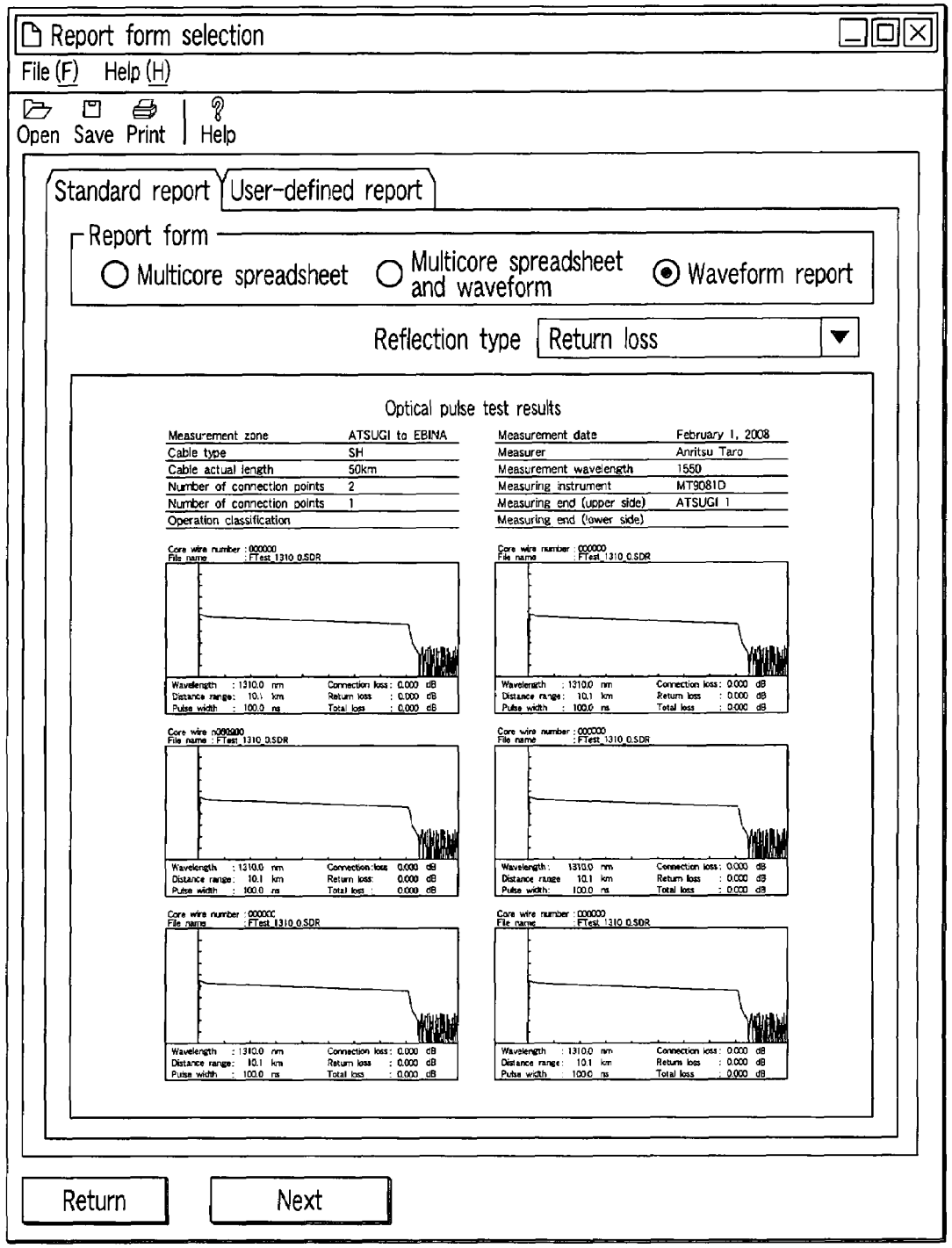
FIG. 10B is a diagram illustrating an initial screen for generating a report of measurement of optical fibers at the external terminal in the optical fiber measuring system according to the present invention.

FIG. 10B is a diagram illustrating a "Report form selection" screen as a start-up screen (an initial screen) which is guidance indicated for the first time on the display unit 14 of the external terminal 10 in order to generate a report on the measurements of the optical fibers F at the external terminal 10 in the optical fiber measuring system 1 according to the present invention.

Here, on the "Report form selection" screen as the guidance indicated on the display unit 14 of the external terminal 10, for example, as a report form to be generated, there are indicated a "Multicore spreadsheet" mode for reporting as a table in which the respective measured data with respect to the plurality of optical fibers F serving as measuring objects have been summarized, a "Multicore spreadsheet and waveform" mode for reporting so as to add respective measured waveforms to the table in which the respective measured data with respect to the plurality of optical fibers F serving as measuring objects have been summarized, and a "Waveform report" mode for reporting the respective measured waveforms with respect to the plurality of optical fibers F serving as measuring objects.

FIG. 10C is a diagram illustrating a "Table file reading" screen which is for generating a report as a screen for reading the measured result data and the edited result data after completion of measurement, on the display unit 14 of the external terminal 10 in order to generate a report at the external terminal 10 in the optical fiber measuring system 1 according to the present invention.

On this "Table file reading" screen, there is shown a case in which a table file of Tokyo Ueno Construction is selected on a New Plan screen.

Here, information on measurement conditions, a core wire number, and a file name are recorded in the table file to be read, and are associated with the measured result data.

Figure 10D:
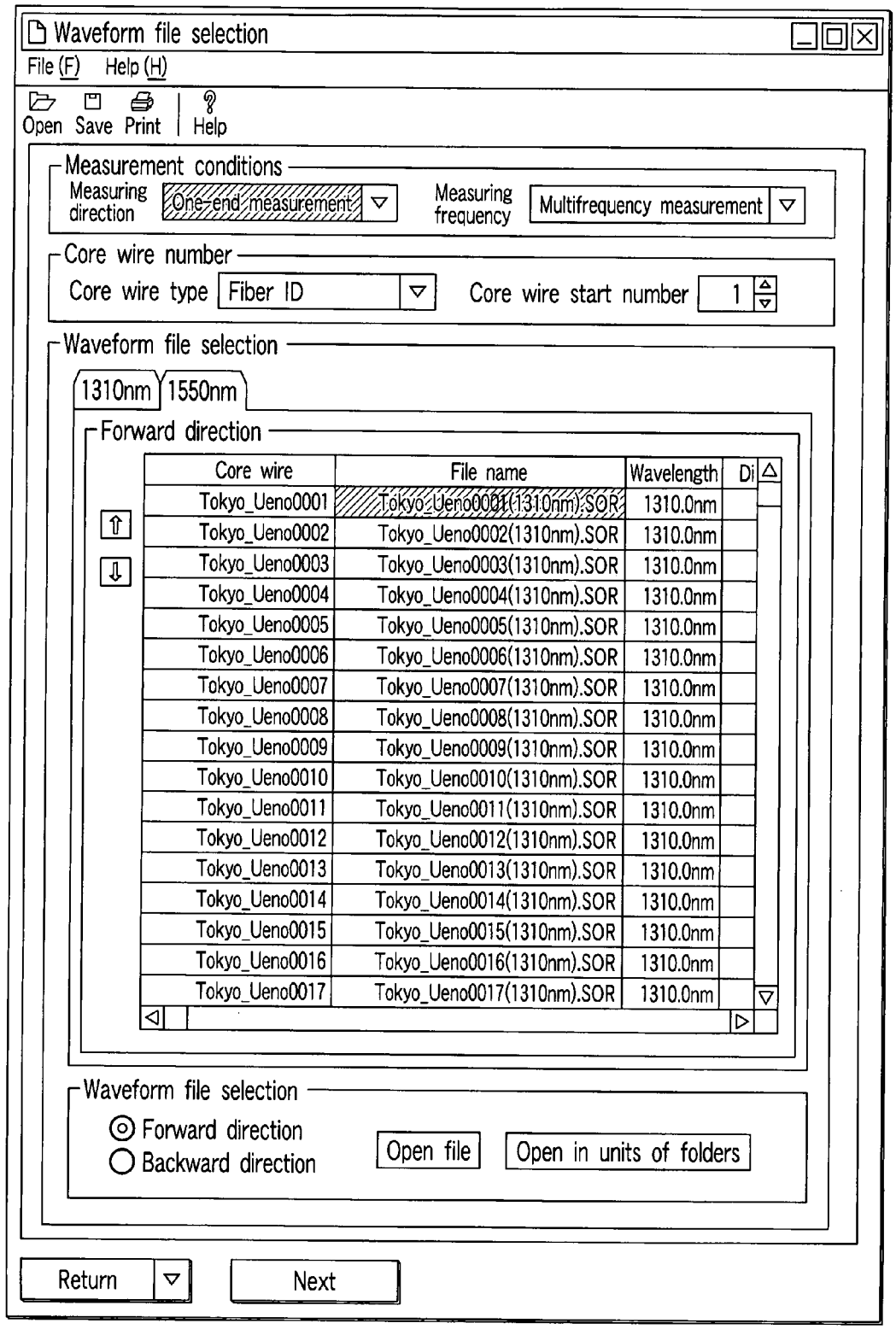
FIG. 10D is a diagram illustrating a screen-after-reading of measured result data and edited result data after completion of measurement in order to generate a report of measurement of optical fibers at the external terminal in the optical fiber measuring system according to the present invention.

FIG. 10D is a diagram illustrating a "Waveform file selection" screen as a screen-after-reading measured result data and edited result data after completion of measurement, on the display unit 14 of the external terminal 10 in order to generate a report on the measurements of the optical fibers at the external terminal 10 in the optical fiber measuring system 1 according to the present invention.

This screen-after-reading is displayed when the operator selects a desired table file on the table file read screen of FIG. 10C, and when the operator selects a desired table file to read the table file, it is possible to automatically read the measured results (including waveform data) associated with such, which is a useful function for the operator.

Figure 10E:
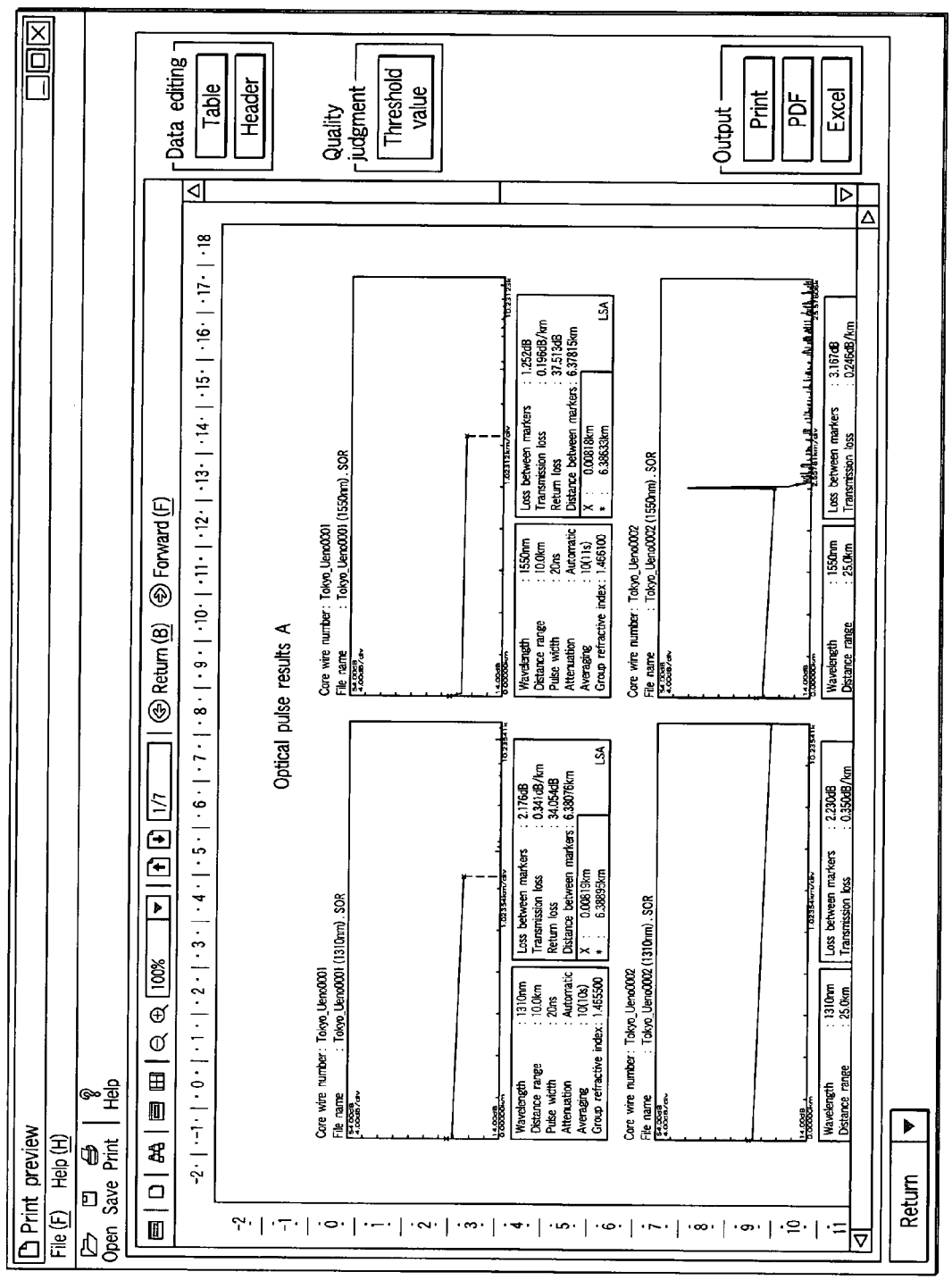
FIG. 10E is a diagram illustrating a screen for confirming a report of measurement of optical fibers generated at the external terminal in the optical fiber measuring system according to the present invention, and for selecting an output form of the generated report.

FIG. 10E is a diagram illustrating a "Print preview" screen as a "Preview" screen which is for confirming the report on the measurements of the optical fibers generated at the external terminal 10 in the optical fiber measuring system 1 according to the present invention, and is for selecting an output form of the report generated at the external terminal 10, on the display unit 14 of the external terminal 10.

On this "Print preview" screen, optical pulse results A for making the operator confirm results of a generated report are displayed along with the waveform data, and for example, as an output form of the generated report, there are indicated a "Print" mode in which the contents of the generated report are printed on a paper sheet to be outputted, a "PDF" mode in which the contents of the generated report are outputted as PDF data, and an "Excel" mode in which the contents of the generated report are outputted as Excel data.

Figure 10F:
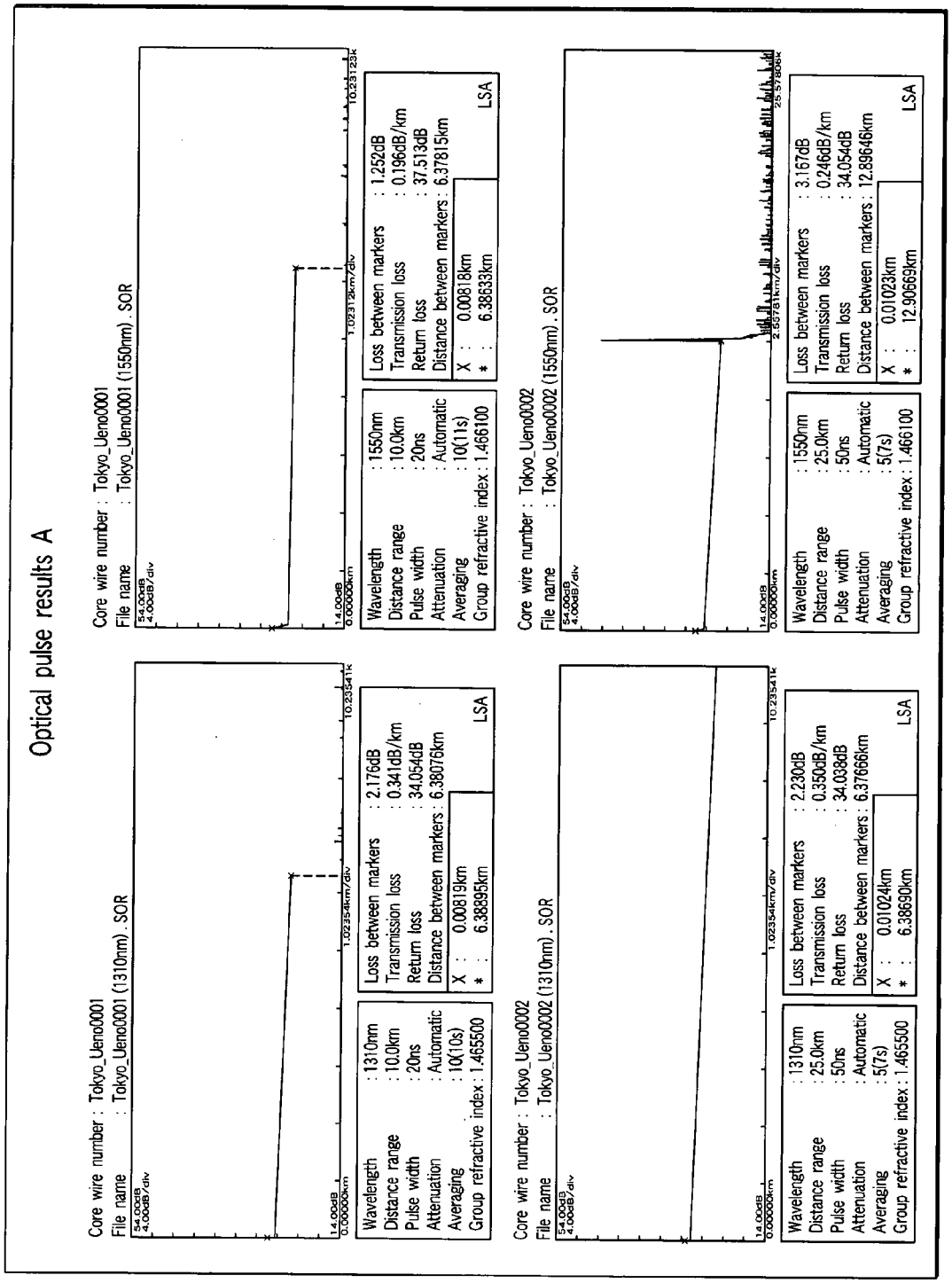
FIG. 10F is an explanatory diagram showing a case in which the report of measurement of optical fibers generated at the external terminal in the optical fiber measuring system according to the present invention is outputted in PDF as one example.
Figure 10G:
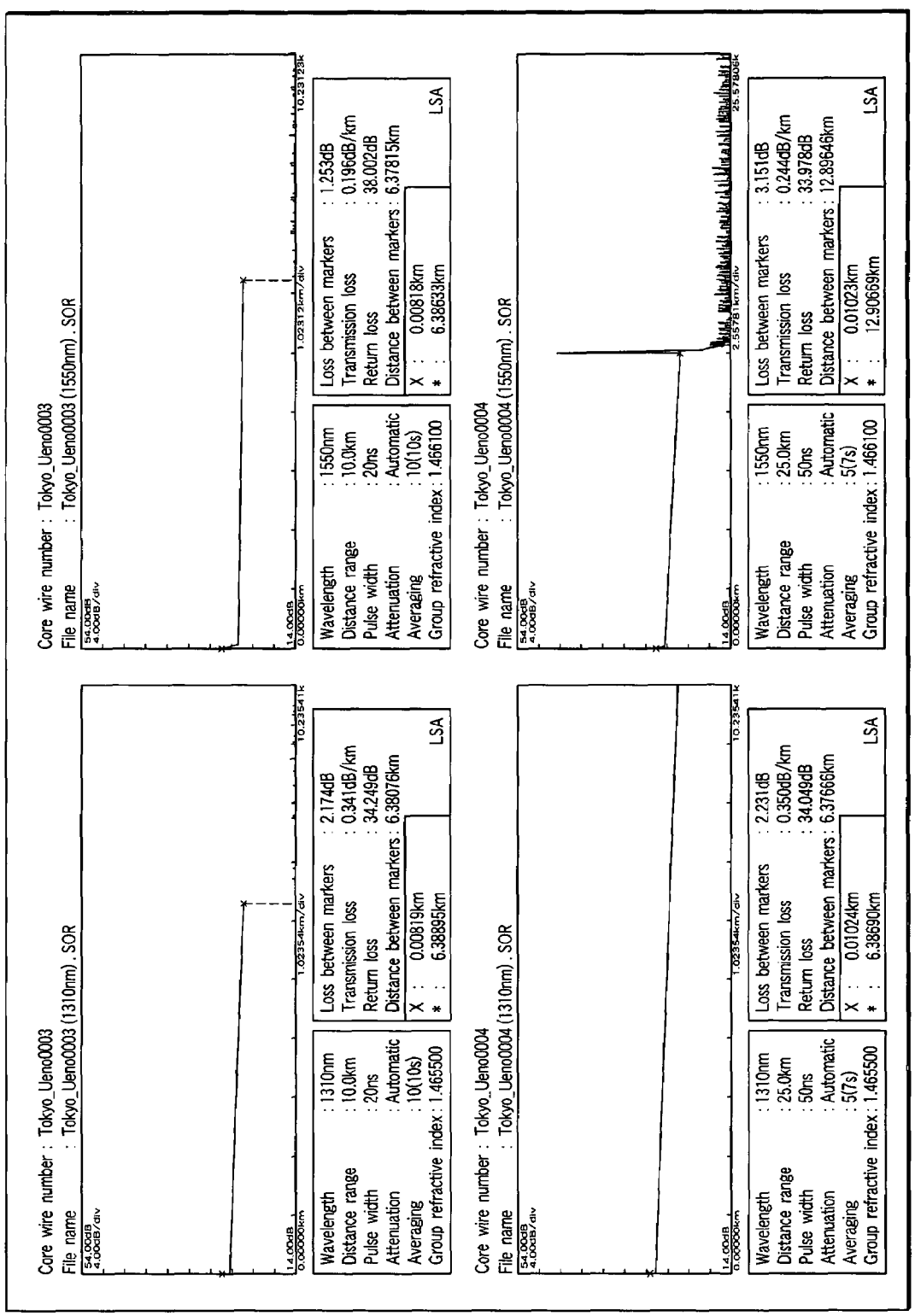
FIG. 10G is an explanatory diagram showing a case in which the report of measurement of optical fibers generated at the external terminal in the optical fiber measuring system according to the present invention is outputted in PDF as one example.
Figure 10H:
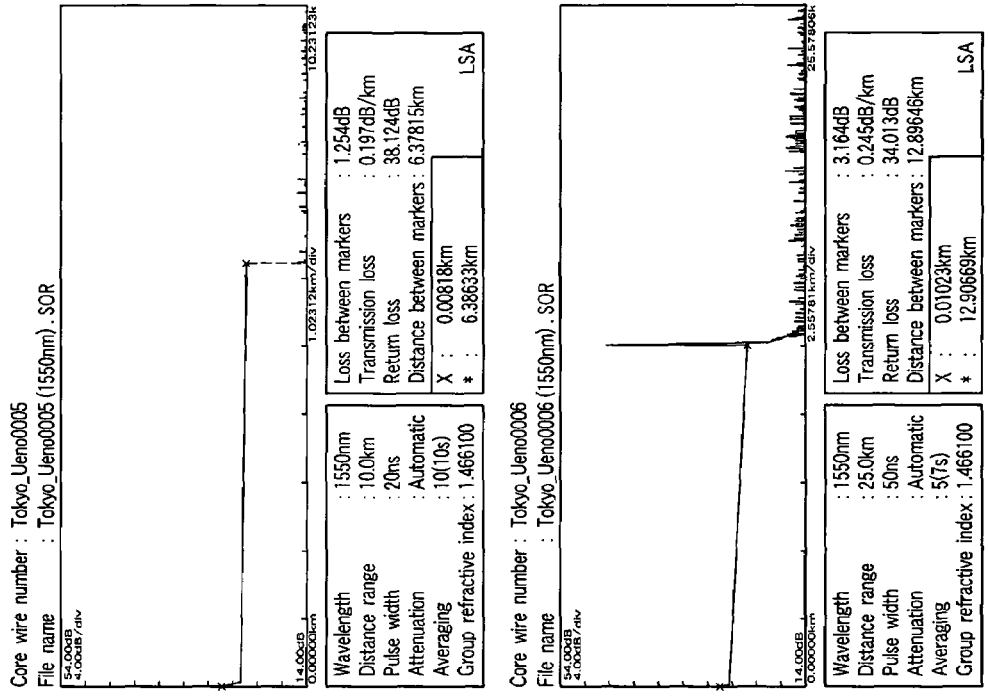
FIG. 10H is an explanatory diagram showing a case in which the report of measurement of optical fibers generated at the external terminal in the optical fiber measuring system according to the present invention is outputted in PDF as one example.
Figure 101:
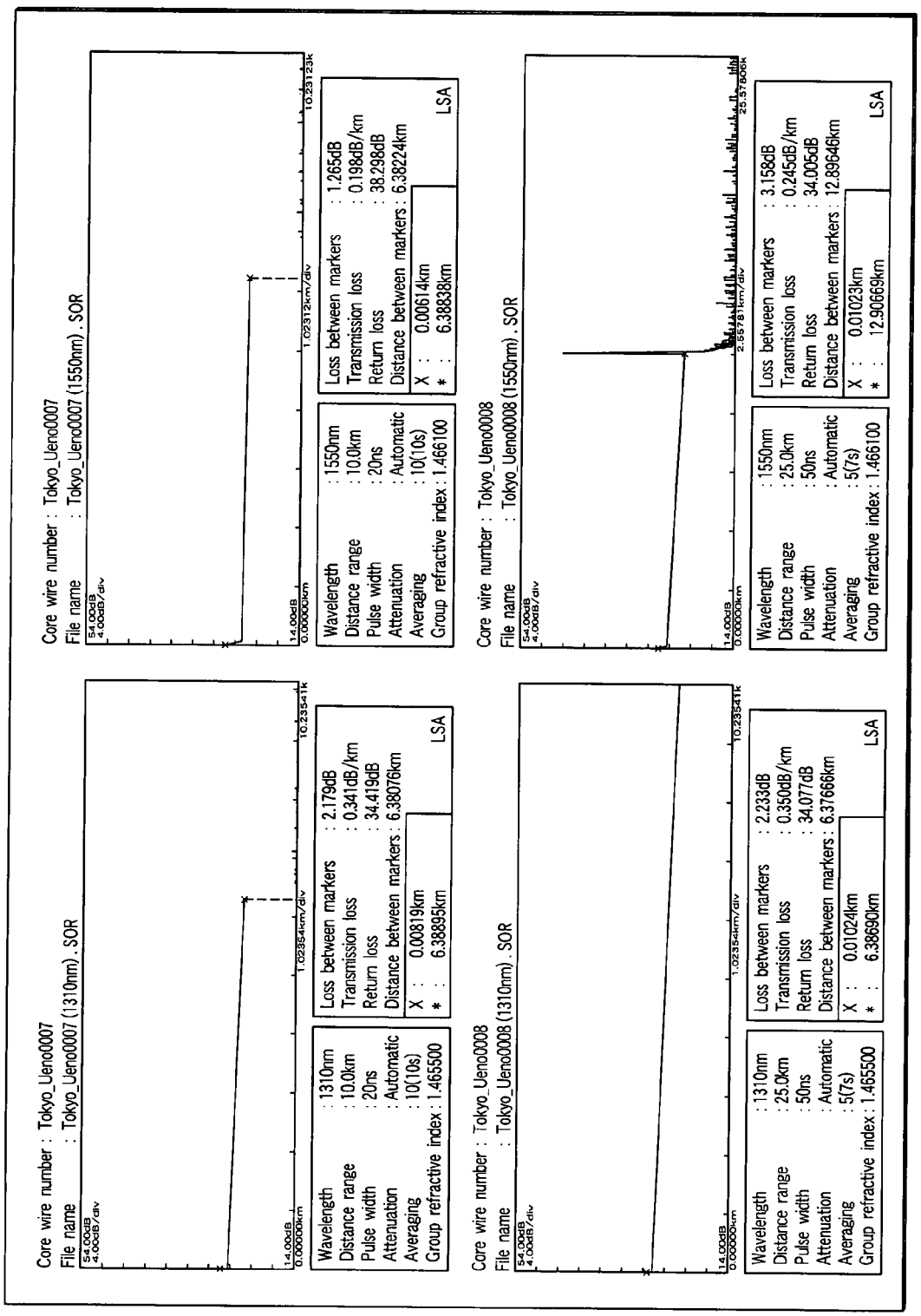
Figure 10J:
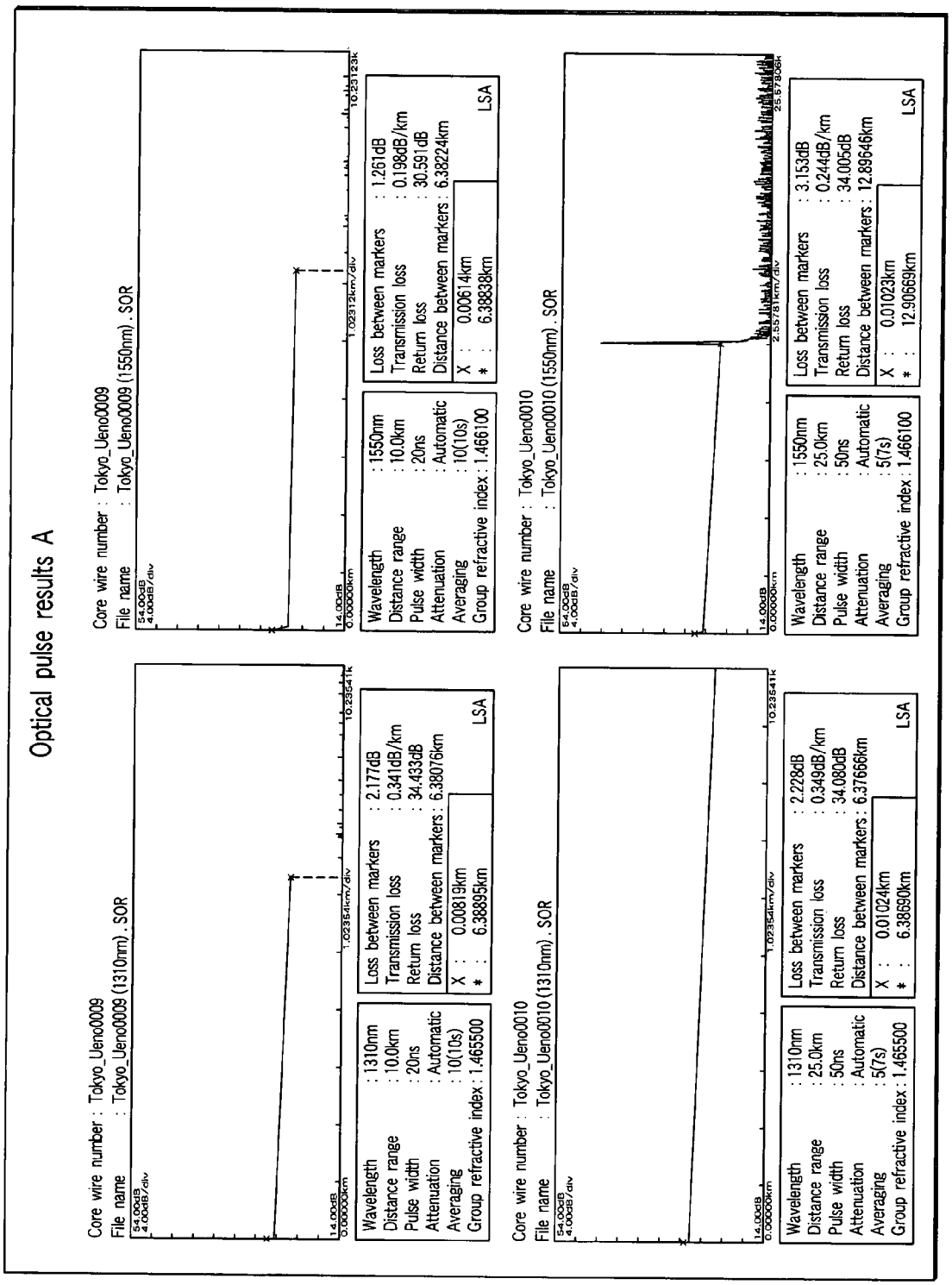
FIG. 10J is an explanatory diagram showing a case in which the report of measurement of optical fibers generated at the external terminal in the optical fiber measuring system according to the present invention is outputted in PDF as one example.
Figure 10K:
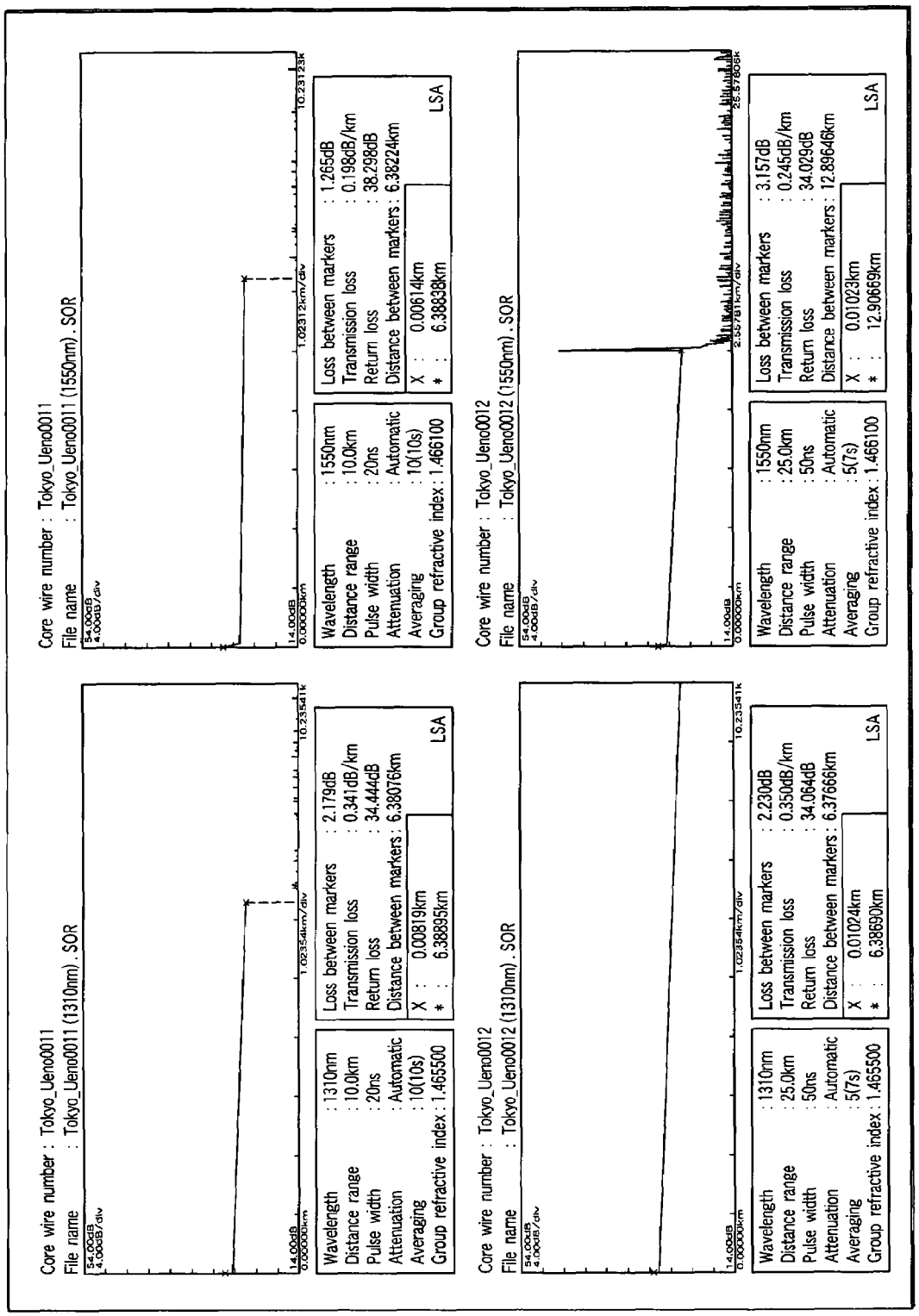
FIG. 10K is an explanatory diagram showing a case in which the report of measurement of optical fibers generated at the external terminal in the optical fiber measuring system according to the present invention is outputted in PDF as one example.
Figure 10L:
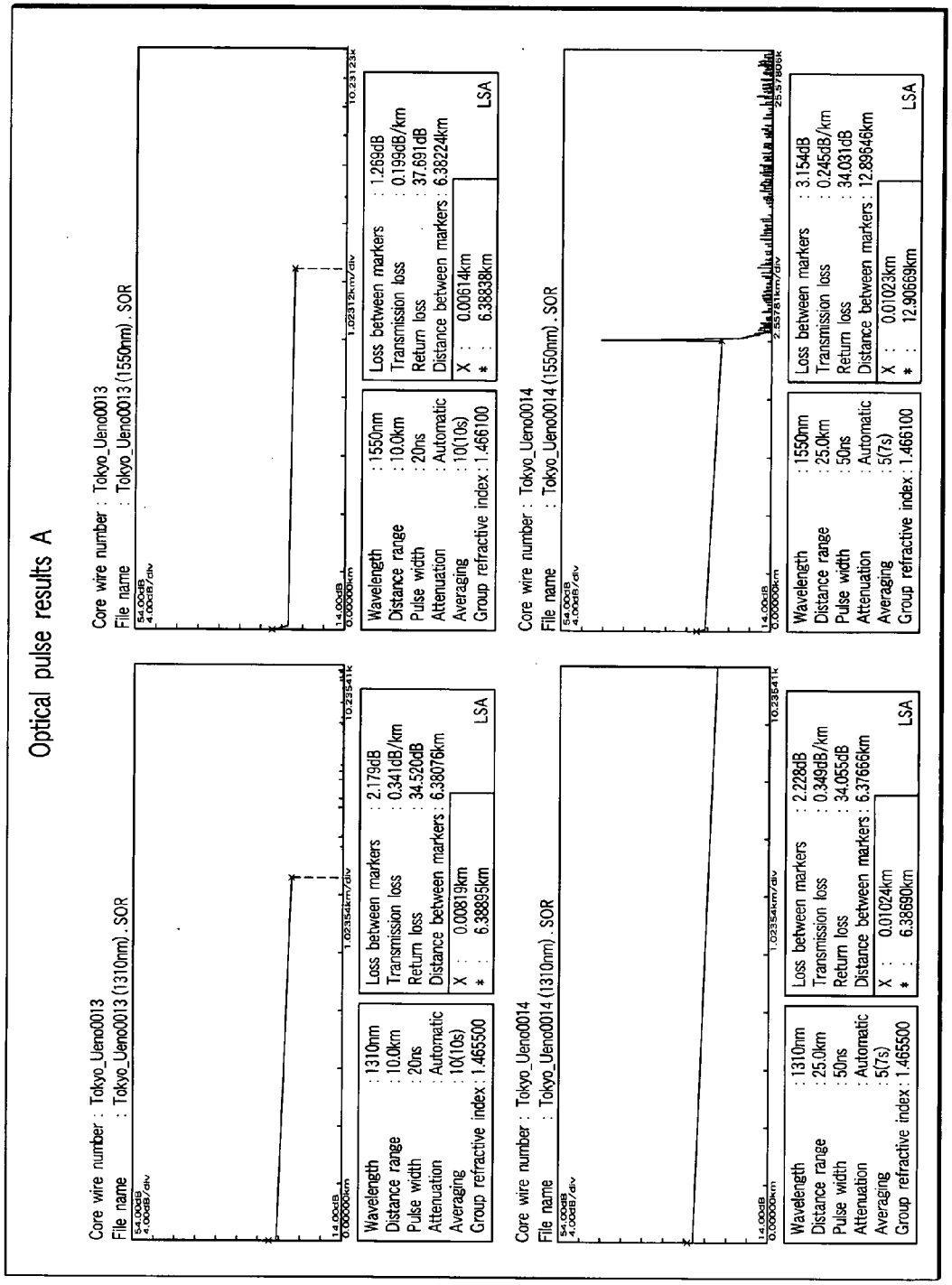
FIG. 10L is an explanatory diagram showing a case in which the report of measurement of optical fibers generated at the external terminal in the optical fiber measuring system according to the present invention is outputted in PDF as one example.
Figure 10M:
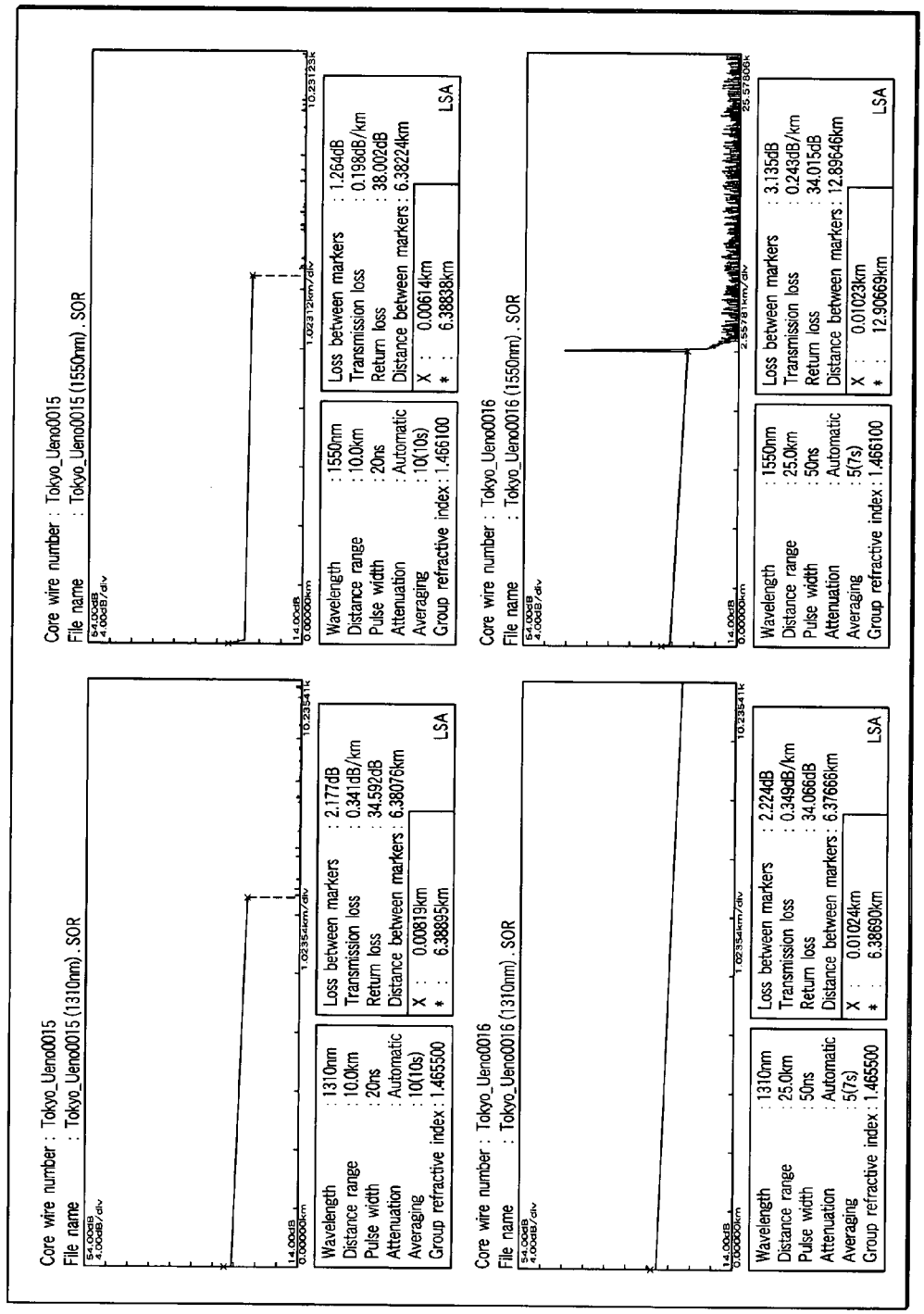
FIG. 10M is an explanatory diagram showing a case in which the report of measurement of optical fibers generated at the external terminal in the optical fiber measuring system according to the present invention is outputted in PDF as one example.
Figure 10N:
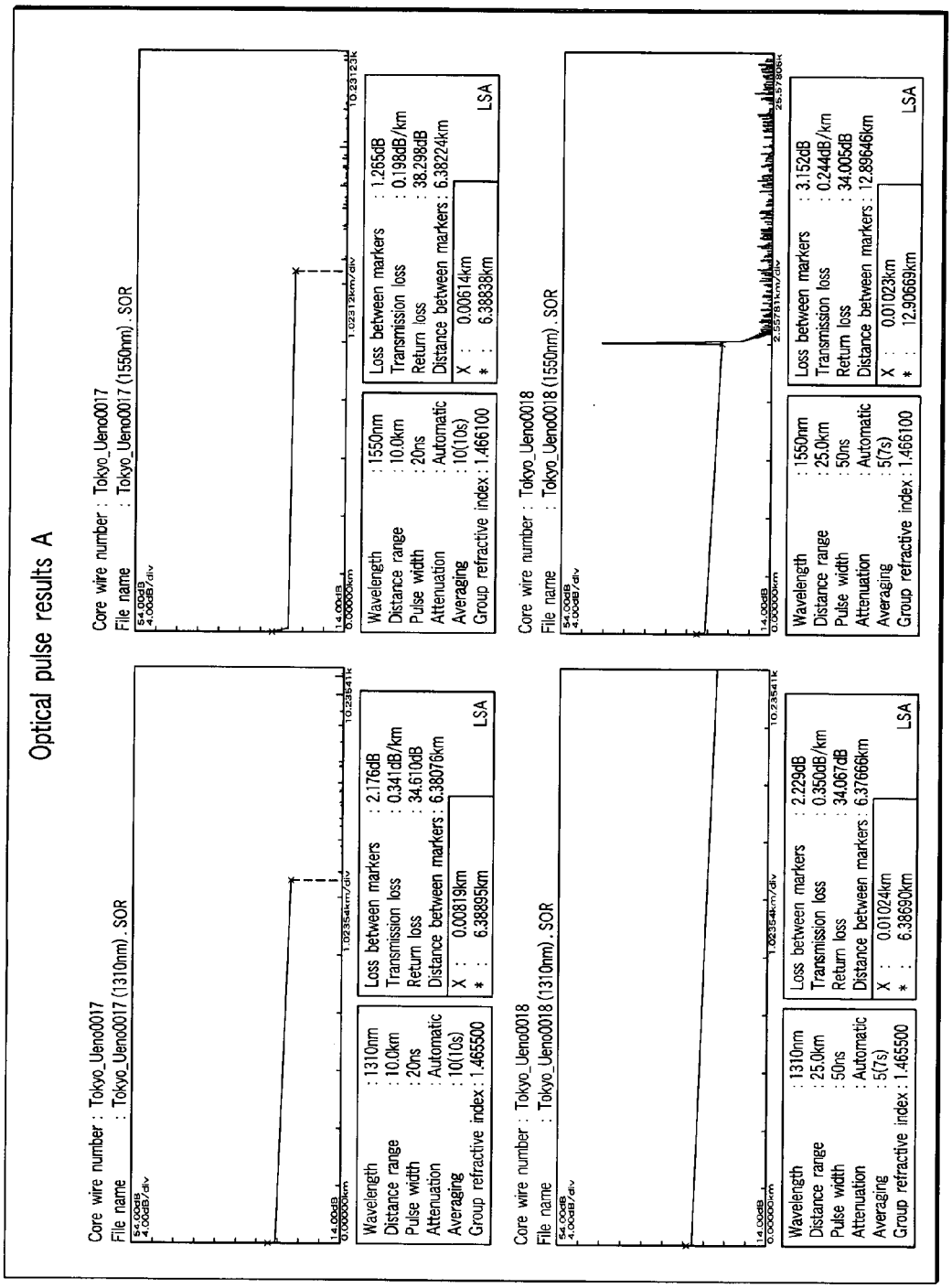
FIG. 10N is an explanatory diagram showing a case in which the report of measurement of optical fibers generated at the external terminal in the optical fiber measuring system according to the present invention is outputted in PDF as one example.
Figure 100:
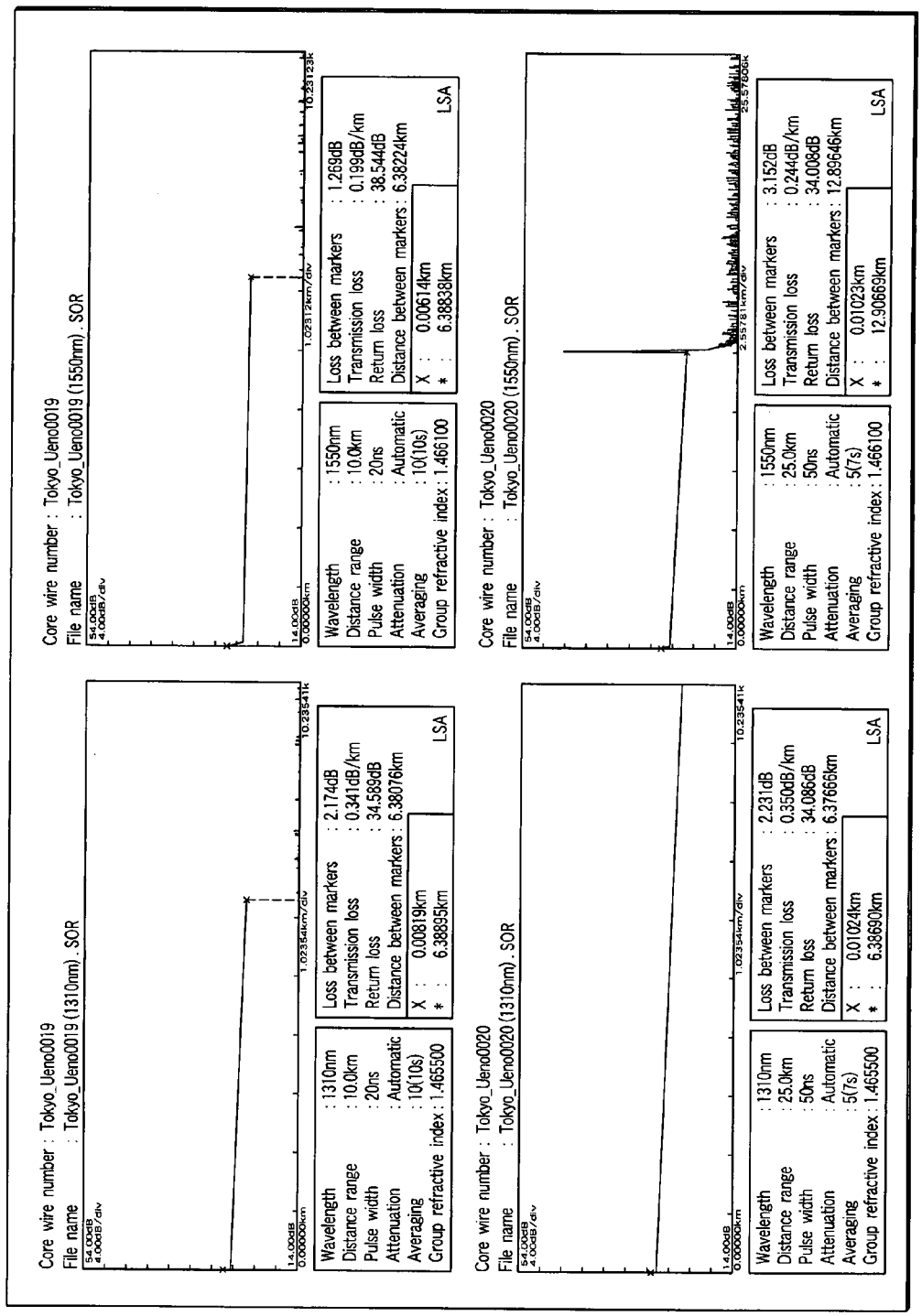

FIG. 10F is an explanatory diagram showing one example of a report on the measurements of the optical fibers which has been generated at the external terminal 10 in the optical fiber measuring system 1 according to the present invention.

As shown in FIG. 10F, as one example of the generated report, the report is generated in a state in which the plurality of optical fibers F serving as measuring objects and the respective measured result data have been associated with one another, such as, for example, the waveform data of the optical fibers F which have been measured are displayed along with the measured data, the waveform data of the optical fibers F which have not been measured are displayed as blank fields, and the like based on the measured result data and the edited result data.

FIGS. 10F to 10O are explanatory diagrams showing cases in which waveform data and measured data when the wavelengths of core wire numbers of Tokyo Ueno 0001 to Tokyo Ueno 0020 are respectively 1310 nm and 1550 nm are outputted in PDF, as one example of the report on the measurements of the plurality of optical fibers F serving as measuring objects which has been generated at the external terminal 10 in the optical fiber measuring system 1 according to the present invention.

FIG. 10P is an explanatory diagram showing a case in which measured data when the wavelengths of core wire numbers of Tokyo Ueno 0001 to Tokyo Ueno 0020 are respectively 1310 nm and 1550 nm are outputted as a list in Excel, as one example of the report on the measurements of the plurality of optical fibers F serving as measuring objects which has been generated at the external terminal 10 in the optical fiber measuring system 1 according to the present invention.

Namely, in this report, in the case of output in Excel, because the respective measured data of the plurality of optical fibers F serving as measuring objects are outputted as a list, the contents of the respective measured data can be judged at one view.

Note that, in the operational examples of the optical fiber measuring method described above, file names are displayed on the display screen as a display method for identifying optical fibers F in FIG. 5.

However, this is not limited thereto, and for example, by displaying optical fiber management information such as core wire numbers, measurement conditions, measured results, and the like at the same time in addition to file names, the plurality of optical fibers F serving as measuring objects and the respective measured results and the respective measured data of the plurality of optical fibers F serving as measuring objects can be associated with one another at one view.

Further, in FIG. 6, an example is described in which the optical fibers F have been measured in the order of the highest one to the lowest one in the table in the measurement of the optical fibers F.

However, there is no need to carry out the measurements in the order of the table, and as shown in FIG. 6 as well, by carrying out displays expressing unmeasurement such as, for example, " - - - ", into the fields of unmeasured optical fibers F, even in a case in which such are measured from the bottom in the table, or are measured alternately, it is possible to judge whether it is measured or unmeasured at one view, which makes it possible to certainly measure characteristic evaluations.

Next, applied examples of the optical fiber measuring method described above will be respectively described in detail as an applied example 1 and an applied example 2.

APPLIED EXAMPLE 1

Skip Measurement

There are cases in which it is clear in advance that there are optical fibers F which cannot be actually measured because a certain optical fiber F is currently in the process of operation, or an optical fiber F is in the process of undertaking construction, although the plurality of optical fibers F serving as measuring objects have been laid down.

In such a case, at a point in time when a table file is created, it is possible to display in the display fields of optical fibers F serving as objects to be skipped so as to clarify that the measurements are skipped.

As a display example, for example, as shown in FIG. 11, a field of a corresponding optical fiber F is selected from among those in the table file, and it is set that the measurement is skipped at the external terminal 10 (for example, the line of the optical fiber F to be skipped is displayed in a different color or in italic type).

In accordance therewith, for example, as shown in FIG. 12, on the display unit 28 of the OTDR 20, optical fibers F to be measured and optical fibers F to be skipped are displayed so as to be apparently discriminable (for example, "Skip" is displayed in lines of the optical fibers F to be skipped).

In accordance therewith, it is possible to precisely associate measured optical fibers F with measured data without mistaking optical fibers F to be actually measured at the OTDR 20, and even in a case of measuring at a later date, it is possible to easily judge whether or not optical fibers F are optical fibers F which have been already measured.

APPLIED EXAMPLE 2

Both-End Measurements

As a method for measuring optical fibers F using the OTDR 20, there is both-end measurement as a method for executing measurements more precisely.

The both-end measurement is a method in which measured data measured from the both ends of an optical fiber F serving as a measuring object by the OTDR 20 are averaged, and the averaged value is regarded as the measured data of the optical fiber F serving as a measuring object.

However, in the case of measuring a plurality of optical fibers F, because it is difficult for one operator to measure the plurality of optical fibers F from the both sides, at least two or more operators are required.

In the case of the both-end measurements by a plurality of operators, an operation in which measured data measured respectively by different operators are respectively identified as measured data in which what optical fiber F has been measured from which side, is bothersome.

Further, in the both-end measurements, it is necessary to carry out the measurements under the same measurement conditions (for example, a distance range, a pulse width, a wavelength, and the like), and it is difficult to manage the measurement conditions.

Figure 13:
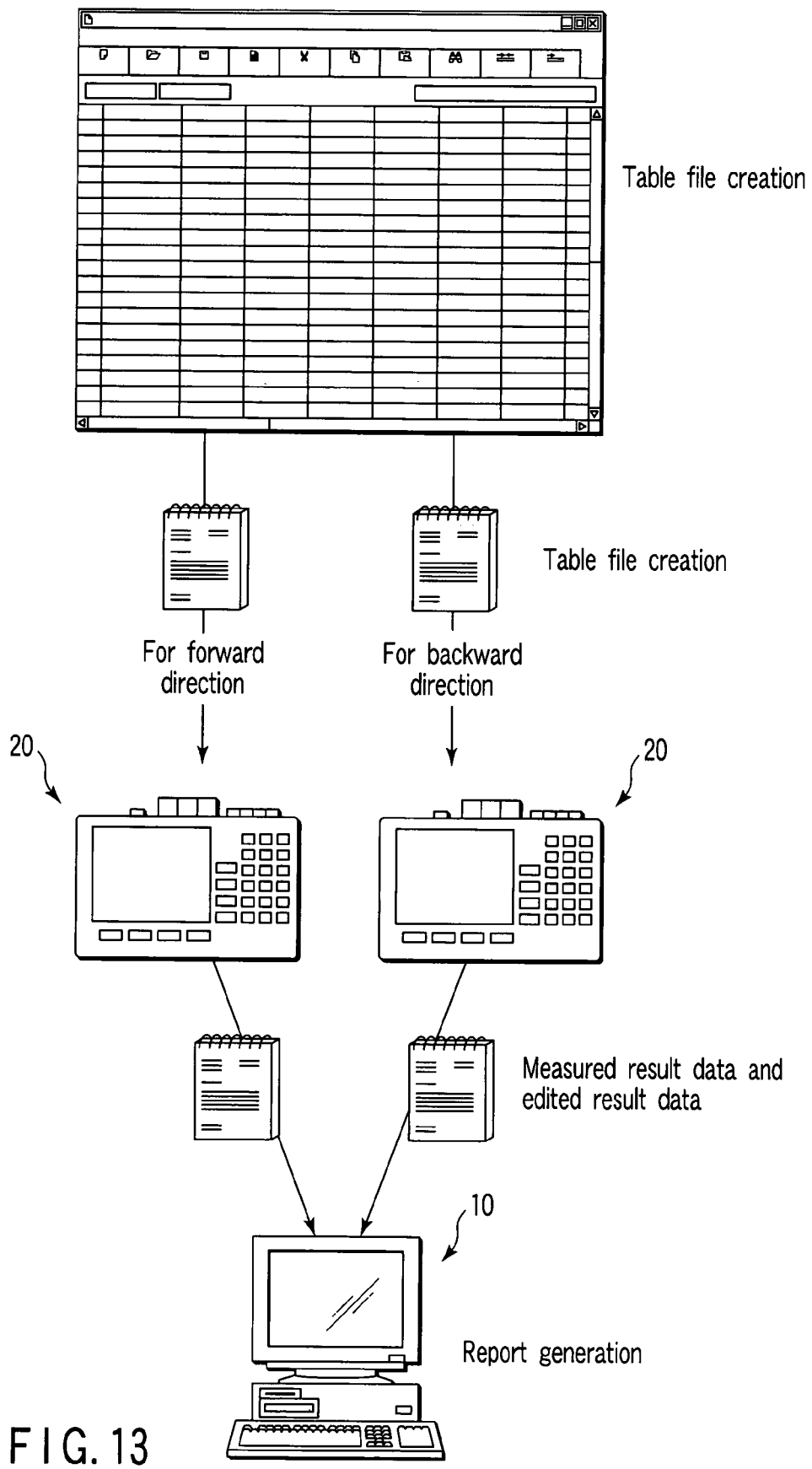
FIG. 13 is an explanatory diagram showing an example of creating table files, used for both-end measurement of an optical fiber, which are created at the external terminal in the optical fiber measuring system according to the present invention.
Figure 14:
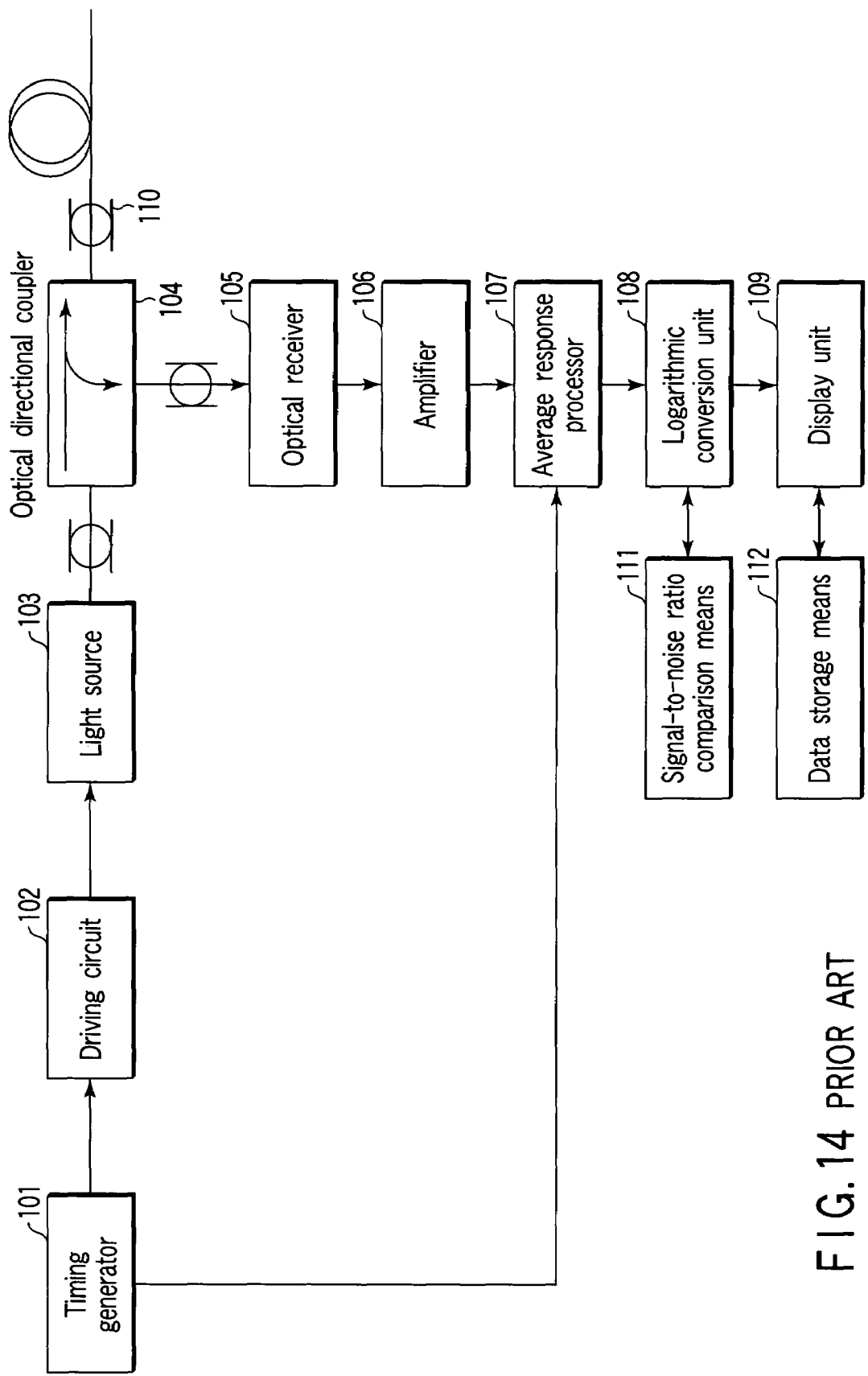
FIG. 14 is a block diagram showing a schematic structure of a conventional optical time domain reflectometer.

Then, by using the optical fiber measuring system 1 in the present example, for example, as shown in FIG. 13, respective table files in a forward direction and a backward direction of one optical fiber F are created at the external terminal 10, and both-end measurements are carried out based on the table files. Therefore, even when the measurements are carried out by different operators, it is possible to easily associate the measured optical fiber F with the measured data, which makes it possible to make an attempt to make the operations of the both-end measurements more efficient.

In this way, the optical fiber measuring system 1 creates a table file for carrying out association of a plurality of optical fibers F serving as measuring objects with respective measured data of the plurality of optical fibers F serving as measuring objects in advance at the external terminal 10, and makes the OTDR 20 read it.

Then, the OTDR 20 stores measured result data in which an optical fiber F measured based on the read table file and measured data of the measured optical fiber F have been associated with one another, and edited result data serving as edited results in the case of a situation different from the plan of the table file created in advance.

Further, the external terminal 10 is made to read the measured result data and the edited result data stored in the OTDR 20, and a report is generated based on the data read at the external terminal 10.

Accordingly, because there is no need for the operator to associate the measured optical fiber F and the measure data in the measurement of an optical fiber or at the time of generating a report, even when a multicore optical fiber is measured, it is possible to easily and efficiently carry out a cable laying/maintenance construction along with the measurements of the optical fiber F.

Even in the case of a situation different from the plan of the table file created in advance in the measurement of the optical fiber F, and even when the operator has edited the plan of the table file, it is possible to store the edited contents as edited result data, and to generate a report based on the measured result data and the edited result data, which makes identification of the measured data and management of the measurement conditions easy.

Note that, in the embodiment describe above, exchange of various data between the external terminal 10 and the OTDR 20 has been described as an example of data communication by wire connection or wireless connection between the communication units 11 and 21 provided to the respective devices.

However, for example, it is possible to exchange data between the external terminal 10 and the OTDR 20 by storing various data in an external storage medium such as a floppy (registered trademark) disk, a PC card, a USB memory, or the like.

Further, the storage units 13 and 22 provided to the respective devices described above have been described as internal memories mounted in advance.

However, the structure is not limited thereto, and for example, an external storage medium such as a floppy® disk, a PC card, a USB memory, or the like is provided in advance, and data may be stored in the external storage medium which is freely attachable and detachable in place of the internal memories.

Further, the present invention is not limited to the descriptions and the drawings according to the preferred embodiments as described above.

Namely, it goes without saying that other modes, embodiments, operational technologies, and the like achieved based on the mode by those skilled in the art are all included within the scope of the present invention.

The invention claimed is:

1. An optical time domain reflectometer comprising:
a display unit which is configured to display optical fiber management information on a plurality of optical fibers serving as measuring objects in a tabular form;
an operating unit which selects an arbitrary optical fiber to be measured from the display of the optical fiber management information;
a storage unit which is configured to store various characteristics of the arbitrary optical fiber selected by the operating unit such that measured data of the various characteristics of the arbitrary optical fiber which have been measured based on corresponding optical fiber management information and the corresponding optical fiber management information are associated with one another, wherein the display unit is capable of displaying in a predetermined form, the measured data of the various characteristics of the arbitrary optical fiber and the corresponding optical fiber management information which have been stored in the storage unit so as to be associated with one another;
table file reading means for reading from outside a table file which is for carrying out association of said plurality of optical fibers with respective measured data when said plurality of optical fibers have been measured based on the optical fiber management information provided in advance of undertaking a cable laying/maintenance construction, the optical fiber management information including various types of information on said plurality of optical fibers, and information on a construction site, and the table file being created such that the association of said plurality of optical fibers with the respective measured data when said plurality of optical fibers have been measured can be edited at a time of undertaking the cable laying/maintenance construction;
table file editing means for editing the table file read by the table file reading means; and optical fiber characteristic measuring means for measuring the plurality of optical fibers based on the table file read by the table file reading means and the table file edited by the table file editing means,
wherein the storage unit includes:
measured result storing means for storing measured result data in which said plurality of optical fibers measured by the optical fiber characteristic measuring means, and the respective measured data of said plurality of optical fibers have been associated with one another; and
edited result storing means for storing edited result data expressing edited contents when the table file has been edited by the table file editing means, and measured result data measured by the optical fiber characteristic measuring means based on the edited contents,
wherein the display unit is capable of selectively displaying at least a screen in a tabular form on which said plurality of optical fibers are displayed so as to be visible at one view in accordance with the table file read by the table file reading means, and a screen on which said plurality of optical fibers measured by the optical fiber characteristic measuring means, and the respective measured data of said plurality of optical fibers are displayed so as to be associated with one another, and
wherein the table file editing means is capable of editing the table file by displaying on the display unit at a time of editing the table file, the screen in the tabular form on which said plurality of optical fibers are displayed so as to be visible at one view.

2. The optical time domain reflectometer according to claim 1, wherein the optical fiber characteristic measuring means displays on the display unit at a time of measuring said plurality of optical fibers, the screen on which said plurality of optical fibers and the respective measured data of said plurality of optical fibers are displayed so as to be associated with one another.

3. The optical time domain reflectometer according to claim 2, wherein the measured result data stored in the measured result storing means and the edited result data stored in the edited result storing means are transmittable to the outside for externally generating a report on said plurality of optical fibers measured by the optical fiber characteristic measuring means.

4. The optical time domain reflectometer according to claim 3, wherein the editing of the table file by the table file editing means includes at least one of a "new insertion" mode in which an optical fiber F to be measured is newly added to the table file, an "initialization" mode in which, even when measurement has been already completed and measured results have been associated, a state is returned to an unmeasured state by erasing all data, a "measurement" mode in which measured results are undated by remeasuring characteristics of a desired optical fiber F, and a "read execution" mode in which the screen is switched to a second screen on which details of measured contents are displayed, and respective items are editable.

5. The optical time domain reflectometer according to claim 3, wherein table file storing means for storing the table file read by the table file reading means, the measured result storing means, and the edited result storing means are external storage media which are freely attachable and detachable.

6. The optical time domain reflectometer according to claim 3, further comprising a communication unit which transmits the measured result data stored in the measured result storing means and the edited result data stored in the edited result storing means to the outside.

7. The optical time domain reflectometer according to claim 3, wherein the table file reading means includes a communication unit for reading the table file from the outside via communication.

8. An optical fiber measuring system which measures various characteristics of a plurality of optical fibers serving as measuring objects, the system comprising an optical time domain reflectometer and an external terminal, wherein the optical time domain reflectometer comprises:
a display unit which is configured to display optical fiber management information on said plurality of optical fibers in a tabular form;
an operating unit which selects an arbitrary optical fiber to be measured from the display of the optical fiber management information; and
a storage unit which is configured to store the various characteristics of the selected arbitrary optical fiber such that measured data of the various characteristics of the selected arbitrary optical fiber which is measured based on corresponding optical fiber management information among the optical fiber management information and the corresponding optical fiber management information are associated with one another,
wherein the display unit is capable of displaying in a predetermined form, the measured data of the various characteristics of the selected arbitrary optical fiber and the corresponding associated optical fiber management information,
wherein the external terminal includes:
table file creating means for allowing to create a table file to be finally created by sequentially indicating a guidance on a display unit, the guidance including an initial menu screen for creating the table file which is for carrying out association of said plurality of optical fibers with measured data when said plurality of optical fibers have been measured based on the optical fiber management information provided in advance of undertaking a cable laying/maintenance construction, the optical fiber management information including various types of information on said plurality of optical fibers, and information on a construction site, wherein in the table file, the association can be edited at the time of undertaking the cable laying/maintenance construction, and wherein the guidance further includes an input screen for individually inputting the optical fiber management information provided in advance, and a file screen on which said plurality of optical fibers are displayed in a tabular form so as to be visible at one view as the table file to be finally created, and
wherein the optical time domain reflectometer measures the various characteristics of the optical fibers based on the table file created by the external terminal.

9. The optical fiber measuring system according to claim 8, wherein the optical time domain reflectometer further comprises:
table file reading means for reading the table file created by the external terminal;
table file editing means for editing the table file read by the table file reading means; and
optical fiber characteristic measuring means for measuring the plurality of optical fibers based on the table file read by the table file reading means and the table file edited by the table file editing means, wherein the storage unit includes:
measured result storing means for storing measured result data in which said plurality of optical fibers measured by the optical fiber characteristic measuring means, and respective measured data of said plurality of optical fibers have been associated with one another; and
edited result storing means for storing edited result data expressing edited contents when the table file has been edited by the table file editing means, and measured result data measured by the optical fiber characteristic measuring means based on the edited contents,
wherein the display unit is capable of selectively displaying at least a screen in a tabular form on which said plurality of optical fibers are displayed so as to be visible at one view in accordance with the table file read by the table file reading means, and a screen on which said plurality of optical fibers and the respective measured data of said plurality of optical fibers are displayed so as to be associated with one another,
wherein the table file editing means is capable of editing the table file by displaying on the display unit at a time of editing the table file, the screen in the tabular form on which said plurality of optical fibers are displayed so as to be visible at one view, and
wherein the optical fiber characteristic measuring means displays on the display unit at the time of measuring said plurality of optical fibers, the screen on which said plurality of optical fibers and the respective measured data of said plurality of optical fibers are displayed so as to be associated with one another.

10. The optical fiber measuring system according to claim 9, wherein the measured result data stored in the measured result storing means and the edited result data stored in the edited result storing means are transmitted to the external terminal for externally generating a report on said plurality of optical fibers measured by the optical fiber characteristic measuring means, and
wherein the external terminal includes report generating means for allowing to generate the report by sequentially indicating a guidance on the display unit thereof, the guidance including a report form selection screen for selecting a report form to be generated, a table file read screen, a file read screen for reading the measured result data and the edited result data stored in the measured result storing means and the edited result storing means of the optical time domain reflectometer, and a preview screen for confirming a result of the report, and selecting an output form of the generated report.

11. The optical fiber measuring system according to claim 9, wherein the editing of the table file by the table file editing means of the optical time domain reflectometer includes at least one of a "new insertion" mode in which an optical fiber F to be measured is newly added to the table file, an "initialization" mode in which, even when measurement has been already completed and measured results have been associated, a state is returned to an unmeasured state by erasing all data, a "measurement" mode in which measured results are undated by remeasuring characteristics of a desired optical fiber F, and a "read execution" mode in which the screen is switched to a second screen on which details of measured contents are displayed, and respective items are editable.

12. The optical fiber measuring system according to claim 9, wherein, in optical time domain reflectometer, table file storing means for storing the table file read by the table file reading means of the optical time domain reflectometer, the measured result storing means, and the edited result storing means are external storage media which are freely attachable and detachable.

13. The optical fiber measuring system according to claim 9, further comprising a communication unit which transmits the measured result data stored in the measured result storing means and the edited result data stored in the edited result storing means to the external terminal.

14. The optical fiber measuring system according to claim 9, wherein the table file reading means of the optical time domain reflectometer includes a communication unit which reads the table file from the external terminal via communication.

15. The optical fiber measuring system according to claim 10, wherein, on the report form selection screen as the guidance indicated on the display unit of the external terminal, as a report form to be generated, there is indicated at least one of a "multicore spreadsheet" mode for reporting as a table in which the respective measured data with respect to said plurality of optical fibers have been summarized, a "multicore spreadsheet and waveform" mode for reporting so as to add respective measured waveforms to the table in which the respective measured data with respect to said plurality of optical fibers have been summarized, and a "waveform report" mode for reporting the respective measured waveforms with respect to said plurality of optical fibers.

16. The optical fiber measuring system according to claim 10, wherein, on the preview screen as the guidance indicated on the display unit of the external terminal, as an output form of the generated report, there is indicated at least one of a "print" mode in which contents of the generated report are printed on a paper sheet to be outputted, a "PDF" mode in which the contents of the generated report are outputted as PDF data, and an "Excel" mode in which the contents of the generated report are outputted as Excel data.

17. An optical fiber measuring method which measures various characteristics of a plurality of optical fibers serving as measuring objects by using an optical time domain reflectometer and an external terminal, the method comprising:
  allowing to create a table file to be finally created by sequentially indicating a guidance on a display unit, the guidance including an initial menu screen for creating the table file which is for carrying out association of said plurality of optical fibers with measured data when said plurality of optical fibers have been measured based on optical fiber management information provided in advance of undertaking a cable laying/maintenance construction, the optical fiber management information including various types of information on said plurality of optical fibers, and information on a construction site, wherein in the table file, the association can be edited at a time of undertaking the cable laying/maintenance construction, and wherein the guidance further includes an input screen for individually inputting the optical fiber management information provided in advance, and a file screen on which said plurality of optical fibers are displayed in a tabular form so as to be visible at one view as the table file to be finally created;
  creating the table file to be finally created by individually inputting the optical fiber management information provided in advance based on the guidance including the initial menu screen, the input screen, and the file screen which are sequentially indicated on the display unit of the external terminal;
  displaying the optical fiber management information on said plurality of optical fibers in a tabular form on a display unit of the optical time domain reflectometer based on the table file to be finally created which has been created at the external terminal;
  selecting an arbitrary optical fiber to be measured from among the optical fiber management information on said plurality of optical fibers which have been displayed in the tabular form on the display unit;
  storing the various characteristics of the selected arbitrary optical fiber into a storage unit of the optical time domain reflectometer such that measured data of the various characteristics of the selected arbitrary optical fiber measured based on corresponding optical fiber management information among the optical fiber management information on said plurality of optical fibers, and the corresponding optical fiber management information are associated with one another; and
  displaying in a predetermined form, the measured data of the various characteristics of the selected arbitrary optical fiber and the corresponding optical fiber management information which have been stored so as to be associated with one another into the storage unit,
  wherein the various characteristics of the plurality of optical fibers are measured by the optical time domain reflectometer based on the table file created at the external terminal.

18. The optical fiber measuring method according to claim 17, further comprising:
  storing the table file to be finally created which has been created on the display unit of the external terminal into table file storing means;
  reading the table file to be finally created which has been stored in the table file storing means, by table file reading means of the optical time domain reflectometer;
  editing the table file to be finally created which has been read by the table file reading means, by table file editing means of the optical time domain reflectometer;
  measuring the plurality of optical fibers by optical fiber characteristic measuring means of the optical time domain reflectometer, based on the table file to be finally created which has been read by the table file reading means and the table file to be finally created which has been edited by the table file editing means;
  storing measured result data in which said plurality of optical fibers measured by the optical fiber characteristic measuring means, and respective measured data of said plurality of optical fibers have been associated with one another, by measured result storing means of the optical time domain reflectometer;
  storing edited result data expressing edited contents when the table file has been edited by the table file editing means, and measured result data measured by the optical fiber characteristic measuring means based on the edited contents, by edited result storing means of the optical time domain reflectometer;
  allowing to selectively display on the display unit of the optical time domain reflectometer at least a screen in a tabular form on which said plurality of optical fibers are displayed so as to be visible at one view in accordance with the table file read by the table file reading means, and a screen on which said plurality of optical fibers measured by the optical fiber characteristic measuring means and the respective measured data of said plurality of optical fibers are displayed so as to be associated with one another;
  allowing to edit the table file by displaying on the display unit of the optical time domain reflectometer at a time of editing the table file by the table file editing means, the screen in the tabular form on which said plurality of optical fibers are displayed so as to be visible at one view; and displaying on the display unit of the optical time domain reflectometer at the time of measuring said plurality of optical fibers by the optical fiber characteristic measuring means, the screen on which said plurality of optical fibers and the respective measured data of said plurality of optical fibers are displayed so as to be associated with one another.

19. The optical fiber measuring method according to claim 18, further comprising:

allowing to transmit the measured result data stored in the measured result storing means of the optical time domain reflectometer, and the edited result data stored in the edited result storing means to the external terminal in order to generate a report at the external terminal on said plurality of optical fibers measured by the optical fiber characteristic measuring means;

allowing to generate the report by sequentially indicating a guidance on the display unit of the external terminal, the guidance including a report form selection screen for selecting a report form to be generated by a report generating means, a table file read screen for generating the report, a screen-after-reading-file for reading data for generating the report, and a preview screen for confirming a generated result of the report, and for selecting an output form of the generated report; and generating the report to be finally created based on the guidance including the report form selection screen, the table file read screen, the screen-after-reading-file for reading the measured result data and the edited result data stored in the measured result storing means and the edited result storing means of the optical time domain reflectometer, and the preview screen, which are sequentially indicated on the display unit of the external terminal.

20. The optical fiber measuring method according to claim 18, wherein the editing of the table file by the table file editing means of the optical time domain reflectometer 5 includes at least one of a "new insertion" mode in which an optical fiber F to be measured is newly added to the table file, an "initialization" mode in which, even when measurement has been already completed and measured results have been associated, a state is returned to an unmeasured state by erasing all data, a "measurement" mode in which measured results are undated by remeasuring characteristics of a desired optical fiber F, and a "read execution" mode in which the screen is switched to a second screen on which details of measured contents are displayed, and respective items are editable.

21. The optical fiber measuring method according to claim 18, wherein, in the optical time domain reflectometer, the table file storing means which stores the table file read by the table file reading means of the optical time domain reflectometer, the measured result storing means, and the edited result storing means are respectively external storage media which are freely attachable and detachable.

22. The optical fiber measuring method according to claim 18, further comprising a communication unit which transmits the measured result data stored in the measured result storing means and the edited result data stored in the edited result storing means to the external terminal.

23. The optical fiber measuring method according to claim 18, wherein the table file reading means of the optical time domain reflectometer includes a communication unit which reads the table file from the external terminal via communication.

24. The optical fiber measuring method according to claim 19, wherein, on the report form selection screen as the guidance indicated on the display unit of the external terminal, as a report form to be generated, there is indicated at least one of a "multicore spreadsheet" mode for reporting as a table in which the respective measured data with respect to said plurality of optical fibers have been summarized, a "multicore spreadsheet and waveform" mode for reporting so as to add respective measured waveforms to the table in which the respective measured data with respect to said plurality of optical fibers have been summarized, and a "waveform report" mode for reporting the respective measured waveforms with respect to said plurality of optical fibers.

25. The optical fiber measuring method according to claim 19, wherein, on the preview screen as the guidance indicated on the display unit of the external terminal, as an output form of the generated report, there is indicated at least one of a "print" mode in which contents of the generated report are printed on a paper sheet to be outputted, a "PDF" mode in which the contents of the generated report are outputted as PDF data, and an "Excel" mode in which the contents of the generated report are outputted as Excel data.

* * * * *